United States Patent
Iijima et al.

(10) Patent No.: US 6,246,455 B1
(45) Date of Patent: Jun. 12, 2001

(54) DISPLAY DEVICE WITH LIQUID CRYSTAL BETWEEN REFLECTIVE POLARIZERS, AND A LIGHT SOURCE ILLUMINATING BETWEEN THE POLAZERS

(75) Inventors: Chiyoaki Iijima; Toshihiko Tsuchihashi, both of Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/068,715

(22) PCT Filed: Sep. 12, 1997

(86) PCT No.: PCT/JP97/03253

§ 371 Date: May 14, 1998

§ 102(e) Date: May 14, 1998

(87) PCT Pub. No.: WO98/12595

PCT Pub. Date: Mar. 26, 1998

(30) Foreign Application Priority Data

Sep. 17, 1996 (JP) ................................................. 8-245347

(51) Int. Cl.[7] .................................................... G02F 1/13
(52) U.S. Cl. .................................. 349/65; 349/96; 349/98
(58) Field of Search .................................. 349/65, 96, 98

(56) References Cited

U.S. PATENT DOCUMENTS

| | | |
|---|---|---|
| 4,974,219 | 11/1990 | Korth . |
| 5,808,709 * | 9/1998 | Davis et al. .............................. 349/65 |
| 5,808,713 * | 1/1999 | Broer et al. .............................. 349/98 |
| 5,856,855 * | 1/1999 | Mol et al. ................................ 349/65 |

FOREIGN PATENT DOCUMENTS

| | | |
|---|---|---|
| 825477 | 2/1998 | (EP) . |
| EP 825477 A * | 2/1998 | (EP) . |
| 2 307 562 | 5/1997 | (GB) . |
| 95-17303 | 6/1995 | (WO) . |
| 95-17691 | 6/1995 | (WO) . |
| 95-17692 | 6/1995 | (WO) . |
| 95-17699 | 6/1995 | (WO) . |
| 95 20180 | 7/1995 | (WO) . |
| 95 27919 | 10/1995 | (WO) . |
| 95-27919 | 10/1995 | (WO) . |
| 96-19347 | 6/1996 | (WO) . |
| 97-01439 | 1/1997 | (WO) . |
| 97-01440 | 1/1997 | (WO) . |
| 97-01610 | 1/1997 | (WO) . |
| 97-01726 | 1/1997 | (WO) . |
| 97-01774 | 1/1997 | (WO) . |
| 97-01778 | 1/1997 | (WO) . |
| 97-01780 | 1/1997 | (WO) . |
| 97-01781 | 1/1997 | (WO) . |
| 97-01788 | 1/1997 | (WO) . |
| 97-01789 | 1/1997 | (WO) . |
| 97-07653 | 2/1997 | (WO) . |

* cited by examiner

*Primary Examiner*—Kenneth Parker
(74) *Attorney, Agent, or Firm*—Oliff & Berridge, PLC

(57) ABSTRACT

An upper polarized-light separator is provided on a STN liquid crystal to provide a display device using a polarization-changing optical element. A light source is provided between the upper polarized-light separator and the STN liquid crystal. Plane-polarized light parallel to the drawing passes through the upper polarized-light separator. Plane-polarized light perpendicular to the drawing is reflected by the upper polarized-light separator, goes towards the interior of the liquid crystal display device, and passes through the upper polarized-light separator to be emitted towards the observation side after repeated reflection in the liquid crystal display device, resulting in a brighter display.

39 Claims, 28 Drawing Sheets

DISPLAY DEVICE WITH LIQUID CRYSTAL BETWEEN REFLECTIVE POLARIZERS, AND A LIGHT SOURCE ILLUMINATING BETWEEN THE POLAZERS

BACKGROUND OF THE INVENTION

1. Field of the Invention

The present invention relates to display devices and electronic devices mounting the display devices. In particular, the present invention relates to a reflection-type liquid crystal display device and an electronic device mounting the reflection-type liquid crystal display device.

2. Description of the Related Art

A typical conventional liquid crystal display device using a polarization-changing optical element, such as a twisted nematic (TN) liquid crystal or a super-twisted nematic (STN) liquid crystal, which rotates the polarization axis, has a configuration in which the polarization-changing optical element is sandwiched between two polarizers. It therefore has a low light efficiency and, in particular, is a reflection-type display device having a dark display.

For the purpose of displaying in the dark, a transflector is provided below the liquid crystal display device and light is illuminated from its lower side. The use of the transflector causes a considerable amount of shading of the incident light, resulting in a dark display.

SUMMARY OF THE INVENTION

It is therefore an object of the present invention to provide a display device with a bright display, which uses a polarization-changing optical element.

First, the principle of the present invention will be described with reference to FIGS. 1A to 12.

FIGS. 1A, 1B, and 1C are cross-sectional views for illustrating the principle of the display device in accordance with the present invention, whereas FIG. 1D is a cross-sectional view of the principle of a display device for comparison. FIGS. 3 to 12 are cross-sectional views of the principle of the display device in accordance with the present invention. The liquid crystal display device in these drawings is shown to illustrate the principle of the present invention, hence the present invention is, of course, not limited to the liquid crystal display device shown in these drawings.

Referring now to FIG. 1D, the liquid crystal display device for comparison uses a polarizer 135 as a polarized-light separator at the observing side of the liquid crystal display device (herein after referred to as an upper polarized-light separator). The polarizer 135 transmits plane-polarized light from a light source 110 parallel to the drawing towards the observation side but absorbs plane-polarized light perpendicular to the drawing, hence the display from a light source 190 is dark.

In contrast, in the display device in accordance with the present invention, as shown in FIG. 1A, a retardation film 141 is provided on a glass substrate 142 for holding a STN liquid crystal 143 to correct coloring generated in the STN liquid crystal 143. Also, an upper polarized-light separator 130 is provided on the retardation film 141.

The upper polarized-light separator 130 includes a (¼)λ plate 132 and a cholesteric liquid crystal layer 134. The cholesteric liquid crystal reflects circularly polarized light having the same wavelength as the pitch of the liquid crystal and the same rotation direction as the liquid crystal, and transmits other light. For example, using a levorotation cholesteric liquid crystal with a pitch of 5,000 angstroms for the cholesteric liquid crystal layer 134, the element is obtained, which reflects left-handed circularly polarized light with a wavelength of 5,000 angstroms and transmits left-handed circularly polarized light with other wavelengths and right-handed circularly polarized light. Further, by using the levorotation cholesteric liquid crystal and by varying its pitch over the entire wavelength range of visible light in the cholesteric liquid crystal, the element is obtained, which reflects left-handed circularly polarized light over the entire white light region rather than monochrome light and transmits right-handed circularly polarized light.

In the upper polarized-light separator 130 composed of a combination of such cholesteric liquid crystal layer 134 and (¼)λ plate 132, plane-polarized light of a given first direction incident on the (¼)λ plate 132 is converted to left-handed circularly polarized light by the (¼)λ plate 132, reflected by the cholesteric liquid crystal layer 134, reconverted to the plane-polarized light of the given first direction by the (¼)λ plate 132, and emitted. Plane-polarized incident light of the second direction perpendicular to the first direction is converted to right-handed circularly polarized light by the (¼)λ plate 132, and passes through the cholesteric liquid crystal layer 134. Light incident on the upper side of the cholesteric liquid crystal layer 134 is emitted towards the lower side of the (¼)λ plate 132 as plane-polarized light of the second direction.

As described above, the upper polarized-light separator 130 composed of a combination of the cholesteric liquid crystal layer 134 and the (¼)λ plate 132 functions as a polarized-light separating means. The polarized-light separating means transmits the plane-polarized light of the second direction among the light incident on the (¼)λ plate 132 and reflects the plane-polarized light of the first direction perpendicular to the second direction. Further, for the light incident on the cholesteric liquid crystal layer 134, it emits plane-polarized light of the second direction to the side of the (¼)λ plate 132. Polarized-light separating means having such a function, other than the polarized-light separator 130 which comprises a combination of the cholesteric liquid crystal layer and (¼)λ plate 132, include that using a multilayered film (U.S. Pat. No. 4,974,219), that separating the incident light into reflected polarized light and transmitted polarized light by means of Brewster's angle (SID 92 DIGEST, pp. 427 to 429), and that using holograms.

Again, referring to FIG. 1A, plane-polarized light 191 parallel to the drawing from the light source 190 is converted to right-handed circularly polarized light by the (¼)λ plate 132 and passes through the cholesteric liquid crystal layer 134 towards the observation side. On the other hand, plane-polarized light 192 perpendicular to the drawing from the light source 190 is converted to left-handed circularly polarized light by the (¼)λ plate 132, is reflected by the cholesteric liquid crystal layer 134, is incident on the (¼)λ plate 132 again, is converted to plane-polarized light perpendicular to the drawing, and travels towards the interior of the liquid crystal display device. Since the interior of the liquid crystal display device includes various boundary faces having discrete refractive indices such as, the plane-polarized light perpendicular to the drawing is reflected at boundary faces having discrete refractive indices such as, for example, boundary faces between air and the retardation film 141 and between the retardation film 141 and the glass substrate 142, and is emitted towards the observer through the upper polarized-light separator after repeated reflection in the liquid crystal display device. Thus a brighter display is achieved for the display using the light from the light source 190 in comparison with the case using a polarizer as the upper polarized-light separator.

Referring now to FIG. 1B, the upper polarized-light separator 130 is provided with a (¼)λ plate 132, a cholesteric liquid crystal layer 134, and a (¼)λ plate 136.

In the upper polarized-light separator 130 including the (¼)λ plates 132 and 136 with the cholesteric liquid crystal layer 134 therebetween, plane-polarized light of a given first direction incident on the (¼)λ plate 132 is converted to left-handed circularly polarized light by the (¼)λ plate 132, reflected by the cholesteric liquid crystal layer 134, reconverted to the plane-polarized light of the first direction by the (¼)λ plate 132, and emitted. On the other hand, incident plane-polarized light of a given second direction perpendicular to the first direction is converted to right-handed circularly polarized light by the (¼)λ plate 132, passes through the cholesteric liquid crystal layer 134, is reconverted to the plane-polarized light of the second direction by the (¼)λ plate 136, and is emitted. For light incident on the upper side of the (¼)λ plate 136, plane-polarized light of the second direction is emitted towards the lower side of the (¼)λ plate 132.

As described above, the upper polarized-light separator 130 including a combination of the cholesteric liquid crystal layer 134 and the (¼)λ plates 132 and 136 is a polarized-light separating means which transmits the plane-polarized light of the second direction among light incident on the (¼)λ plate 132, reflects the plane-polarized light of the first direction perpendicular to the second direction, and emits the light incident on the (¼)λ plate 136 towards the (¼)λ plate 132 as plane-polarized light of the second direction. Polarized-light separating means having such a function, other than the polarized-light separator 130 including a combination of the cholesteric liquid crystal layer 134 and the (¼)λ plates 132 and 136, include that using a multilayered film (U.S. Pat. No. 4,974,219), that separating the incident light into reflected polarized light and transmitted polarized light by means of Brewster's angle (SID 92 DIGEST, pp. 427 to 429), that using holograms, and those disclosed in laid-open international patents (WO95/17692 and WO95/27919)as a reflective polarizer.

Referring to FIG. 1B again, the plane-polarized light 191 parallel to the drawing from the light source 190 is converted to right-handed circularly polarized light by the (¼)λ plate 132, and passes through the cholesteric liquid crystal layer 134. The right-handed circularly polarized light passing through the cholesteric liquid crystal layer 134 is emitted to the observation side after conversion to the plane-polarized light parallel to the drawing by the (¼)λ plate 136. On the other hand, the plane-polarized light 192 perpendicular to the drawing from the light source 190 is converted to left-handed circularly polarized light by the (¼)λ plate 132. The left-handed circularly polarized light is reflected by the cholesteric liquid crystal layer 134, is incident on the (¼)λ plate 132 again, then is reconverted to the plane-polarized light perpendicular to the drawing by the (¼)λ plate 132, and goes towards the interior of the liquid crystal display device. Since the interior of the liquid crystal display device includes various boundary faces having discrete refractive indices such as, the plane-polarized light perpendicular to the drawing is reflected at boundary faces having discrete refractive indices such as, for example, boundary faces between air and the retardation film 141 and between the retardation film 141 and the glass substrate 142, and finally transmitted towards the observer through the upper polarized-light separator after repeated reflection in the liquid crystal display device. Thus a brighter display is achieved for the display using the light from the light source 190, in comparison with the case using the polarizer as the upper polarized-light separator.

Referring now to FIG. 1C, the upper polarized-light separator 300 has a composite structure of two types of alternately deposited layers 301 (layer A) and 302 (layer B) as shown in FIG. 2. The refractive index ($n_{AX}$) along the X axis and the refractive index ($n_{AY}$) along the Y axis of the layer A 301 are different from each other, whereas the refractive index ($n_{BX}$) along the X axis and the refractive index ($n_{BY}$) along the Y axis of the layer B 302 are the same.

As a result, among the light incident on the upper polarized-light separator 300, plane-polarized light along the Y axis passes through the upper polarized-light separator 300 without modification of the polarization direction and is emitted.

When the following equation is satisfied, among light incident on the upper polarized-light separator 300, plane-polarized light along the X axis having a wavelength λ is reflected by the upper polarized-light separator 300 without modification of the polarization direction:

$$t_A \cdot n_{AX} + t_B \cdot n_{BX} = \lambda/2 \quad (1)$$

wherein $t_A$ is the thickness along the Z axis of the layer A 301 and $t_B$ is the thickness along the z axis of the layer B 302.

When the thickness $t_A$ along the Z axis of the layer A 301 and the thickness $t_B$ along the Z axis of the layer B 302 varied so that the equation (1) holds over the entire visible light region, the upper polarized-light separator 300 can reflect the plane-polarized light polarized in the X direction and can transmit the plane-polarized light polarized in the Y direction without modification over the white light region rather than a monochrome region. Such an upper polarized-light separator is disclosed as a reflective polarizer in the laid-open international patent (WO95/17692).

The upper polarized-light separator 300 shown in FIG. 2 reflects plane-polarized light of the given first direction from the light source 190 back towards the light source 190 without modification of the polarization, whereas it emits transmits plane-polarized light of the second direction perpendicular to the first direction from the light source 190 towards the upper face of the upper polarized-light separator 300. Further, the upper polarized-light separator 300 emits the light incident on the upper face of the upper polarized-light separator 300 towards the light source 190 as the plane-polarized light of the second direction.

As described above, the upper polarized-light separator 300 transmits plane-polarized light of the given second direction from the light source 190 without modification of the polarization direction, reflects plane-polarized light of the first direction perpendicular to the second direction from the light source 190, and emits light from the upper face towards the light source 190 as plane-polarized light of the second direction. Polarized-light separating means having such a function, other than the upper polarized-light separator 300 having a combination of the cholesteric liquid crystal layer 134 and the (¼)λ plates 132,136, include that using a multilayered film (U.S. Pat. No. 4,974,219), that separating the incident light into reflected polarized light and transmitted polarized light by means of Brewster's angle (SID 92 DIGEST, pp. 427 to 429), and that using holograms.

Referring to FIG. 1C again, plane-polarized light 191 parallel to the drawing from the light source 190 passes through the upper polarized-light separator 300 and is emitted towards the observation side without modification of the polarization direction. On the other hand, plane-polarized light 192 perpendicular to the drawing from the light source 190 is reflected by the upper polarized-light separator 300 and goes towards the interior of the liquid crystal display device without modification of the polarization direction. Since the interior of the liquid crystal display device includes various boundary faces having discrete refractive indices, the plane-polarized light perpendicular to the drawing is reflected at boundary faces having discrete refractive indices such as, for example, boundary faces between air and the retardation film 141 and between the retardation film 141 and the glass substrate 142, and is emitted towards the observer through the upper polarized-light separator 300 after repeated reflection in the liquid crystal display device. Thus a brighter display is achieved for the display using the light from the light source 190 in comparison with the case using a polarizer as the upper polarized-light separator.

Next, referring to FIGS. 3 and 4, in the liquid crystal device, a TN liquid crystal 140 is used as a polarization-changing optical element. The upper polarized-light separator 130 including the (¼)λ plate 132 and the cholesteric liquid crystal layer 134 is provided on the upper side of the TN liquid crystal liquid 140, and a polarizer 165, a coloring layer 170, and a reflector 180 are provided on the lower side of the TN liquid crystal 140 in this order. The left side of the liquid crystal device is referred to as an applied-voltage section 110, whereas the right side is referred to as a no applied-voltage section 120.

A display by the light from the light source 190 will now be described with reference to FIG. 3.

Unpolarized light incident on the upper polarized-light separator 130 from the light source 190 has been described with reference to FIG. 1A, and a brighter display than that using a polarizer as the upper polarized-light separator also has been described with reference to FIG. 1A.

Next, a display caused by transmission of unpolarized light from the light source 190 through the TN liquid crystal 140 etc. will be described.

In the no applied-voltage section on the right side, the unpolarized light 121 from the light source 190 passes through the TN liquid crystal 140, and is converted to plane-polarized light parallel to the drawing by the polarizer 165. Part of the plane-polarized light parallel to the drawing is reflected by the coloring layer 170 and is incident on the polarizer 165 again. The plane-polarized light passing through the polarizer 165 is converted to plane-polarized light perpendicular to the drawing by rotating the polarization angle by 90 degrees and then converted to left-handed circularly polarized light by the (¼)λ plate 132. The left-handed circularly polarized light is reflected by the cholesteric liquid crystal layer 134, is incident on the (¼)λ plate 132 again, is converted to plane-polarized light perpendicular to the drawing by the (¼)λ plate 132, and goes towards the interior of the liquid crystal device as reflected light 123. On the other hand, the other part of the plane-polarized light parallel to the drawing passing through the polarizer 165 passes through the coloring layer 170 while being absorbed in this layer, is reflected by the reflector 180, passes through the coloring layer 170 while being absorbed in this layer again, and is incident on the polarizer 165 again. The plane-polarized light parallel to the drawing passing through the polarizer 165 is converted to plane-polarized light perpendicular to the drawing by rotating the polarization angle by 90 degrees in the TN liquid crystal 140 and then converted to left-handed circularly polarized light by the (¼)λ plate 132. The left-handed circularly polarized light is incident on the (¼)λ plate 132 again after reflection by the cholesteric liquid crystal 134, is converted to plane-polarized light perpendicular to the drawing by the (¼)λ plate 132, and then goes towards the interior of the liquid crystal display device as the reflected light 123.

In the applied-voltage section 110 on the left side, the unpolarized light 111 from the light source 190 passes through the TN liquid crystal 140, and is converted to plane-polarized light parallel to the drawing by the polarizer 165. Part of the plane-polarized light parallel to the drawing passing through the polarizer 165 is reflected by the coloring layer 170, is incident on the polarizer 165 again, passes through the TN liquid crystal 140 without modification of the polarization direction, and is converted to right-handed circularly polarized light by the (¼)λ plate 132. The right-handed circularly polarized light passes through the cholesteric liquid crystal layer 134 and goes towards the observation side as the emitting light 112. The other part of the plane-polarized light parallel to the drawing passing through the polarizer 165 passes through the coloring layer 170 while being absorbed in this layer, is reflected by the reflector 180, passes through the coloring layer 170 again while being absorbed in this layer, and is incident on the polarizer 165 again. The plane-polarized light parallel to the drawing passing through the polarizer 165 passes through the TN liquid crystal 140 without modification of the polarization direction, and is converted to right-handed circularly polarized light by the (¼)λ plate 132. The right-handed circularly polarized light passes through the cholesteric liquid crystal layer 134 and goes towards the observation side as the emitting light 112.

A reflection-type display when external light is incident on the liquid crystal display device will now be described with reference to FIG. 4.

In the no applied-voltage section 120 on the right side, the external natural light 125 incident on the liquid crystal device is converted to plane-polarized light parallel to the drawing by the upper polarized-light separator 130 and then converted to plane-polarized light perpendicular to the drawing by rotating the polarization angle by 90 degrees in the TN liquid crystal 140. The plane-polarized light perpendicular to the drawing is absorbed in the polarizer 165.

In the applied-voltage section 110 on the left side, the external natural light 115 incident on the liquid crystal display device is converted to plane-polarized light parallel to the drawing in the upper polarized-light separator 130. The plane-polarized light parallel to the drawing passes through the TN liquid crystal without modification of the polarization direction, and passes through the polarizer 165. Part of the plane-polarized light parallel to the drawing passing through the polarizer 165 is incident on the polarizer 165 again after reflection by the coloring layer 170. The plane-polarized light parallel to the drawing passing through the polarizer 165 passes through the TN liquid crystal 140 without modification of the polarization direction, and is converted to right-handed circularly polarized light by the (¼)λ plate 132. The right-handed circularly polarized light passes through the cholesteric liquid crystal layer 134, and goes towards the observation side as the emitting light 116. The other part of the plane polarized light parallel to the drawing passing through the polarizer 165 passes through the coloring layer 170 while being absorbed in this layer, and is reflected by the reflector 180. The polarized light passes through the coloring layer 170 again while being absorbed in this layer, then is incident on the polarizer 165 again, and passes through the TN liquid crystal 140 without modification of the polarization direction. The plane-polarized light parallel to the drawing passing through the polarizer 165 is converted to right-handed circularly polarized light by the (¼)λ plate 132, passes through the cholesteric liquid crystal layer 134, and goes towards the observation side as the emitting light 116.

As described above, in the no applied-voltage section 120 on the right side, the unpolarized light 121 from the light source 190 is reflected towards the interior of the liquid crystal display device by the upper polarized-light separator 130, whereas the external natural light 125 is absorbed in the polarization plate 135. As a result, in both cases, no light is emitted from the liquid crystal display device towards the observer. In the applied-voltage section 110 on the left side, the unpolarized light 111 from the light source 190 is emitted from the upper polarized-light separator 130 as the emitting light 112, whereas the external natural light 115 is emitted from the upper polarized-light separator 130 as the emitting light 116. As a result, in both cases, light is emitted from the liquid crystal device towards the observer. Hence, the same display state based on the on-off state of the TN liquid crystal 140 is achieved by both the external light and the light from the light source 190. Accordingly, no so-called negative-positive reversion will occur between the display with the external light and the display with the light from the light source 190.

Next, referring to FIGS. 5 and 6, a TN liquid crystal 140 is used as a polarization-changing optical element in this liquid crystal display device. An upper polarized-light separator 130 including the (¼)λ plates 132 and 136 and the cholesteric liquid crystal layer 134 is provided on the TN liquid crystal 140. A polarizer 165, a coloring layer 170, and a reflector 180 are provided under the TN liquid crystal 140 in this order. The left side of the liquid crystal display device is referred to as an applied-voltage section 110 whereas the right side as a no applied-voltage section 120 for the description.

A display by the light from the light source 190 will now be described with reference to FIG. 5.

Unpolarized light incident on the upper polarized-light separator 130 from the light source 190 has been described with reference to FIG. 1B, and a brighter display state than that using a polarizer as an upper polarized-light separator also has been described with reference to FIG. 1B.

Next, a display caused by transmission of unpolarized light from the light source 190 through the TN liquid crystal 140 etc. will be described.

In the no applied-voltage section 120 on the right side, the unpolarized light 121 from the light source 190 passes through the TN liquid crystal 140, and is converted to plane-polarized light parallel to the drawing by the polarizer 165. The plane-polarized light parallel to the drawing is colored in the coloring layer 170, is reflected towards the upper direction, passes through the polarizer 165 and TN liquid crystal 140, is reflected by the upper polarized-light separator 130 as plane-polarized light perpendicular to the drawing, and goes towards the interior of the liquid crystal display device as reflected light 123. Since the detail is the same as the no applied-voltage section 120 on the right side of the liquid crystal display device which has been described with reference to FIG. 3, the repeated description will be omitted.

In the applied-voltage section 110 on the left side, the unpolarized light 111 from the light source 190 passes through the TN liquid crystal 140, and is converted to plane-polarized light parallel to the drawing by the polarizer 165. Part of the plane-polarized light parallel to the drawing passing through the polarizer 165 is reflected by the coloring layer 170, is incident on the polarizer 165 again, and passes though the TN liquid crystal 140 without modification of the polarization direction. The plane-polarized light parallel to the drawing is converted to right-handed circularly polarized light by the (¼)λ plate 132. The right-handed circularly polarized light passes through the cholesteric liquid crystal layer 134, is converted to plane-polarized light parallel to the drawing by the (¼)λ plate 136, and goes towards the observation side as the emitting light 112. The other part of the plane-polarized light parallel to the drawing passing through the polarizer 165 passes through the coloring layer 170 while being absorbed in this layer, and is reflected by the reflector 180. The reflected light passes through the coloring layer 170 again while being absorbed in this layer, is incident on the polarizer 165 again, and passes through the TN liquid crystal 140 without modification of the polarization direction. The plane-polarized light parallel to the drawing passing through the TN liquid crystal 140 is converted right-handed circularly polarized light by the (¼)λ plate 132, passes though the cholesteric liquid crystal layer 134, is converted to plane-polarized light parallel to the drawing by the (¼)λ plate 136, and goes towards the observation side as the emitting light 112.

A reflection-type display when external light is incident on the liquid crystal display device will now be described with reference to FIG. 6.

In the no applied-voltage section 120 on the right side, the external natural light 125 incident on the liquid crystal device is converted to plane-polarized light parallel to the drawing by the upper polarized-light separator 130 and then converted to plane-polarized light perpendicular to the drawing by rotating the polarization angle by 90 degrees in the TN liquid crystal 140. The plane-polarized light perpendicular to the drawing is absorbed in the polarizer 165.

In the applied-voltage section 110 on the left side, the external natural light 115 incident on the liquid crystal display device is converted to plane-polarized light parallel to the drawing in the upper polarized-light separator 130. The plane-polarized light parallel to the drawing passes through the TN liquid crystal 140 without modification of the polarization direction and passes through the polarizer 165. Part of the plane-polarized light parallel to the drawing passing through the polarizer 165 is incident on the polarizer 165 again after reflection by the coloring layer 170. The plane-polarized light parallel to the drawing from the polarizer 165 passes through the TN liquid crystal 140 without modification of the polarization direction, and is converted to right-handed circularly polarized light by the (¼)λ plate 132. The right-handed circularly polarized light passes trough the cholesteric liquid crystal layer 134, and is converted to plane-polarized light parallel to the drawing by the (¼)λ plate 136. The plane-polarized light parallel to the drawing goes towards the observation side as the emitting light 116. The other part of the plane polarized light parallel to the drawing passing through the polarizer 165 passes through the coloring layer 170 while being absorbed in this layer, and is reflected by the reflector 180. The reflected polarized light passes through the coloring layer 170 again while being absorbed in this layer. The polarized light incident on the polarizer 165 again passes through the polarizer 165, and the TN liquid crystal 140 without modification of the polarization direction. The plane-polarized light parallel to the drawing passing through the TN liquid crystal 140 is converted to right-handed circularly polarized light by the (¼)λ plate 132. The right-handed circularly polarized light passes through the cholesteric liquid crystal layer 134, and is converted to plane-polarized light parallel to the drawing by the (¼)λ plate 136. The plane-polarized light parallel to the drawing goes towards the observation side as the emitting light 116.

Also, in this case, in the no applied-voltage section 120 on the right side, the unpolarized light 121 from the light source 190 is reflected towards the interior of the liquid crystal display device by the upper polarized-light separator 130, whereas the external natural light 125 is absorbed in the polarization plate 165. As a result, in both cases, no light is emitted from the liquid crystal display device towards the observer. In the applied-voltage section 110 on the left side, the unpolarized light 111 from the light source 190 is emitted from the upper polarized-light separator 130 as the emitting light 112, whereas the external natural light 115 is emitted from the upper polarized-light separator 130 as the emitting light 116. As a result, in both cases, light is emitted from the liquid crystal device towards the observer hence the same display state based on the on-off state of the TN liquid crystal 140 is achieved by both the external light and the light from the light source 190. Accordingly, no so-called negative-positive reversion will occur between the display with the external light and the display with the light from the light source 190.

Referring now to FIGS. 7 and 8, a TN liquid crystal 140 is used as the polarization-changing optical element in the liquid crystal display device. The upper polarized-light separator 300 shown in FIG. 2 is provided on the TN liquid crystal 140. A polarizer 165, a coloring layer 170 and a reflector 180 are provided under the TN liquid crystal 140 in this order. The left side of the liquid crystal display device is referred to as an applied-voltage section 110 whereas the right side as a no applied-voltage section 120 for the description.

A display by the light from the light source 190 will be described with reference to FIG. 7.

Unpolarized light reaching the upper polarized-light separator 300 from the light source 190 has been described with reference to FIG. 1C, and a brighter display state than that using a polarizer also has been described with reference to FIG. 1C.

Next, a display caused by transmission of unpolarized light from the light source 190 through the TN liquid crystal 140 etc. will be described.

In the no applied-voltage section 120 on the right side, the unpolarized light 121 from the light source 190 passes through the TN liquid crystal 140, and is converted to plane-polarized light parallel to the drawing by the polarizer 165. Part of the plane-polarized light parallel to the drawing passing through the polarizer 165 is reflected by the coloring layer 170, and is incident on the polarizer 165 again. The plane-polarized light parallel to the drawing passing through the polarizer 165 is converted to plane-polarized light perpendicular to the drawing by rotating the polarization direction by 90 degrees in TN liquid crystal 140. The plane-polarized light perpendicular to the drawing is reflected by the upper polarized-light separator 300 without modification of the polarization direction and goes towards the interior of the liquid crystal display device as reflected light 123. The other part of the plane polarized light parallel to the drawing passing through the polarizer 165 passes through the coloring layer 170 while being absorbed in this layer, and is reflected by the reflector 180. The reflected polarized light passes through the coloring layer 170 again while being absorbed in this layer. The polarized light is incident on the polarizer 165 again, and is converted to plane-polarized light perpendicular to the drawing by rotating the polarization direction by 90 degrees in the TN liquid crystal 140. The plane-polarized light perpendicular to the drawing is reflected by the upper polarized-light separator 300 without modification of the polarization direction and goes towards the interior of the liquid crystal display device as reflected light 123.

In the applied-voltage section 110 on the left side, the unpolarized light 111 from the light source 190 passes through the TN liquid crystal 140, and is converted to plane-polarized light parallel to the drawing by the polarizer 165. Part of the plane-polarized light parallel to the drawing passing through the polarizer 165 is reflected by the coloring layer 170, is incident on the polarizer 165 again, passes though the polarizer 165, the TN liquid crystal 140, and the upper polarized-light separator 300 without modification of the polarization direction, and goes towards the observation side as the emitting light 112. The other part of the plane-polarized light parallel to the drawing passing through the polarizer 165 passes through the coloring layer 170 while being absorbed in this layer, and is reflected by the reflector 180. The reflected light passes through the coloring layer 170 again while being absorbed in this layer, is incident on the polarizer 165 again, passes through the TN liquid crystal 140 without modification of the polarization direction, passes through the upper polarized-light separator 300, and goes towards the observation side without modification as emitting light 112.

A reflection-type display when external light is incident on the liquid crystal display device will now be described with reference to FIG. 8.

In the no applied-voltage section 120 on the right side, the external natural light 125 incident on the liquid crystal device passes through the upper polarized-light separator 300 without modification, and is changed to plane-polarized light perpendicular to the drawing by rotating the polarization angle by 90 degrees in the TN liquid crystal 140. The plane-polarized light perpendicular to the drawing is absorbed in the polarizer 165.

In the applied-voltage section 110 on the left side, the external natural light 115 incident on the liquid crystal display device passes through the upper polarized-light separator 300 as plane-polarized light parallel to the drawing, passes through the TN liquid crystal 140 without modification of the polarization direction, and passes through the polarizer 165. Part of the plane-polarized light parallel to the drawing passing through the polarizer 165 is reflected by the coloring layer 170 and is incident on the polarizer 165 again. The reflected plane-polarized light parallel to the drawing passing through the polarizer 165 passes through the upper polarized-light separator 300, and goes towards the observation side as the emitting light 116 without modification of the polarization direction. The other part of the plane polarized light parallel to the drawing from the polarizer 165 passes through the coloring layer 170 while being absorbed in this layer, and is reflected by the reflector 180. The reflected polarized light passes through the coloring layer 170 again while being absorbed in this layer. Then the polarized light is incident on the polarizer 165 again, passes through the polarizer 165, and passes through the TN liquid crystal 140 without modification of the polarization direction. The plane-polarized light parallel to the drawing passing through the TN liquid crystal 140 goes towards the observation side without modification as the emitting light 116.

Also, in this case, in the no applied-voltage section 120 on the right side, the unpolarized light 121 from the light source 190 is reflected towards the interior of the liquid crystal display device by the upper polarized-light separator 300, whereas the external natural light 125 is absorbed in the polarization plate 165. As a result, in both cases, no light is emitted from the liquid crystal display device towards the observer. In the applied-voltage section 110 on the left side, the unpolarized light 111 from the light source 190 is emitted from the upper polarized-light separator 300 as the emitting light 112, and the external natural light 115 is also emitted from the upper polarized-light separator 300 as the emitting light 116. As a result, in both cases, light is emitted from the liquid crystal device towards the observer hence the same display state based on the on-off state of the TN liquid crystal 140 is achieved by both the external light and the light from the light source 190. Accordingly, no so-called negative-positive reversion will occur between the display with the external light and the display with the light from the light source 190.

In the liquid crystal display devices shown in FIGS. 3 to 8, the coloring layer 170 can be omitted. In this case, the plane-polarized light parallel to the drawing, which passes through the polarizer 165, is reflected directly by the reflector 180 without being colored by the coloring layer 170, and passes through the polarizer 165 again. The light passes through the upper polarized-light separator 130 or 300 and goes towards the observation side as emitting light 112 or 116.

Referring now to FIGS. 9 and 10, a TN liquid crystal 140 is used as the polarization-changing optical element in this liquid crystal display device. An upper polarized-light separator 130 including the (¼)λ plate 132 and the cholesteric liquid crystal layer 134 is provided on the TN liquid crystal 140. Further, a light diffusion layer 150, a lower polarized-light separator 160 including a (¼)λ plate 162 and a cholesteric liquid crystal layer 164, a coloring layer 170, and a reflector 180 are provided under the TN element 140 in this order.

The upper polarized-light separator 130 is the same as that described in FIG. 1A. The lower polarized-light separator 160 has the same functions as the upper polarized-light separator 130. The lower polarized-light separator 160 is a polarized-light separating means which transmits plane-polarized light of a given second direction among light components incident on the (¼)λ plate 162, reflects plane-polarized light of a first direction perpendicular to the second direction, and for light incident on the cholesteric liquid crystal layer 164, can emit plane-polarized light of the second direction towards the (¼)λ plate 162. Polarized-light separating means having such a function, other than the polarized-light separator 130 including a combination of the cholesteric liquid crystal layer 164 and the (¼)λ plates 162, include that using a multilayered film (U.S. Pat. No. 4,974,219), that separating the incident light into reflected polarized light and transmitted polarized light by means of Brewster's angle (SID 92 DIGEST, pp. 427 to 429), that using holograms, and those disclosed in laid-open international patents (WO95/17692 and WO95/27919)as a reflective polarizer.

The left side of the liquid crystal display device is referred to as an applied-voltage section 110 whereas the right side is referred to as a no applied-voltage section 120 for the description.

A display by the light from the light source 190 will now be described with reference to FIG. 9.

Unpolarized light incident on the upper polarized-light separator 130 from the light source 190 has been described with reference to FIG. 1A, and a brighter display state than that using a polarizer also has been described with reference to FIG. 1A.

Next, a display caused by transmission of unpolarized light from the light source 190 through the TN liquid crystal 140 etc. will be described.

In the no applied-voltage section 120 on the right side, the unpolarized light 121 from the light source 190 passes through the TN liquid crystal 140 and the light diffusion layer 150 and is converted to right-handed circularly polarized light and left-handed circularly polarized light by the (¼)λ plate 162.

The left-handed circularly polarized light emitted from the (¼)λ plate 162 is reflected by the cholesteric liquid crystal layer 164 and reenters the (¼)λ plate 162 to be converted to plane-polarized light perpendicular to the drawing. By rotating the polarization direction by 90 degrees in the TN liquid crystal 140, the polarized light is converted into the plane-polarized light parallel to the drawing. The plane-polarized light parallel to the drawing emitted from the TN liquid crystal 140 is converted to right-handed circularly polarized light by the (¼)λ plate 132, passes through the cholesteric liquid crystal layer 134 and goes towards the observation side as the emitting light 122.

The right-handed circularly polarized light emitted from the (¼)λ plate 162 passes through the cholesteric liquid crystal layer 164. Part of the right-handed circularly polarized light from the cholesteric liquid crystal layer 164 is reflected by the coloring layer 170, by the cholesteric liquid crystal layer 164, and then by the coloring layer 170 again. The reflected light passes through the cholesteric liquid crystal layer 164 and is incident on the (¼)λ plate 162 to be converted to plane-polarized light parallel to the drawing by the (¼)λ plate 162. The plane-polarized light passes through the light diffusion layer 150, and is rotated by 90 degrees in the polarization direction in the TN liquid crystal 140 to be converted to plane-polarized light perpendicular to the drawing. The plane-polarized light is converted to left-handed circularly polarized light by the (¼)λ plate 132, and reflected by the cholesteric liquid crystal layer 134. The reflected light is incident on the (¼)λ plate 132 again to be converted to plane-polarized light perpendicular to the drawing by the (¼)λ plate 132. The plane-polarized light goes towards the interior of the liquid crystal display device as reflected light 123. The other part of the right-handed circularly polarized light from the cholesteric liquid crystal layer 164 passes through the coloring layer 170 while being absorbed in the coloring layer 170, and is reflected by the reflector 180. The reflected light passes through the coloring layer 170 while being absorbed in the coloring layer 170, and then is reflected by the cholesteric liquid crystal layer 164. The light passes through the coloring layer 170 while being absorbed in the coloring layer 170, and is reflected by the reflector 180 again. The reflected light passes through the coloring layer 170 while being absorbed in the coloring layer 170 and passes through cholesteric liquid crystal layer 164. The light is incident on the (¼)λ plate 162 to be converted to plane-polarized light parallel to the drawing by the (¼)λ plate 162. After the plane-polarized light passes through the light diffusion layer 150, it is converted to plane-polarized light perpendicular to the drawing by rotating the polarization direction by 90 degrees in the TN liquid crystal 140. The plane-polarized light is converted to left-handed circularly polarized light by the (¼)λ plate 132. The left-handed circularly polarized light is reflected by the cholesteric liquid crystal layer 134, and incident on the (¼)λ plate 132 to be converted to plane-polarized light perpendicular to the drawing by the (¼)λ plate 132. The plane-polarized light goes toward the interior of the liquid crystal display device as reflected light 123.

As described above, when no voltage is applied, the light from the light source 190 is reflected by the polarized-light separator 160 and emitted as emitting light 122. Hence a bright display state is achieved. Because the light diffusion layer 150 is provided between the (¼)λ plate 162 and the TN liquid crystal 140, the reflected light from the lower polarized-light separator 160 changes from a mirror state to white.

In the applied-voltage section 110 on the left side, the unpolarized light 111 from the light source 190 passes through the TN liquid crystal 140 and the light diffusion layer 150, and is converted to right-handed circularly polarized light and left-handed circularly polarized light by the (¼)λ plate 162.

The left-handed circularly polarized light emitted from the (¼)λ plate 162 is reflected by the cholesteric liquid crystal layer 164 and incident on the (¼)λ plate 162 again to be converted to plane-polarized light perpendicular to the drawing by the (¼)λ plate 162. The plane-polarized light passes through the TN liquid crystal 140 without modification of the polarization direction and is converted to left-handed circularly polarized light by the (¼)λ plate 132. The left-handed circularly polarized light is reflected by the cholesteric liquid crystal layer 134 and is incident on the (¼)λ plate 132 again to be converted to plane-polarized light perpendicular to the drawing by the (¼)λ plate 132. The plane-polarized light goes towards the interior of the liquid crystal display device as reflected light 113.

The right-handed circularly polarized light emitted from the (¼)λ plate 162 passes through the cholesteric liquid crystal layer 164. Part of the right-handed circularly polarized light from the cholesteric liquid crystal layer 164 is reflected by the coloring layer 170, the cholesteric liquid crystal layer 164, and then the coloring layer 170 again. The reflected light passes through the cholesteric liquid crystal layer 164 and is incident on the (¼)λ plate 162 to be converted to plane-polarized light parallel to the drawing by the (¼)λ plate 162. The plane-polarized light passes through the light diffusion layer 150 and the TN liquid crystal 140 without modification of the polarization direction, and is converted to right-handed circularly polarized light by the (¼)λ plate 132. The right-handed circularly polarized light passes through the cholesteric liquid crystal layer 134 and goes towards the observation side as emitting light 112. On the other hand, the other part of the right-handed circularly polarized light from the cholesteric liquid crystal layer 164 passes through the coloring layer 170 while being absorbed in the coloring layer 170, and is reflected by the reflector 180. The reflected light passes through the coloring layer 170 while being absorbed in the coloring layer 170 again, and then is reflected by the cholesteric liquid crystal layer 164. The reflected light passes through the coloring layer 170 while being absorbed in the coloring layer 170 again, is reflected by the reflector 180 again, passes through the coloring layer 170 while being absorbed in the coloring layer 170, passes through the cholesteric liquid crystal layer 164, and is incident on the (¼)λ plate 162. After the reflected light is converted to plane-polarized light parallel to the drawing by the (¼)λ plate 162, it passes through the light diffusion layer 150 and through the TN liquid crystal 140 without modification of the polarization direction. The plane-polarized light is converted to right-handed circularly polarized light by the (¼)λ plate 132, passes through the cholesteric liquid crystal layer 134, and goes towards the observation side as emitting light 112.

A reflection-type display when external light is incident on the liquid crystal display device will now be described with reference to FIG. 10.

In the no applied-voltage section 120 on the right side, the external natural light 125 incident on the liquid crystal device is converted to plane-polarized light parallel to the drawing by the upper polarized-light separator 130 and then converted to plane-polarized light perpendicular to the drawing by rotating the polarization angle by 90 degrees in the TN liquid crystal 140. The plane-polarized light perpendicular to the drawing emitted from the TN liquid crystal 140 is converted to left-handed circularly polarized light by the (¼)λ plate 162. The left-handed circularly polarized light is reflected by the cholesteric liquid crystal layer 164, and is incident on the (¼)λ plate 162 again to be converted to plane-polarized light perpendicular to the drawing by the (¼)λ plate 162, which is rotated by 90 degrees in the polarization angle in the TN liquid crystal 140 to generate plane-polarized light parallel to the drawing. The plane-polarized light from the TN liquid crystal 140 is converted to right-handed circularly polarized light by the (¼)λ plate 132. The right-handed circularly polarized light passes through the cholesteric liquid crystal layer 134 and goes towards the observation side as emitting light 126.

In the applied-voltage section 110 on the left side, the external natural light 115 incident on the liquid crystal display device is converted to plane-polarized light parallel to the drawing in the upper polarized-light separator 130. The plane-polarized light parallel to the drawing passes through the TN liquid crystal 140 without modification of the polarization direction, and is converted to right-handed circularly polarized light by the (¼)λ plate 162. The right-handed circularly polarized light from the (¼)λ plate 162 passes through the cholesteric liquid crystal 164. Part of the right-handed circularly polarized light is reflected by the coloring layer 170, by the cholesteric liquid crystal layer 164, and then by the coloring layer 170 again. The reflected light passes through the cholesteric liquid crystal layer 164 and is incident on the (¼)λ plate 162 to be converted to plane-polarized light parallel to the drawing by the (¼)λ plate 162. The plane-polarized light passes through the light diffusion layer 150 and the TN liquid crystal layer 140 without modification of the polarization direction, and is converted to right-handed circularly polarized light by the (¼)λ plate 132. The right-handed circularly polarized light passes through the cholesteric liquid crystal layer 134 and goes towards the observation side as emitting light 116. The other part of the right-handed circularly polarized light passing through the cholesteric liquid crystal layer 164 passes through the coloring layer 170 while being absorbed in this layer, and is reflected by the reflector 180. The polarized light passes through the coloring layer 170 again while being absorbed in this layer, and is reflected by the cholesteric liquid crystal layer 164. The reflected light passes through the coloring layer 170 again while being absorbed in this layer, is reflected by the reflector 180, passes through the coloring layer 170 again while being absorbed in this layer, and passes through the cholesteric liquid crystal layer 164. The light is incident on the (¼)λ plate 162 and converted to plane-polarized light parallel to the drawing by the (¼)λ plate 162. The plane-polarized light parallel to the drawing passes through the light diffusion layer 150 and passes through the TN liquid crystal 140 without modification of the polarization direction. The light is converted to right-handed circularly polarized light by the (¼)λ plate 132, passes through the cholesteric liquid crystal layer 134, and goes towards the observation side as emitting light 116.

In the no applied-voltage section 120 on the right side, as described above, the unpolarized light 121 from the light source 190 is reflected towards the exterior of the liquid crystal display device by the lower polarized-light separator 160, passes through the upper polarized-light separator 130, and is emitted from the upper polarized-light separator 130 as the emitting light 122. The external natural light 125 is reflected towards the exterior of the liquid crystal display device by the lower polarized-light separator 160, passes through the upper polarized-light separator 130, and is emitted from the upper polarized-light separator 130 as the emitting light 126. As a result, in both cases, the light is changed from mirror state to white by means of the light diffusion layer 150, and is emitted from the upper polarized-light separator 130 towards the observer. In the applied-voltage section 110 on the left side, the unpolarized light ill from the light source 190 passes through the lower polarized-light separator 160, and is colored in the coloring layer 170. The colored light passes through the lower polarized-light separator 160 again, passes through the upper polarized-light separator 130, and is emitted from the upper polarized-light separator as the emitting light 112. The external natural light 115 passes through the upper polarized-light separator 130 and lower polarized-light separator 160, and is colored in the coloring layer 170. The colored light passes through the lower polarized-light separator 160 and the upper polarized-light separator 130 again, and is emitted from the upper polarized-light separator 130 as the emitting light 116. As a result, in both cases, the light colored in the coloring layer 170 is emitted from the upper polarized-light separator 130 towards the observer. Hence the same display state based on the on-off state of the TN liquid crystal 140 is achieved by both the external light and the light from the light source 190. Accordingly, no so-called negative-positive reversion will occur between the display with the external light and the display with the light from the light source 190.

When no voltage is applied, the lower polarized-light separator 160 reflects the light from the light source 190 and the light is emitted as the emitting light 122. The lower polarized-light separator 160 also reflects the external natural light 125 and the light is emitted as the emitting light 126. Accordingly, a bright display state is achieved. Since the light diffusion layer 150 is provided between the (¼)λ plate 162 and the TN liquid crystal 140, the reflected light from the lower polarized-light separator 160 changes from a mirror state to white.

As described above, in the no applied-voltage section 120, the light reflected by the lower polarized-light separator 160 is scattered in the light diffusion layer 150 to be white emitting light 122 or 126, whereas in the applied-voltage section 110, the light from the lower polarized-light separator 160 is colored in the coloring layer 170 to be color emitting light 112 or 116. As a result, a color display is achieved on a white background. When using a black coloring layer 170, all the wavelengths in the visible light region are absorbed. Therefore, a black display on the white background is achieved.

Since the reflector 180 is provided, the color emitting light 112 or 116, which is colored in the coloring layer 170, is bright.

Referring to now FIGS. 11 and 12, a TN liquid crystal 140 is used as the polarization-changing optical element in the liquid crystal display device. The upper polarized-light separator 130 including the (¼)λ plates 132 and 136 and the cholesteric liquid crystal layer 134 is provided on the TN liquid crystal 140. The light diffusion layer 150, the lower polarized-light separator 160 including the (¼)λ plates 162 and 166 and the cholesteric liquid crystal layer 164, the coloring layer 170, and the reflector 180 are provided under the TN liquid crystal 140 in this order.

The upper polarized-light separator 130 is the same as that described in FIG. 1B. The lower polarized-light separator 160 has the same functions as the upper polarized-light separator 130. The lower polarized-light separator 160 is a polarized-light separating means which transmits plane-polarized light of a given second direction among light components incident on the (¼)λ plate 162 as plane-polarized light of a second direction, reflects plane-polarized light of a first direction perpendicular to the second direction, and for light incident on the (¼)λ plate 166, emits plane-polarized light of the second direction towards the (¼)λ plate 162. Polarized-light separating means having such a function, other than the polarized-light separator 160 including a combination of the cholesteric liquid crystal layer 164 and the (¼)λ plates 162 and 166, include that using a multilayered film (U.S. Pat. No. 4,974,219), that separating the incident light into reflected polarized light and transmitted polarized light by means of Brewster's angle (SID 92 DIGEST, pp. 427 to 429), that using holograms, and reflective polarizers disclosed in laid-open international patents (WO95/17692 and WO95/27919) as a reflective polarizer.

The left side of the liquid crystal display device is referred to as an applied-voltage section 110 whereas the right side is referred to as a no applied-voltage section 120 for the description.

A display by the light from the light source 190 will now be described with reference to FIG. 11.

Unpolarized light incident on the upper polarized-light separator 130 from the light source 190 has been described with reference to FIG. 1B, and a brighter display state than that using a polarizer also has been described with reference to FIG. 1B.

Next, a display caused by transmission of unpolarized light from the light source 190 through the TN liquid crystal 140 etc. will be described.

In the no applied-voltage section 120 on the right side, the unpolarized light 121 from the light source 190 passes through the TN liquid crystal 140 and the light diffusion layer 150, and is converted to right-handed circularly polarized light and left-handed circularly polarized light by the (¼)λ plate 162.

The left-handed circularly polarized light emitted from the (¼)λ plate 162 is reflected by the cholesteric liquid crystal layer 164 and reenters the (¼)λ plate 162 to be converted to plane-polarized light perpendicular to the drawing by the (¼)λ 162. The polarized light is rotated by 90 degrees in the polarization angle in the TN liquid crystal 140 to be plane-polarized light parallel to the drawing from the TN liquid crystal 140, and is converted to right-handed circularly polarized light by the (¼)λ plate 132. The light passes through the cholesteric liquid crystal layer 134, is converted to the plane-polarized light parallel to the drawing again by the (¼)λ plate 136, and goes towards the observation side as the emitting light 122.

The right-handed circularly polarized light emitted from the (¼)λ plate 162 passes through the cholesteric liquid crystal 164. The right-handed circularly polarized light passing through the cholesteric liquid crystal 164 is converted to plane-polarized light parallel to the drawing by the (¼)λ plate 166. Part of the plane-polarized light parallel to the drawing emitted from the (¼)λ plate 166 is reflected by the coloring layer 170, and passes through the (¼)λ plate 166. The plane-polarized light is converted to right-handed circularly polarized light by the (¼)λ plate 166. The right-handed circularly polarized light passing through the cholesteric liquid crystal layer 164 is converted to plane-polarized light parallel to the drawing again by the (¼)λ plate 162. The plane-polarized light passes through the light diffusion layer 150, and is rotated by 90 degrees in the polarization angle in the TN liquid crystal 140 to be converted to plane-polarized light perpendicular to the drawing. The plane-polarized light is converted to left-handed circularly polarized light by the (¼)λ plate 132, and reflected by the cholesteric liquid crystal layer 134. The reflected light is incident on the (¼)λ plate 132 again to be converted to plane-polarized light perpendicular to the drawing by the (¼)λ plate 132, and goes towards the interior of the liquid crystal display device as reflected light 123. The other part of the plane-polarized light parallel to the drawing emitted from the (¼)λ plate 166 passes through the coloring layer 170 while being absorbed in the coloring layer 170, and is reflected by the reflector 180. The reflected light passes through the coloring layer 170 while being absorbed in the coloring layer 170 again, and then passes through the (¼)λ plate 166 to be converted to right-handed circularly polarized light by the (¼)λ plate 166. The right-handed circularly polarized light passes through the cholesteric liquid crystal layer 164, and is converted to plane-polarized light parallel to the drawing again by the (¼)λ plate 162. The plane-polarized light passes through the light diffusion layer 150, and is rotated by 90 degrees in the polarization angle to be the plane-polarized light perpendicular to the drawing in the TN liquid crystal 140. The plane-polarized light perpendicular to the drawing is converted to left-handed circularly polarized light by the (¼)λ plate 132. The left-handed circularly polarized light is reflected by the cholesteric liquid crystal layer 134, and is incident on the (¼)λ plate 132 to be converted to plane-polarized light perpendicular to the drawing by the (¼)λ plate 132. The plane-polarized light goes towards the interior of the liquid crystal display device as reflected light 123.

As described above, when no voltage is applied, the light from the light source 190 is reflected by the lower polarized-light separator 160 and emitted as the emitting light 122, hence a bright display state is achieved. Because the light diffusion layer 150 is provided between the (¼)λ plate 162 and the TN liquid crystal 140, the reflected light from the lower polarized-light separator 160 changes from a mirror state to white.

In the applied-voltage section 110 on the left side, the unpolarized light 111 from the light source 190 passes through the TN liquid crystal 140 and the light diffusion layer 150, and is converted to right-handed circularly polarized light and left-handed circularly polarized light by the (¼)λ plate 162.

The left-handed circularly polarized light emitted from the (¼)λ plate 162 is reflected by the cholesteric liquid crystal layer 164 and is incident on the (¼)λ plate 162 again to be converted to plane-polarized light perpendicular to the drawing by the (¼)λ plate 162. The plane-polarized light passes through the light diffusion layer 150, passes through the TN liquid crystal 140 without modification of the polarization direction, and is converted to left-handed circularly polarized light by the (¼)λ plate 132. The left-handed circularly polarized light is reflected by the cholesteric liquid crystal layer 134 and is incident on the (¼)λ plate 132 again to be converted to plane-polarized light perpendicular to the drawing by the (¼)λ plate 132. The plane-polarized light goes towards the interior of the liquid crystal display device as reflected light 123.

The right-handed circularly polarized light emitted from the (¼)λ plate 162 passes through the cholesteric liquid crystal layer 164. The right-handed circularly polarized light passing through the cholesteric liquid crystal layer 164 is converted to plane-polarized light parallel to the drawing by the (¼)λ plate 166. Part of the plane-polarized light parallel to the drawing emitted from the (¼)λ plate 166 is reflected by the coloring layer 170, passes through the (¼)λ plate 166, and is converted to right-handed circularly polarized light by the (¼)λ plate 166. The right-handed circularly polarized light passes through the cholesteric liquid crystal layer 164, and then is converted to the plane-polarized light parallel to the drawing again by the (¼)λ plate 162. The plane-polarized light passes through the light diffusion layer 150, passes through the TN liquid crystal 140 without modification of the polarization direction, and is converted to right-handed circularly polarized light by the (¼)λ plate 132. The right-handed circularly polarized light passes through the cholesteric liquid crystal layer 134 and is converted to plane-polarized light parallel to the drawing again by the (¼)λ plate 136. The plane-polarized light goes towards the observation side as emitting light 112. On the other hand, the other part of the plane-polarized light parallel to the drawing emitted from the (¼)λ plate 166 passes through the coloring layer 170 while being absorbed in the coloring layer 170, and is reflected by the reflector 180. The reflected light passes through the coloring layer 170 while being absorbed in the coloring layer 170 again, passes through the (¼)λ plate 166, and is converted to right-handed circularly polarized light by the (¼)λ plate 166. The right-handed circularly polarized light from the (¼)λ plate 166 passes through cholesteric liquid crystal layer 164, and is converted to plane-polarized light parallel to the drawing by the (¼)λ plate 162. The plane-polarized light passes through the light diffusion layer 150, passes through the TN liquid crystal 140 without modification of the polarization direction, and is converted to right-handed circularly polarized light by the (¼)λ plate 132. The converted light passes through the cholesteric liquid crystal layer 134 and is converted to plane-polarized light parallel to the drawing again by the (¼)λ plate 136. The plane-polarized light parallel to the drawing goes towards the observation side as emitting light 112.

A reflection-type display when external light is incident on the liquid-crystal display device will now be described with reference to FIG. 12.

In the no applied-voltage section 120 on the right side, the external natural light 125 incident on the liquid crystal device is converted to plane-polarized light parallel to the drawing by the upper polarized-light separator 130 and then to plane-polarized light perpendicular to the drawing by rotating the polarization angle by 90 degrees in the TN liquid crystal 140. The plane-polarized light perpendicular to the drawing emitted from the TN liquid crystal passes through the light diffusion layer 150, and is converted to left-handed circularly polarized light by the (¼)λ plate 162. The left-handed circularly polarized light emitted from the (¼)λ plate 162 is reflected by the cholesteric liquid crystal layer 164, is incident on the (¼)λ plate 162 again, and is converted to plane-polarized light perpendicular to the drawing by the (¼)λ plate 162. The plane-polarized light passes through the light diffusion layer 150, and is rotated by 90 degrees in the polarization angle in the TN liquid crystal 140 to generate plane-polarized light parallel to the drawing. The plane-polarized light emitted from the TN liquid crystal 140 is converted to right-handed circularly polarized light by the (¼)λ plate 132. The right-handed circularly polarized light passes through the cholesteric liquid crystal layer 134 and is converted to the plane-polarized light parallel to the drawing by the (¼)λ plate 136 again. The plane-polarized light parallel to the drawing goes towards the observation side as emitting light 126.

As described above, when no voltage is applied, the external natural light 125 is reflected by the lower polarized-light separator 160, and emitted as the emitting light 126. Hence a bright display state is achieved. Because the light diffusion layer 150 is provided between the (¼)λ plate 162 and the TN liquid crystal 140, the reflected light from the lower polarized-light separator 160 changes from a mirror state to white.

In the applied-voltage section 110 on the left side, the external natural light 115 incident on the liquid crystal display device is converted to plane-polarized light parallel to the drawing in the upper polarized-light separator 130. The plane-polarized light parallel to the drawing passes through the TN liquid crystal 140 and the light diffusion layer 150 without modification of the polarization direction, and is converted to right-handed circularly polarized light by the (¼)λ plate 162. The right-handed circularly polarized light emitted from the (¼)λ plate 162 passes through the cholesteric liquid crystal 164, and is converted to plane-polarized light parallel to the drawing by the (¼)λ plate 166. Part of the plane-polarized light parallel to the drawing emitted from the (¼)λ plate 166 is reflected by the coloring layer 170, passes through the (¼)λ plate 166, and is converted to right-handed circularly polarized light by the (¼)λ plate 166. The right-handed circularly polarized light passes through the cholesteric liquid crystal layer 164, and is converted to plane-polarized light parallel to the drawing by the (¼)λ plate 162 again. The plane-polarized light parallel to the drawing passes through the light diffusion layer 150, passes through the TN liquid crystal layer 140 without modification of the polarization direction, and is converted to right-handed circularly polarized light by the (¼)λ plate 132. The right-handed circularly polarized light passes through the cholesteric liquid crystal layer 134 and goes towards the observation side as emitting light 116. The other part of the plane-polarized light passing through the (¼)λ plate 166 passes through the coloring layer 170 while being absorbed in this layer, and is reflected by the reflector 180. The polarized light passes through the coloring layer 170 again while being absorbed in this layer, passes through the (¼)λ plate 166, and is converted to right-handed circularly polarized light by the (¼)λ plate 166. The right-handed circularly polarized light passes through the cholesteric liquid crystal layer 164 and is converted to the plane-polarized light parallel to the drawing again by the (¼)λ plate 162. The plane-polarized light parallel to the drawing passes through the light diffusion layer 150 and passes through the TN liquid crystal 140 without modification of the polarization direction. The light is converted to right-handed circularly polarized light by the (¼)λ plate 132, passes through the cholesteric liquid crystal layer 134, and goes towards the observation side as emitting light 116.

In the no applied-voltage section 120 on the right side, as described above, the unpolarized light 121 from the light source 190 is reflected towards the exterior of the liquid crystal display device by the lower polarized-light separator 160, passes through the upper polarized-light separator 130, and is emitted from the upper polarized-light separator 130 as the emitting light 122. The external natural light 125 is reflected towards the exterior of the liquid crystal display device by the lower polarized-light separator 160, passes through the upper polarized-light separator 130, and is emitted from the upper polarized-light separator 130 as the emitting light 126. As a result, in both cases, the light is changed from a mirror state to white by means of the light diffusion layer 150, and is emitted from the upper polarized-light separator 130 towards the observer. In the applied-voltage section 110 on the left side, the unpolarized light 111 from the light source 190 passes through the lower polarized-light separator 160, is colored in the coloring layer 170, passes through the lower polarized-light separator 160 again, and is emitted from the upper polarized-light separator 160 as the emitting light 112. The external natural light 115 passes through the upper polarized-light separator 130 and lower polarized-light separator 160, and is colored in the coloring layer 170. The colored light passes through the lower polarized-light separator 160 and the upper polarized-light separator 130 again, and is emitted from the upper polarized-light separator 130 as the emitting light 116. As a result, in both cases, the colored light in the coloring layer 170 is emitted from the upper polarized-light separator 130 towards the observer. Hence the same display state based on the on-off state of the TN liquid crystal 140 is achieved by both the external light and the light from the light source 190. Accordingly, no so-called negative-positive reversion will occur between the display with the external light and the display with the light from the light source 190.

When no voltage is applied, the lower polarized-light separator 160 reflects the light 121 from the light source 190 and the light is emitted as the emitting light 122. The lower polarized-light separator 160 also reflects the external natural light 125 and the light is emitted as the emitting light 126. Accordingly, a bright display state is achieved. Since the light diffusion layer 150 is provided between the (¼)λ plate 162 and the TN liquid crystal 140, the reflected light from the lower polarized-light separator 160 changes from a mirror state to white.

As described above, in the no applied-voltage section 120, the light reflected by the lower polarized-light separator 160 is scattered in the light diffusion layer 150 to be white emitting light 122 or 126, whereas in the applied-voltage section 110, the light passing through the lower polarized-light separator 160 is colored in the coloring layer 170 to be color emitting light 112 or 116. As a result, a color display is achieved on a white background. When using a black coloring layer 170, all the wavelengths in the visible light region are absorbed, and hence a black display on a white background is achieved.

Since the reflector 180 is provided, the color emitting light 112 or 116, which is colored in the coloring layer 170, is bright.

Referring now to FIGS. 13 and 14, a TN liquid crystal 140 is used as the polarization-changing optical element in the liquid crystal display device. The upper polarized-light separator 300 shown in FIG. 1C is provided on the TN liquid crystal 140. A light diffusion layer 150, a lower polarized-light separator 310, a coloring layer 170, and a reflector 180 are provided under the TN liquid crystal 140 in this order. The lower polarized-light separator 310 is of the same type as that of the upper polarized-light separator 300.

The upper polarized-light separator 300 is the same as that described in FIG. 1C. The lower polarized-light separator 310 has the same functions as the upper polarized-light separator 300. Polarized-light separating means having such a function, other than the polarized-light separator 160 including a combination of the cholesteric liquid crystal layer 164 and the (¼)λ plates 162 and 166, include that using a multilayered film (U.S. Pat. No. 4,974,219), that separating the incident light into reflected polarized light and transmitted polarized light by means of Brewster's angle (SID 92 DIGEST, pp. 427 to 429), and that using holograms.

The left side of the liquid crystal display device is referred to as an applied-voltage section 110 whereas the right side is referred to as a no applied-voltage section 120 for the description.

A display by the light from the light source 190 will now be described with reference to FIG. 13.

Unpolarized light incident on the upper polarized-light separator 300 from the light source 190 has been described with reference to FIG. 1C, and a brighter display state than that using a polarizer also has been described with reference to FIG. 1C.

Next, a display caused by transmission of unpolarized light from the light source 190 through the TN liquid crystal 140 etc. will be described.

In the no applied-voltage section 120 on the right side, the unpolarized light 121 from the light source 190 passes through the TN liquid crystal 140 and the light diffusion layer 150.

Plane-polarized light perpendicular to the drawing among the light components passing through the light diffusion layer 150 is reflected by the lower polarized-light separator 310, and is converted to plane-polarized light parallel to the drawing by the TN liquid crystal 140 by rotating the polarization direction by 90 degrees. Plane-polarized light parallel to the drawing passing through the light diffusion layer 150 passes through the lower polarized-light separator 310 and is emitted towards the observer as emitting light 122 without modification of the polarization direction.

Part of the plane-polarized light parallel to the drawing passing through the lower polarized-light separator 310 is reflected by the coloring layer 170, and passes through the lower polarized-light separator 310. The plane-polarized light parallel to the drawing is converted to plane-polarized light perpendicular to the drawing by the TN liquid crystal 140 by rotating the polarization angle by 90 degrees. The plane-polarized light perpendicular to the drawing is reflected by the upper polarized-light separator 300 without modification and goes towards the interior of the liquid crystal display device as reflected light 123. The other part of the plane-polarized light parallel to the drawing passing through the lower polarized-light separator 310 passes through the coloring layer 170 while being absorbed in this layer, and is reflected by the reflector 180. The reflected light passes through the coloring layer 170 again while being absorbed in this layer, and passes through the lower polarized-light separator 310 and the light diffusion layer 150 without modification of the polarization direction. The plane-polarized light parallel to the drawing is converted to plane-polarized light perpendicular to the drawing in the TN liquid crystal 140 by rotating the polarization direction by 90 degrees. The plane-polarized light perpendicular to the drawing is reflected by the upper polarized-light separator 300, and goes towards the interior of the liquid crystal display device as emitting light 123.

As described above, when no voltage is applied, the light from the light source 190 is reflected by the lower polarized-light separator 310 and emitted as the emitting light 122. Hence a bright display state is achieved. Because the light diffusion layer 150 is provided between the lower polarized-light separator 310 and the TN liquid crystal 140, the reflected light from the lower polarized-light separator 310 changes from a mirror state to white.

In the applied-voltage section 110 on the left side, the unpolarized light 111 from the light source 190 passes through the TN liquid crystal 140 and the light diffusion layer 150.

Plane-polarized light perpendicular to the drawing from the light diffusion layer 150 is reflected by the lower polarized-light separator 310, and passes through the light diffusion layer 150 and the TN liquid crystal 140 without modification of the polarization direction. The plane-polarized light perpendicular to the drawing is reflected by the upper polarized-light separator 300 without modification, and goes towards the interior of the liquid crystal display device as reflected light 113.

Part of the plane-polarized light parallel to the drawing passing through the lower polarized-light separator 310 is reflected by the coloring layer 170, passes through the lower polarized-light separator 310, the light diffusion layer 150, the TN liquid crystal 140, and the upper polarized-light separator 300 without modification of the polarization direction, and goes towards the observer as emitting light 112. On the other hand, the other part of the plane-polarized light parallel to the drawing emitted from the lower polarized-light separator 310 passes through the coloring layer 170 while being absorbed in the coloring layer 170, and is reflected by the reflector 180. The reflected light passes through the coloring layer 170 while being absorbed in the coloring layer 170 again, and passes through the lower polarized-light separator 310, the light diffusion layer 150, the TN liquid crystal 140, and the upper polarized-light separator 300 without modification of the polarization direction. The plane-polarized light parallel to the drawing goes towards the observation side as emitting light 112.

A reflection-type display when external light is incident on the liquid crystal display device will now be described with reference to FIG. 14.

In the no applied-voltage section 120 on the right side, the external natural light 125 incident on the liquid crystal device is converted to plane-polarized light parallel to the drawing by the upper polarized-light separator 300 and then converted to plane-polarized light perpendicular to the drawing by rotating the polarization angle by 90 degrees in the TN liquid crystal 140. The plane-polarized light perpendicular to the drawing emitted from the TN liquid crystal 140 passes through the light diffusion layer 150, and is reflected by the lower polarized-light separator 310. The reflected light passes through the light diffusion layer 150 without modification, and is rotated by 90 degrees in the polarization angle in the TN liquid crystal 140 to generate plane-polarized light parallel to the drawing. The plane-polarized light parallel to the drawing from the TN liquid crystal 140 passes through the lower polarized-light separator 310 without modification of the polarization direction, and goes towards the observation side as emitting light 126.

As described above, when no voltage is applied, the external natural light 125 is reflected by the lower polarized-light separator 310, and emitted as the emitting light 126. Hence a bright display state is achieved. Because the light diffusion layer 150 is provided between the lower polarized-light separator 310 and the TN liquid crystal 140, the reflected light from the lower polarized-light separator 310 changes from a mirror state to white.

In the applied-voltage section 110 on the left side, the external natural light 115 incident on the liquid crystal display device is converted to plane-polarized light parallel to the drawing in the upper polarized-light separator 300. The plane-polarized light parallel to the drawing passes through the TN liquid crystal 140, the light diffusion layer 150, and the lower polarized-light separator 310 without modification of the polarization direction. Part of the plane-polarized light parallel to the drawing passing through the lower polarized-light separator 310 is reflected by the coloring layer 170, and passes through the lower polarized-light separator 310, the light diffusion layer 150, the TN liquid crystal 140, and the upper polarized-light separator 300 without modification of the polarization direction. The plane-polarized light parallel to the drawing goes towards the observation side as emitting light 116. The other part of the plane-polarized light passes through the coloring layer 170 while being absorbed in this layer, and is reflected by the reflector 180. The reflected light passes through the coloring layer 170 again while being absorbed in this layer, and passes through the lower polarized-light separator 310, the light diffusion layer 150 and the TN liquid crystal 140 without modification of the polarization direction. The plane-polarized light parallel to the drawing passing through the upper polarized-light separator 300 goes towards the observation side as emitting light 116.

In the no applied-voltage section 120 on the right side, as described above, the unpolarized light 121 from the light source 190 is reflected towards the exterior of the liquid crystal display device by the lower polarized-light separator 310, passes through the upper polarized-light separator 300, and is emitted from the upper polarized-light separator 300 as the emitting light 122. The external natural light 125 is reflected towards the exterior of the liquid crystal display device by the lower polarized-light separator 310, passes through the upper polarized-light separator 300, and is emitted from the upper polarized-light separator 300 as the emitting light 126. As a result, in both cases, the light is changed from a mirror state to white by means of the light diffusion layer 150, and is emitted from the upper polarized-light separator 300 towards the observer. In the applied-voltage section 110 on the left side, the unpolarized light 111 from the light source 190 passes through the lower polarized-light separator 310, is colored in the coloring layer 170, passes through the lower polarized-light separator 310 again, passes through the upper polarized-light separator 300, and is emitted from the upper polarized-light separator 300 as the emitting light 112. The external natural light 115 passes through the upper polarized-light separator 300 and lower polarized-light separator 310, and is colored in the coloring layer 170. The colored light passes through the lower polarized-light separator 310 and the upper polarized-light separator 300 again, and is emitted from the upper polarized-light separator 300 as the emitting light 116. As a result, in both cases, the light is colored in the coloring layer 170, and is emitted from the upper polarized-light separator 300 towards the observer. Hence, the same display state based on the on-off state of the TN liquid crystal 140 is achieved by both the external light and the light from the light source 190. Accordingly, no so-called negative-positive reversion will occur between the display with the external light and the display with the light from the light source 190.

When no voltage is applied, the lower polarized-light separator 310 reflects the light 121 from the light source 190 and the light is emitted as the emitting light 122. The lower polarized-light separator 310 also reflects the external natural light 125 and the light is emitted as the emitting light 126. Accordingly, a bright display state is achieved. Since the light diffusion layer 150 is provided between the lower polarized-light separator 310 and the TN liquid crystal 140, the reflected light from the lower polarized-light separator 310 changes from a mirror state to white.

As described above, in the no applied-voltage section 120, the light reflected by the lower polarized-light separator 310 is scattered in the light diffusion layer 150 to be white emitting light 122 or 126, whereas in the applied-voltage section 110, the light passing through the lower polarized-light separator 310 is colored in the coloring layer 170 to be color emitting light 112 or 116. As a result, a color display is achieved on a white background. When using a black coloring layer 170, all of the wavelengths in the visible light region are absorbed, and hence a black display on a white background is achieved.

Since the reflector 180 is provided, the color emitting light 112 or 116, which is colored in the coloring layer 170, is bright.

Although the TN liquid crystal 140 has been described above as an example of the present invention, when using other liquid crystal, in which the polarization axis changes with the voltage, e.g. a STN liquid crystal or an electrically controlled birefringence (ECB) liquid crystal, the basic operational principle is the same.

The present invention, based on the above-mentioned operational principle, provides a display device comprising:

a polarization-changing means capable of changing a polarization axis;

a first polarized-light separating means provided on one side of the polarization changing means and an optical means (optical device) provided on the other side of the polarization-changing means, with the polarization-changing means between; and a light source capable of illuminating between the first polarized-light separating means and the optical means;

wherein the first polarized-light separating means transmits plane-polarized light of a given first direction among the light, which is incident from the polarization-changing means, towards the opposite side from the polarization-changing means, reflects plane-polarized light of a given second direction perpendicular to the given first direction towards the polarization-changing means, and emits light, which is incident on the opposite side from the polarization-changing means of the first polarized-light separating means, towards the polarization-changing means as the plane-polarized light of the given first direction; and the optical means separates light, which is incident on the polarization-changing means, into plane-polarized light of a given third direction and plane-polarized light of a given fourth direction perpendicular to the given third direction, and emits at least one of the plane-polarized light of the given third direction and the plane-polarized light of the given fourth direction towards the polarization-changing means.

In the present invention, the first polarized-light separating means transmits the plane-polarized light of the given first direction among light components incident on the polarization-changing means, and reflects, not absorbs, the plane-polarized light of the given second direction perpendicular to the first direction towards the polarization-changing means. Therefore, the plane-polarized light of the given first direction among the light components from the light source passes through towards the opposite direction of the polarization-changing means. Further, the plane-polarized light of the given second direction perpendicular to the first direction is emitted from the first polarized-light separating means towards the opposite side from the polarization-changing means after repeated reflection in the display device. A brighter display is achieved for the display using light from the light source in comparison with the case using a polarizer as the first polarized-light separating means.

Since the light source can emit light between the first polarized-light separating means and the optical means, two display states (bright and dark) obtained in response to the first and second states of the polarization axis in the polarization-changing means are the same in the display with the external light incident on the outside of the first polarized-light separating means and in the display with the light from the light source. That is, when the display by the light incident on the outside of the first polarized-light separating means is bright in the first display state of the polarization axis in the polarization-changing means, the display with the light from the light source is also bright. Further, when the display with the light incident on the outside of the first polarized-light separating means is dark in the first display state of the polarization axis in the polarization-changing means, the display with the light from the light source is also dark. Therefore, no so-called negative-positive reversion will occur between the display with the light incident on the outside of the first polarized-light separating means and the display with the light from the light source.

Preferably, the first polarized-light separating means transmits plane-polarized light of a given first direction among the light of over substantially the entire visible light wavelength range, which is incident from the polarization-changing means, towards the opposite side from the polarization-changing means, reflects plane-polarized light of a given second direction towards the polarization-changing means, and emits the plane-polarized light of the given first direction among the light of over substantially the entire visible light wavelength range, which is incident on the opposite side from the polarization-changing means, towards the polarization-changing means.

In this way, a transparent or white display can be obtained, and a display of a given color can be obtained over the entire visible light region.

Preferably, the first polarized-light separating means transmits plane-polarized light of a given first direction among the light incident from the polarization-changing means, towards the opposite side from the polarization-changing means as the plane-polarized light of the given first direction.

Preferably, the first polarized-light separating means comprises a composite member piled with a plurality of layers, and the refractive indices of the layers are substantially the same in the given first direction but are different from each other in the given second direction.

Preferably, the optical means comprises a second polarized-light separating means arranged on the polarization-changing means, and an optical element arranged against the second polarized-light separating means on the opposite side from the polarization-changing means;

the light source can emit light between the first polarized-light separating means and the second polarized-light separating means;

the second polarized-light separating means transmits the plane-polarized light of the given third direction among the light incident on the polarization-changing means, towards the optical element, reflects the plane-polarized light of the given fourth direction perpendicular to the given third direction towards the polarization-changing means, and emits the plane-polarized light of the given third direction among the light incident on the optical element, towards the polarization-changing means; and the optical element emits a given wavelength range of light among the light from the second polarized-light separating means towards the second polarized-light separating means. Preferably, the second polarized-light separating means comprises a composite member piled with a plurality of layers, and refractive indices of the layers are substantially the same in the given first direction but are different from each other in the given second direction.

In this way, two display states are obtained in response to the states of the polarization axis in the polarization-changing means, that is, a first display state with the light reflected by the second polarized-light separating means and a second display state with the light with a given wavelength range from the optical element which passes through the second polarized-light separating means. Since the first display state is reflected, not absorbed by the second polarized-light separating means, a brighter display is achieved. Also, a color display is achieved.

When the optical means is provided with the second polarized-light separating means and the optical element, it is preferable that the optical element absorbs visible light other than the given wavelength range among the light from the second polarized-light separating means, reflects the light of the given wavelength range towards the second polarized-light separating means, and simultaneously transmits the light of the given wavelength range. More preferably, the optical element is a color filter.

When the optical means is provided with the second polarized-light separating means and the optical element, and especially, when the optical element absorbs visible light other than the given wavelength range among the light from the second polarized-light separating means, reflects the light of the given wavelength range towards the second polarized-light separating means, and simultaneously transmits the light of the given wavelength range, preferably, the opposite side from the second polarized-light separating means, against the optical element, is provided with a reflecting means; and the reflecting means reflects at least the light of the given wavelength range towards the optical element.

In this way, the light from the optical element can achieve a bright display of the second polarized-light separating means.

Preferably, the optical means comprises a second polarized-light separating means arranged on the polarization-changing means, and an optical element arranged against the second polarized-light separating means on the opposite side from the polarization-changing means;

the light source can emit light between the first polarized-light separating means and the second polarized-light separating means;

the second polarized-light separating means transmits the plane-polarized light of the given third direction among the light incident on the polarization-changing means, towards the optical element, reflects the plane-polarized light of the given fourth direction perpendicular to the given third direction towards the polarization-changing means, and for the light incident on the optical element, emits the plane-polarized light of the given third direction towards the polarization-changing means ; and the optical element absorbs light of over substantially the entire visible light wavelength range from the second polarized-light separating means.

Such a configuration produces a third display state with the light reflected by the second polarized-light separating means in response to the polarization axis in the polarizing-changing means, and a black display as a fourth display state by the light absorption in the optical element of over the entire visible light region. Since the third display state is based on the light not absorbed but reflected by the second polarized-light separating means, a bright display is achieved. In this case, the optical element is preferably a black absorption member.

Preferably, the second polarized-light separating means transmits the plane-polarized light of the given third direction among the light of over substantially the entire visible light wavelength range, which is incident on the polarization-changing means, towards the optical element, reflects the plane-polarized light of the given fourth direction towards the polarization-changing means, and for the light over substantially the entire visible light wavelength range, which is incident on the optical element, emits the plane-polarized light of the given third direction towards the polarization-changing means.

In this way, a transparent or white display can be obtained and a display of a given color can also be obtained over the entire visible light range.

In this case, preferably, the second polarized-light separating means transmits the plane-polarized light of the given third direction among the light incident on the polarization-changing means towards the optical element as the plane-polarized light of the given third direction.

Preferably the optical means comprises a second polarized-light separating means arranged on the polarization-changing means, and an optical element arranged against the second polarized-light separating means on the opposite side from the polarization-changing means;

the light source can emit light between the first polarized-light separating means and the second polarized-light separating means;

the second polarized-light separating means transmits the plane-polarized light of the given third direction among the light incident on the polarization-changing means, towards the optical element, absorbs the plane-polarized light of the given fourth direction perpendicular to the given third direction, and for the light incident on the optical element, emits the plane-polarized light of the given third direction towards the polarization-changing means; and the optical element reflects light from the second polarized-light separating means towards the second polarized-light separating means.

Such a configuration produces a fifth display state with the light passing through the second polarized-light separating means and reflected by the optical element in response to the state of the polarization axis in the polarizing-changing means, and a sixth display state by the light absorption in the second polarized-light separating means. In this case, preferably, the second polarized-light separating means is a polarizer.

A liquid crystal device, and particularly, a TN liquid crystal device, STN liquid crystal device, or ECB liquid crystal device is preferably used as the polarization-changing means. The STN liquid crystal devices include STN liquid crystal devices using optically anisotropic members for color correction.

The present invention is preferably applied when the first polarized-light separating means is arranged on the observation side of the display device.

Preferably, the light source is arranged so as to emit light between the first polarized-light separating means and the polarization-changing means.

Also preferably, the light source is arranged so as to emit light to the interior of the polarization-changing means.

Alternatively, the light source may be arranged so as to emit light between the polarization-changing means and the second polarized-light separating means.

Preferably, the display device further comprises a second reflecting means, which reflects light from the light source towards the interior of the display device.

These configurations produces a bright display with the light from the light source.

Preferably, the light source and the second reflecting means are arranged between the first polarized-light separating means and the polarization-changing means, and the second reflecting means has a reflecting region which is capable of reflecting light from the light source towards the polarization-changing means, in order to achieve a bright display with the light from the light source.

In this case, the reflecting region is preferably provided on the periphery of the displaying region of the display device in plane view.

Preferably, the second reflecting means comprises a reflector, which tilts towards the interior of the display device.

Such a configuration produces a brighter display with the light from the light source, and is particularly effective for the improvement in the brightness of the display in the central portion in the display region of the display device.

Preferably, the first polarized-light separating means is curved so that the central portion thereof is more distant from the polarization-changing means than the end thereof.

Such a configuration produces a bright display with the light from the light source, and is particularly effective for the improvement in the brightness of the display in the central portion in the display region of the display device.

Preferably, the display device further comprises an anti-glare or antireflection layer, which is provided on the opposite side from the polarization-changing means, against the first polarized-light separating means.

Such a configuration can suppress glaring and dazzling on the surface of the first polarized-light separating means, and the reflection of external light.

Preferably the display device further comprises a polarizer which is provided on the opposite side of the polarization-changing means against the first polarized-light separating means. Further, it is preferable that the first polarized-light separating means and the polarizer have substantially the same polarization axis.

Such a configuration can enhance polarization even if the first polarized-light separating means does not show sufficient separation, resulting in a high contrast of the display device.

Preferably, the display device further comprises a light guide plate for guiding light from the light source to the interior of the display device.

Such a configuration can improve brightness of a display by means of the light from the light source. In this case, a rectangular opening is preferably provided in the central portion of the light guide plate so as to expose the display region of the display device.

Preferably, the display device further comprises a third reflecting means, which reflects light from the light source and emits light between the first polarized-light separating means and the optical means.

Such a configuration produces the high versatility of possible positions of the light source and in designing.

Preferably the display device further comprises an optically isotropic transparent plate which is provided inside the first polarized-light separating means.

Such a configuration permits the use of the transparent plate as a supporting member for the first polarized-light separating means. Since the transparent plate is optically isotropic, it does not affect optical characteristics of the display device.

Preferably the display device further comprises a light diffusing means. Such a configuration produces a white display with the transparent light.

The display device in accordance with the present invention may be provided with an active device such as TFT or MIM.

The present invention provides an electronic device comprising the above-mentioned display device and a displaying cover, wherein the first polarized-light separating means is fixed to the inside of the displaying cover.

BRIEF DESCRIPTION OF THE DRAWINGS

FIG. 19(A) is a cross-sectional assembly view; and FIG. 19(B) is a plan view.

DETAILED DESCRIPTION OF PREFERRED EMBODIMENTS

Embodiments of the present invention will now be described with reference to the drawings.

First Embodiment

Figure 15:
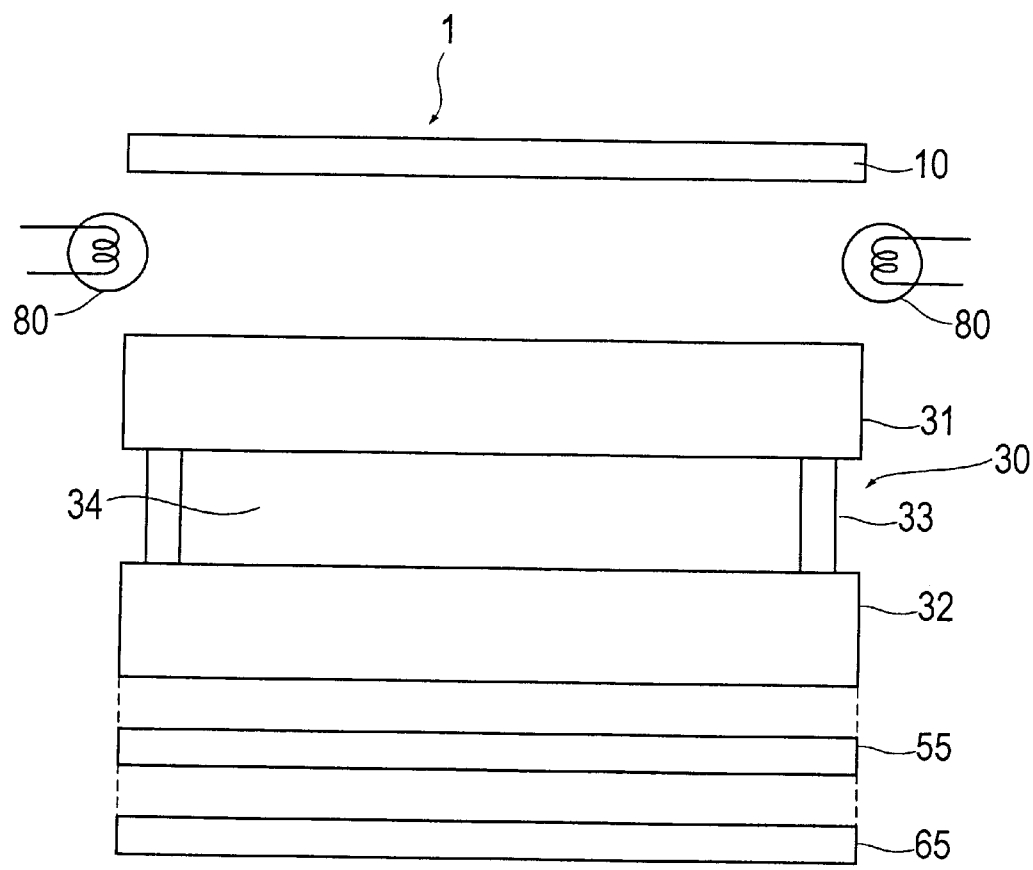
FIG. 15 is a cross-sectional assembly view for illustrating a liquid crystal display device in accordance with a first embodiment of the present invention.

FIG. 15 is a cross-sectional assembly view for illustrating a liquid crystal display device in a first embodiment in accordance with the present invention.

A liquid crystal display device 1 in this embodiment uses, for example, a TN or STN liquid crystal cell 30 as a polarization-changing optical element. An upper polarized-light separator 10 is provided above the liquid crystal cell 30. A polarizer 55 and a reflector 65 are provided under the liquid crystal cell 30 in this order. Lamps 80 are provided between the upper polarized-light separator 10 and the liquid crystal cell 30 at the sides of the liquid crystal display device 1. A liquid crystal 34, such as a TN or STN liquid crystal, is sealed in the cell composed of two glass substrates 31 and 32 and a sealing member 33 in the liquid crystal cell 30.

As the upper polarized-light separator 10 used in this embodiment, the polarized-light separator which has the same function as the upper polarized-light separators shown in FIGS. 1B, 1C, 2, 5, 6, 7, 8, 11, 12, 13 and 14 is used. That is, the upper polarized-light separator transmits a plane-polarized light component of a given second direction, but reflects a plane-polarized light component of a first direction perpendicular to the second direction among light components entering from the liquid crystal cell 30. Further, for the light incident on the upper face of the upper polarized-light separator 10, it emits plane-polarized light of the second direction towards the liquid crystal cell 30.

Polarized-light separators having such a function include that composed of a cholesteric liquid crystal layer held between two (¼)λ plates, that using a multilayered film, that separating the incident light into reflected polarized light and transmitted polarized light by means of Brewster's angle, that using holograms, and those disclosed in laid-open international patents (WO95/17692 and WO95/27919) as reflective polarizers. In this embodiment, the polarized-light separators disclosed in WO95/17692 and WO95/27919 as reflective polarizers, which are shown in FIGS. 1C, 2, 7, 8, 13, and 14, are used.

As the upper polarized-light separator 10 used in this embodiment, the polarized-light separator which has the same function as the upper polarized-light separators shown in FIGS. 1A, 3, 4, 9 and 10 can also be used. That is, the polarized-light separator transmits a plane-polarized light component of a second direction, but reflects a plane-polarized light component with a first direction perpendicular to the second direction among light components entering from the liquid crystal cell 30. Further, for the light incident on the upper face of the upper polarized-light separator 10, it emits plane-polarized light of the second direction towards the liquid crystal cell 30.

Since the operation of the liquid crystal display device 1 in this embodiment is the same as that of the liquid crystal display devices shown in FIGS. 5 to 8, the detailed description will be omitted.

The upper polarized-light separator 10 in the liquid crystal display device 1 in this embodiment transmits the plane-polarized light component of the second direction among the incident light components on the liquid crystal cell 30 as the plane-polarized light, and reflects the plane-polarized light component of the first direction perpendicular to the second direction without absorption. Thus, plane-polarized light of the first direction among light components from the lamp 80 is transmitted to the upper face of the upper polarized-light separator 10. Also, plane-polarized light of the second direction perpendicular to the first direction passes through the upper polarized-light separator 10, and is emitted from the upper face of the upper polarized-light separator 10 after repeated reflection in the liquid crystal display device 1. A brighter display state can therefore be achieved for the display using light from the lamp 80 compared with the case using a polarizer as the upper polarized-light separator 10.

Since the lamp 80 can emit light between the upper polarized-light separator 10 and the liquid crystal cell 30, the same display state based on the on-off state of the liquid crystal cell 30 is achieved by both the external light and the light from the lamp 80. Accordingly, no so-called negative-positive reversion will occur between the display with the external light and the display with the light from the lamp 80.

Second Embodiment

Figure 16:
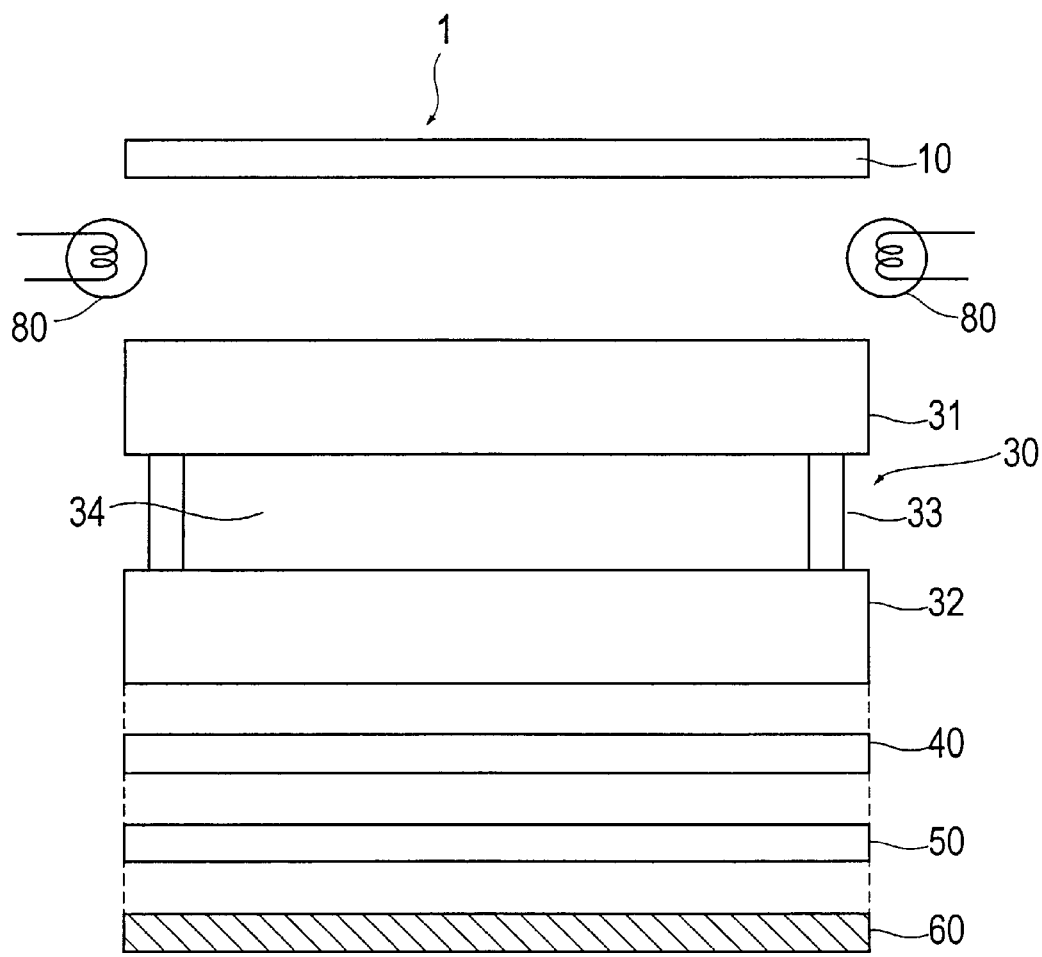
FIG. 16 is a cross-sectional assembly view for illustrating a liquid crystal display device in accordance with a second embodiment of the present invention.

FIG. 16 is a cross-sectional assembly view of a liquid crystal display device in a second embodiment in accordance with the present invention.

In a liquid crystal display device 1 in this embodiment uses, for example, a TN or STN liquid crystal cell 30 as a polarization-changing optical element. An upper polarized-light separator 10 is provided above the liquid crystal cell 30. A diffusing plate 40, a lower polarized-light separator 50 and a black absorption plate 60 are provided under the liquid crystal cell 30 in this order. Lamps 80 are provided between the upper polarized-light separator 10 and the liquid crystal cell 30 at the sides of the liquid crystal display device 1. A liquid crystal 34, such as a TN or STN liquid crystal, is sealed in the cell composed of two glass substrates 31 and 32 and a sealing member 33 in the liquid crystal cell 30.

As the upper polarized-light separator 10 used in this embodiment, the polarized-light separator which has the same function as the upper polarized-light separators shown in FIGS. 1B, 1C, 2, 5, 6, 7, 8, 11, 12, 13 and 14 is used. That is, the polarized-light separator transmits a plane-polarized light component of a given second direction, but reflects a plane-polarized light component of a first direction perpendicular to the second direction among light components entering from the liquid crystal cell 30. Further, for the light incident on the upper face of the upper polarized-light separator 30, it emits plane-polarized light of the second direction towards the liquid crystal cell 30.

As the lower polarized-light separator 50 used in this embodiment, the polarized-light separator which has the same function as the lower polarized-light separators shown in FIGS. 11 to 14 is used. That is, the lower polarized-light separator transmits the plane-polarized light component of the second direction, but reflects the plane-polarized light component of the first direction perpendicular to the second direction among light components entering from the liquid crystal cell 30. Further, for the light incident on the lower face of the lower polarized-light separator 30, it emits plane-polarized light of the second direction towards the liquid crystal cell 30.

The polarized-light separators having such a function include that composed of a cholesteric liquid crystal layer held between two (¼)λ plates, that using a multilayered film, that separating the incident light into reflected polarized light and transmitted polarized light by means of Brewster's angle, that using holograms, and those disclosed in laid-open international patents (WO95/17692 and WO95/27919) as reflective polarizers. In this embodiment, the polarized-light separators shown in FIGS. 1C, 2, 7, 8, 13 and 14, which are disclosed in WO95/17692 and WO95/27919 as reflective polarizers, are used.

As the upper polarized-light separator 10 used in this embodiment, the polarized-light separator which has the same function as the upper polarized-light separators shown in FIGS. 1A, 3, 4, 9 and 10 can also be used. That is, the polarized-light separator transmits the plane-polarized light component of the second direction, but reflects the plane-polarized light component of the first direction perpendicular to the second direction among light components entering from the liquid crystal cell 30. Further, for the light incident on the upper face of the upper polarized-light separator 10, it emits plane-polarized light of the second direction towards the liquid crystal cell 30.

Figure 1A:
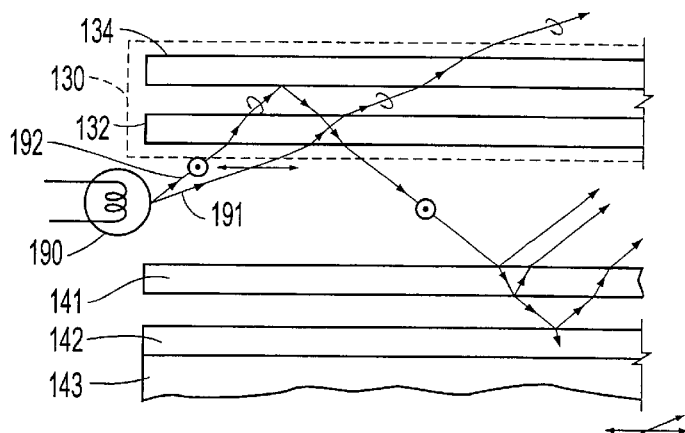
FIGS. 1A, 1B and 1C are cross-sectional views for illustrating the principle of a display device in accordance with the present invention.
Figure 1B:
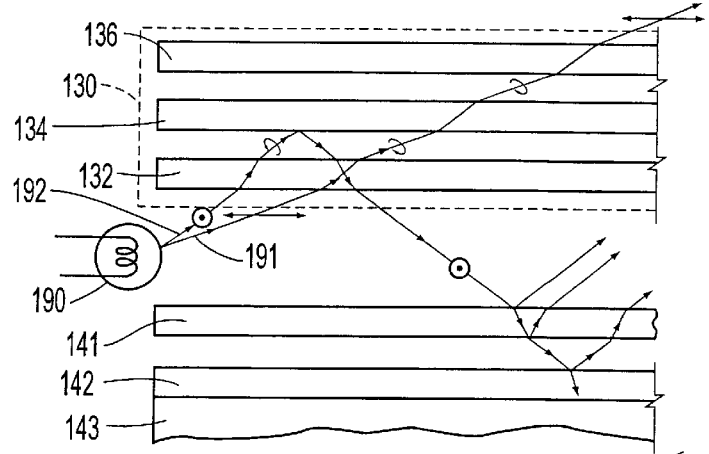
Figure 1C:
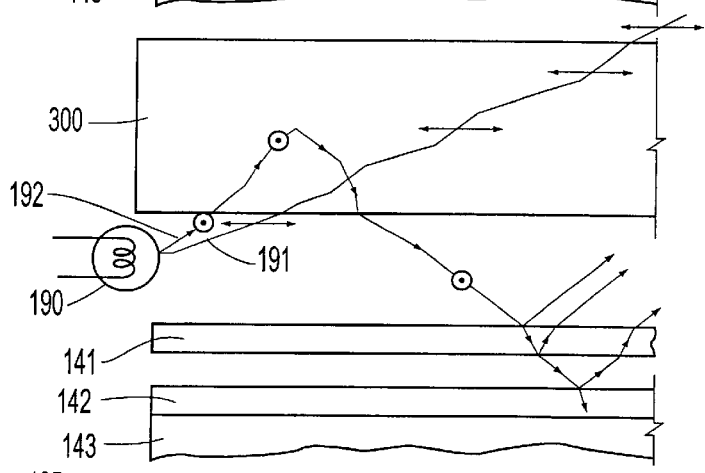
Figure 1D:
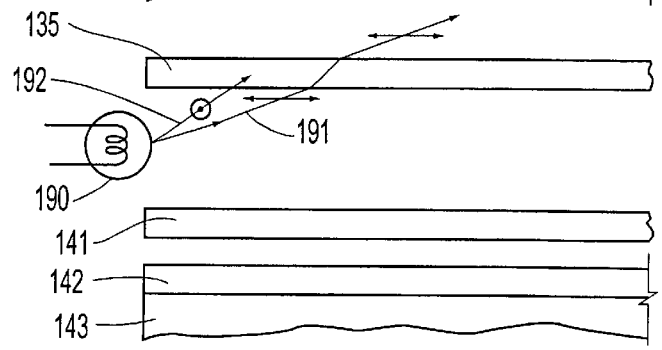
FIG. 1D is a cross-sectional view for illustrating the principle of a display device for comparison.
Figure 2:
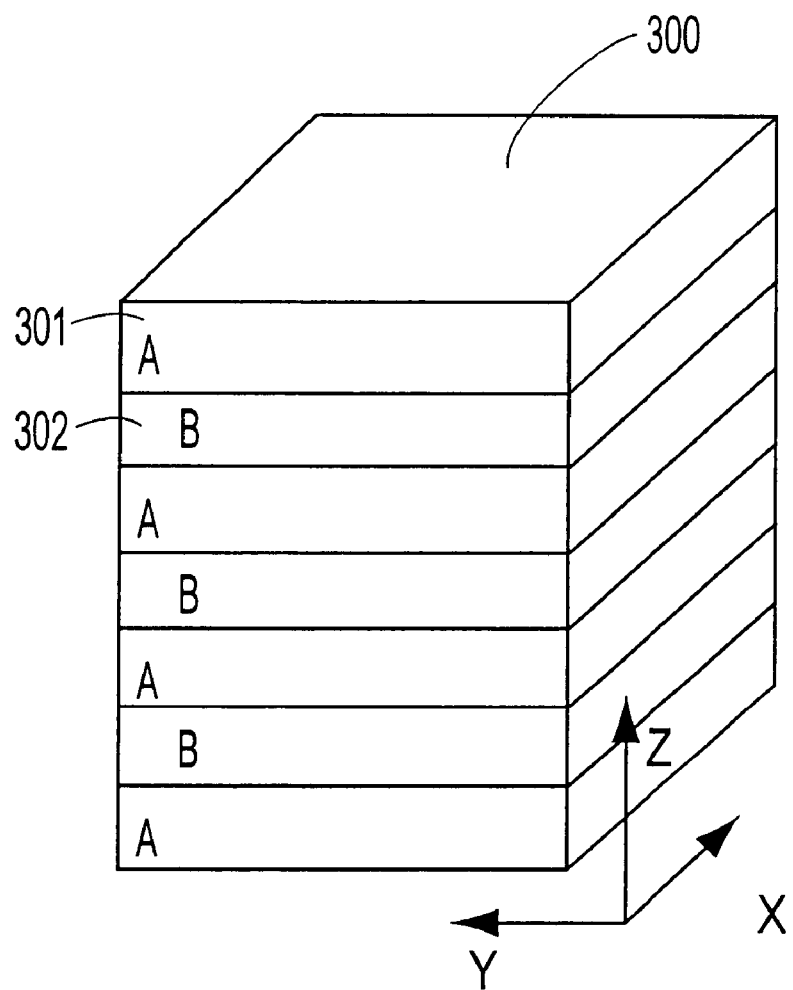
FIG. 2 is an enlarged isometric view of a polarized-light separator used in a display device in accordance with the present invention.
Figure 3:
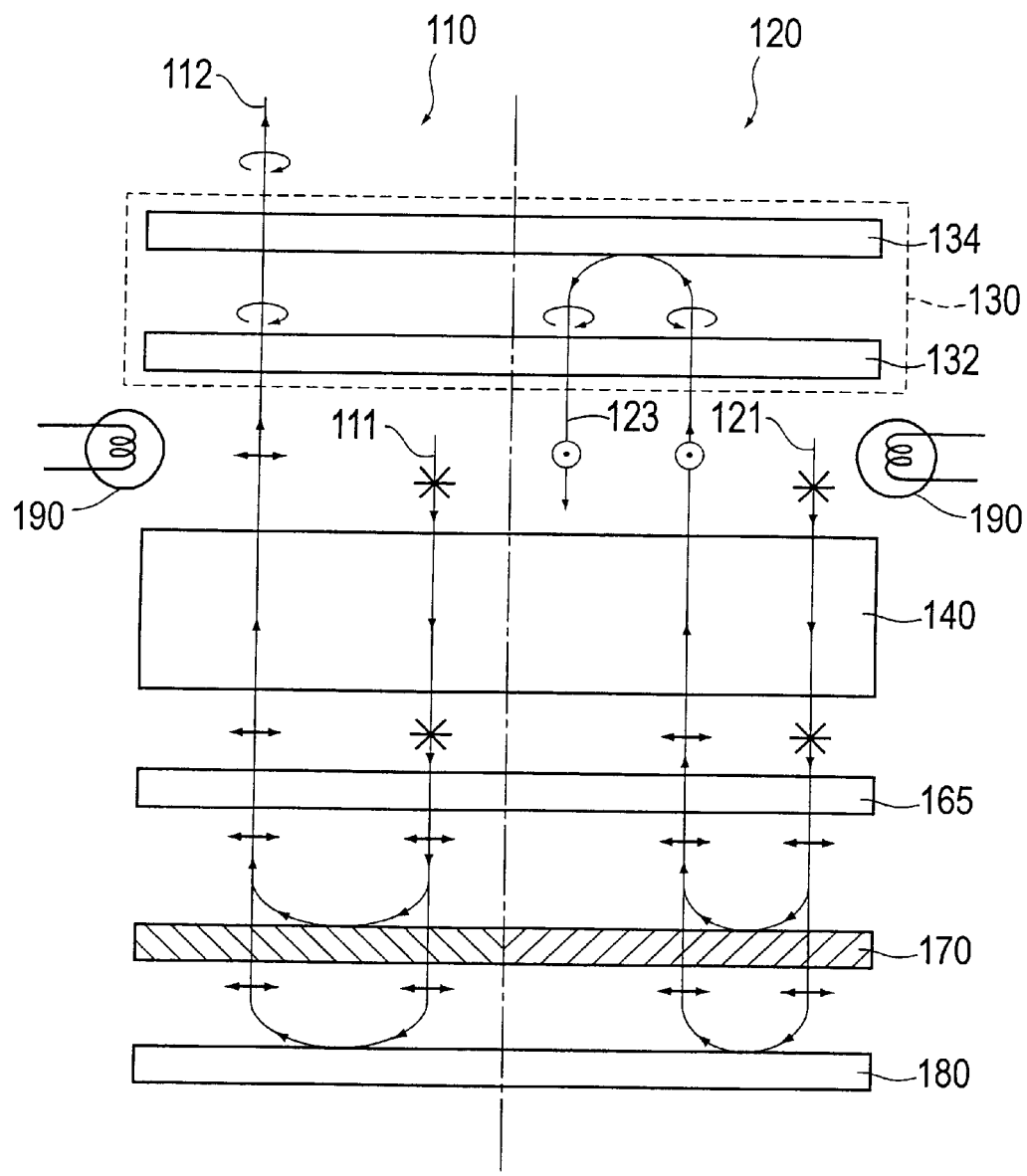
FIG. 3 is a cross-sectional view for illustrating the principle of a display device in accordance with the present invention.
Figure 4:
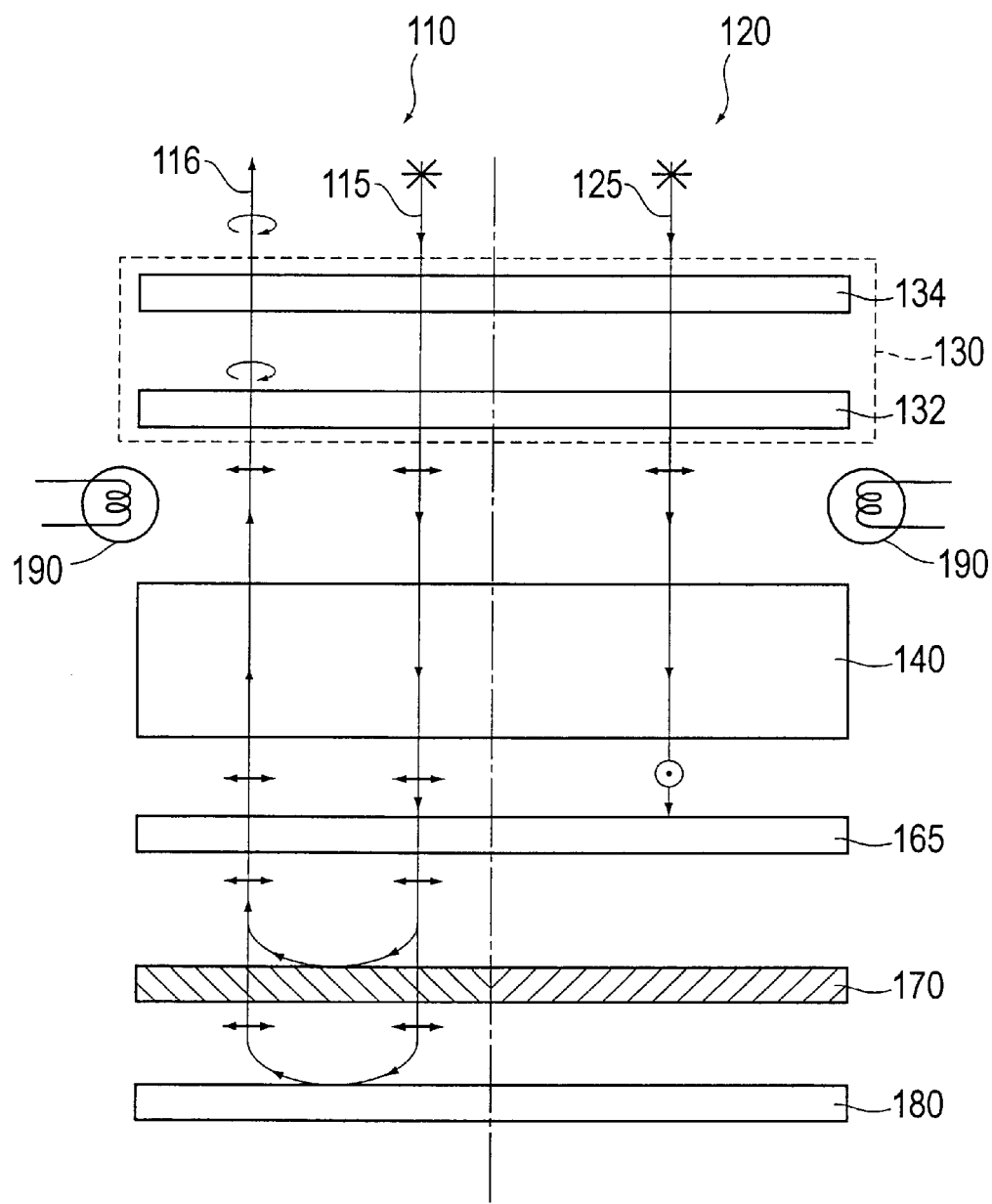
FIG. 4 is a cross-sectional view for illustrating the principle of a display device in accordance with the present invention.
Figure 5:
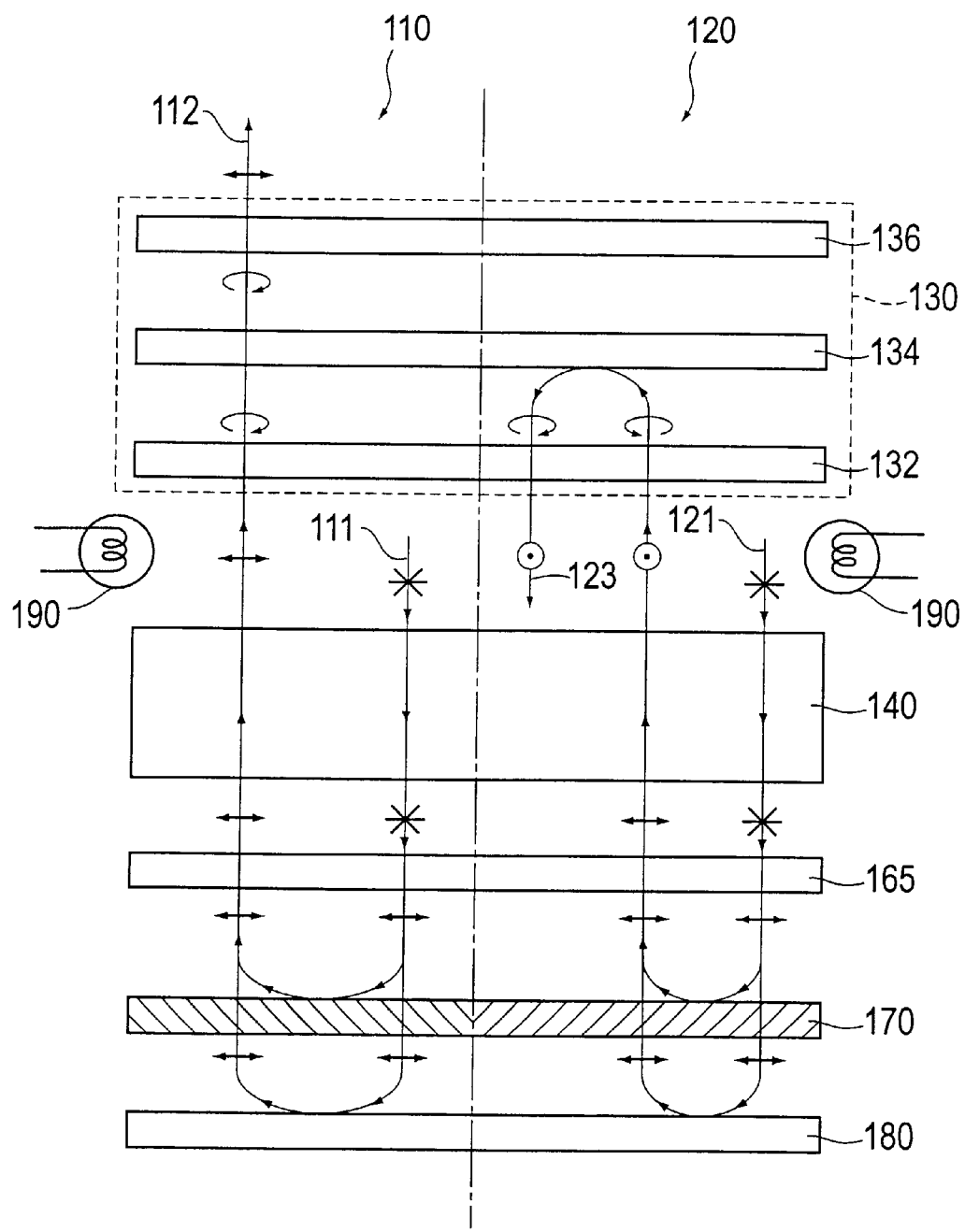
FIG. 5 is a cross-sectional view for illustrating the principle of a display device in accordance with the present invention.
Figure 6:
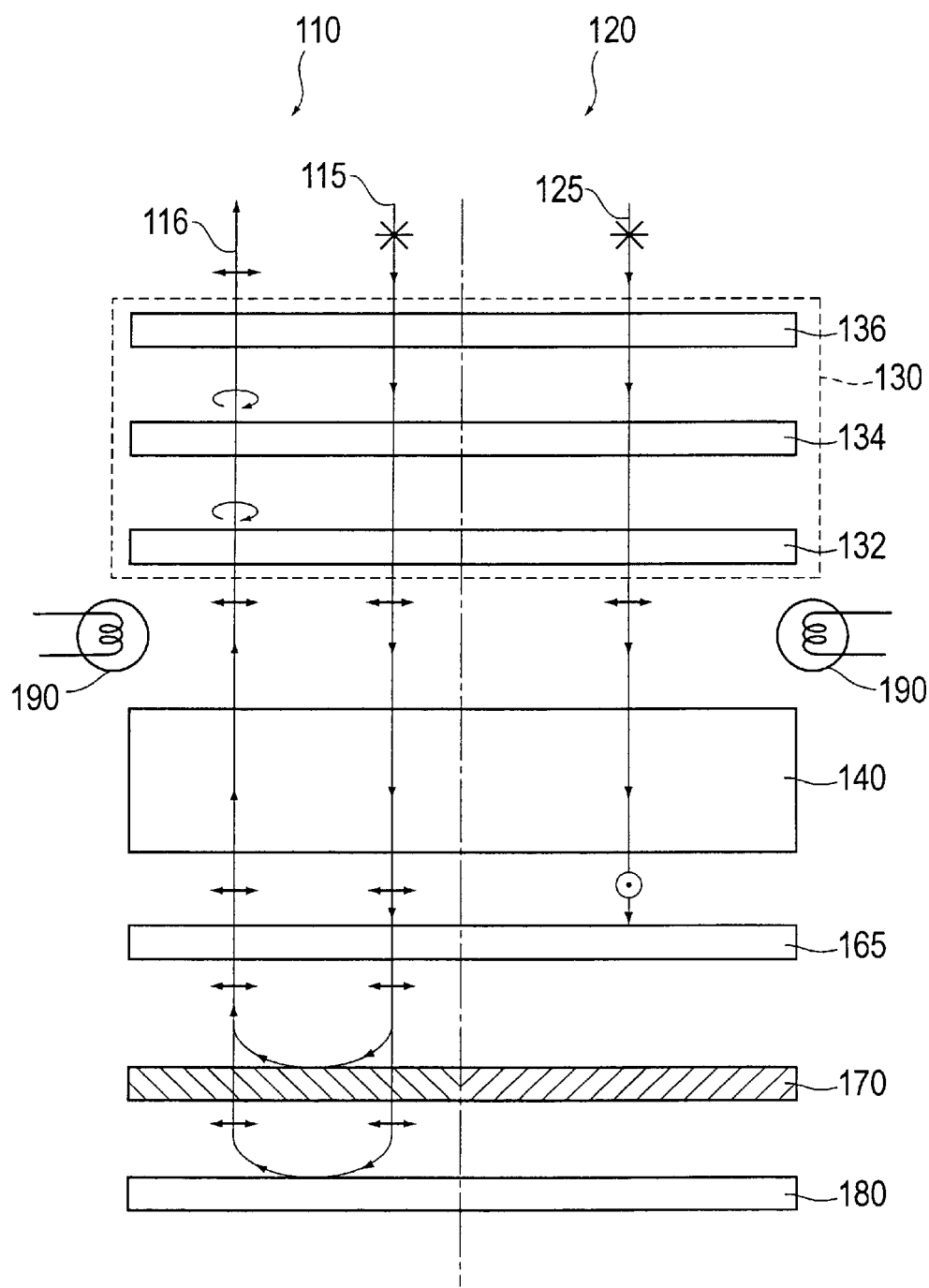
FIG. 6 is a cross-sectional view for illustrating the principle of a display device in accordance with the present invention.
Figure 7:
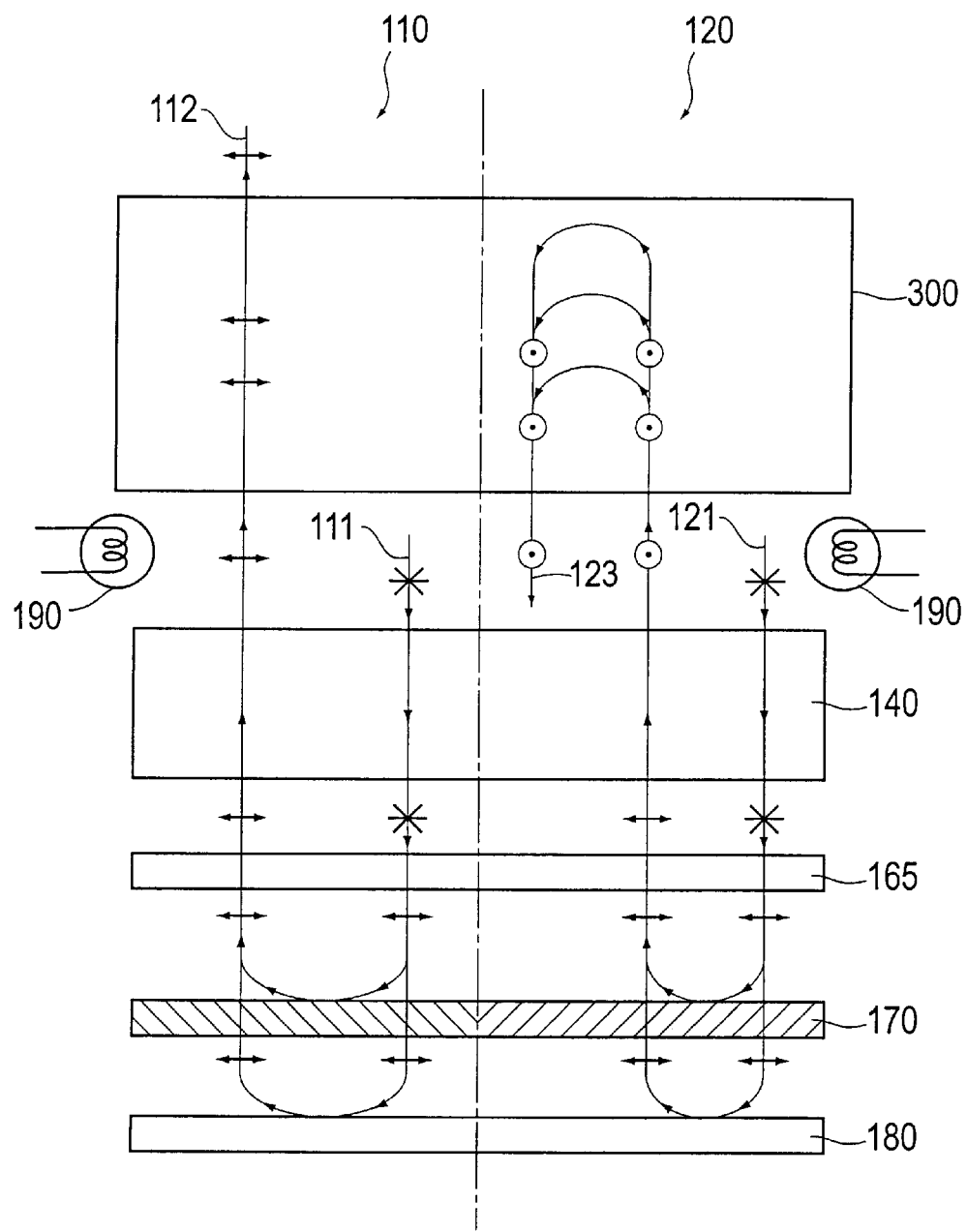
FIG. 7 is a cross-sectional view for illustrating the principle of a display device in accordance with the present invention.
Figure 8:
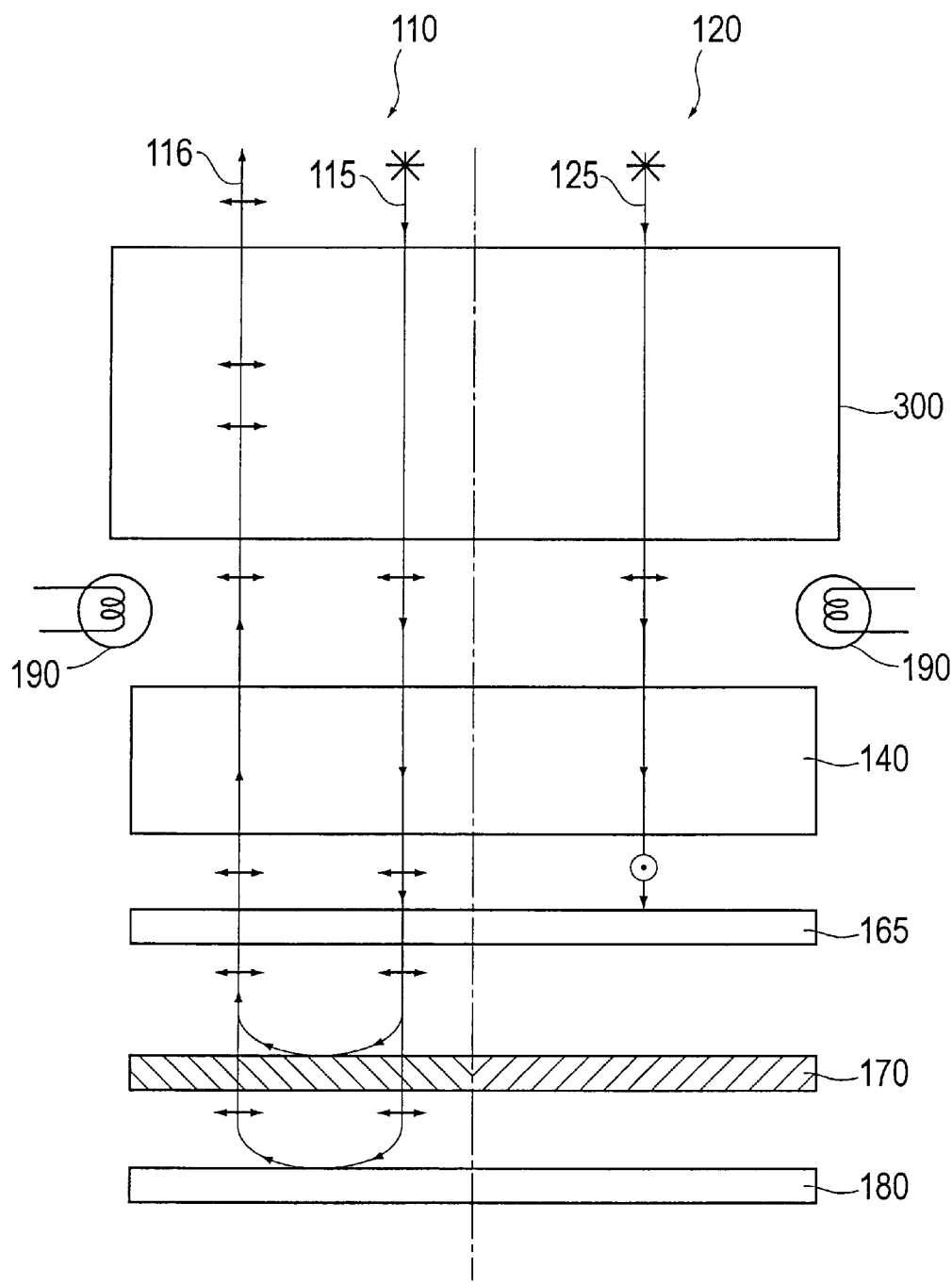
FIG. 8 is a cross-sectional view for illustrating the principle of a display device in accordance with the present invention.
Figure 9:
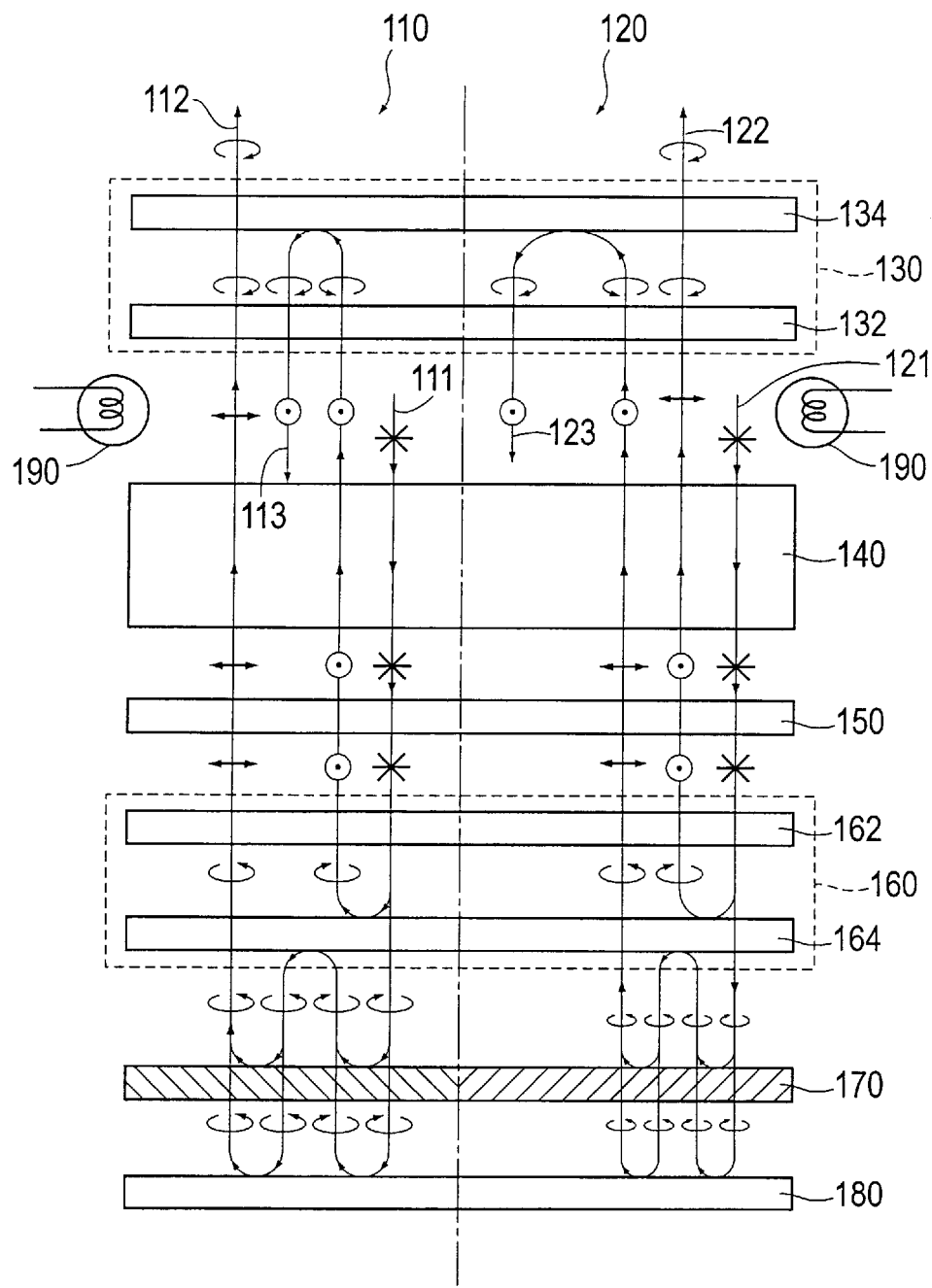
FIG. 9 is a cross-sectional view for illustrating the principle of a display device in accordance with the present invention.
Figure 10:
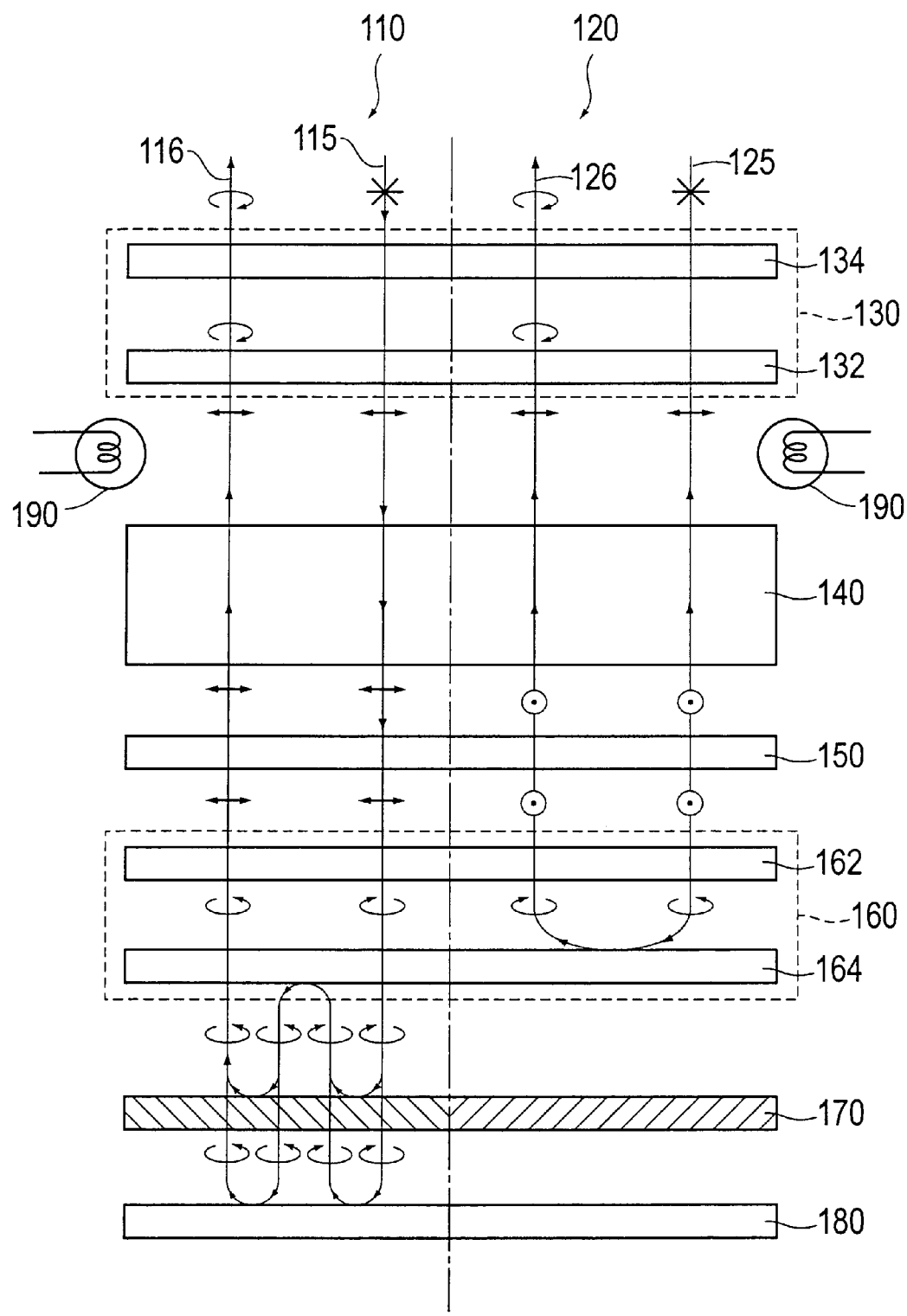
FIG. 10 is a cross-sectional view for illustrating the principle of a display device in accordance with the present invention.
Figure 11:
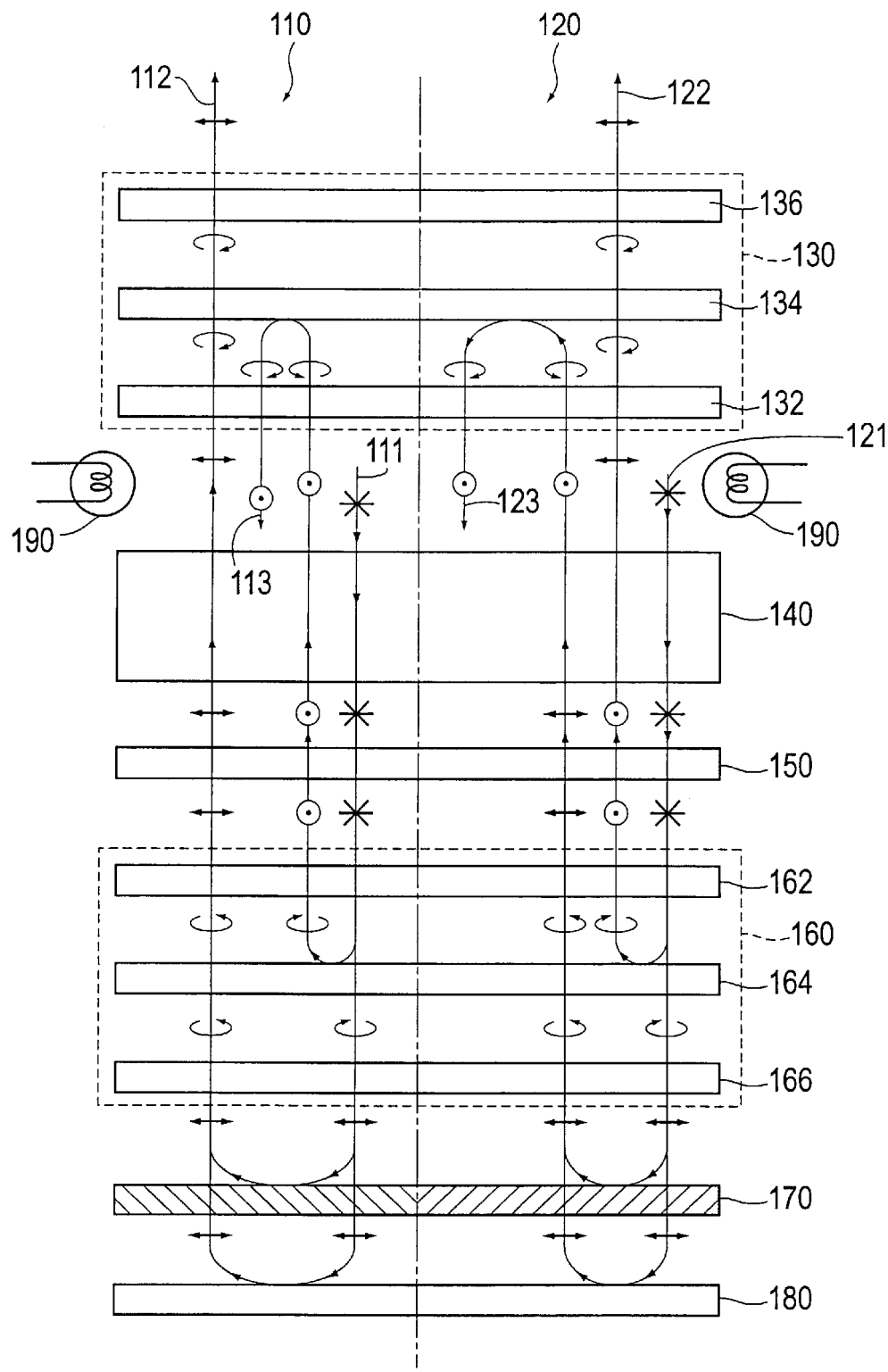
FIG. 11 is a cross-sectional view for illustrating the principle of a display device in accordance with the present invention.
Figure 12:
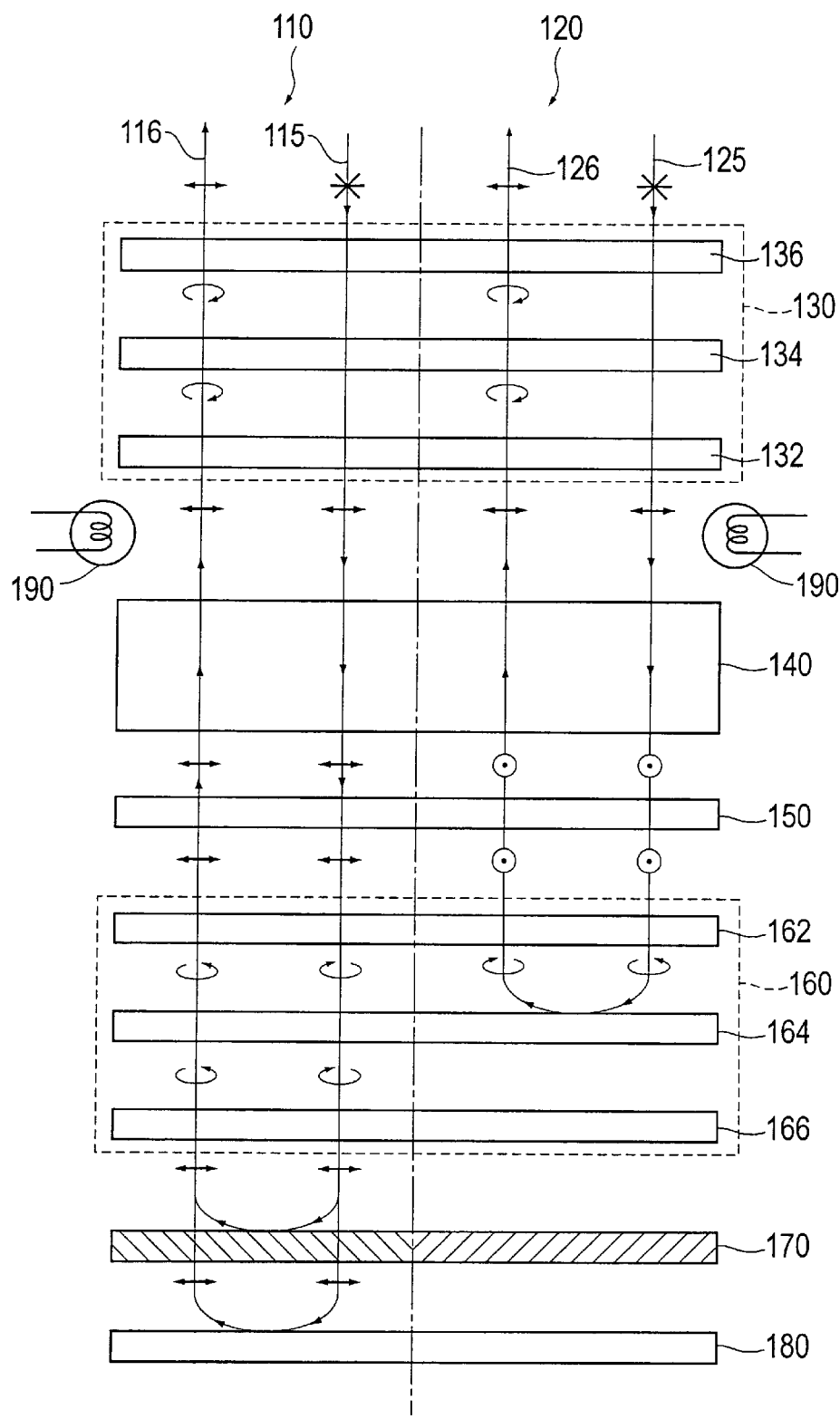
FIG. 12 is a cross-sectional view for illustrating the principle of a display device in accordance with the present invention.

As the lower polarized-light separator 50 used in this embodiment, the polarized-light separator which has the same function as the lower polarized-light separators shown in FIGS. 9 and 10 can also be used. That is, the polarized-light separator transmits the plane-polarized light component of the second direction, but reflects the plane-polarized light component of the first direction perpendicular to the second direction among light components entering from the liquid crystal cell 30. Further, for the light incident on the lower face of the lower polarized-light separator 50, it emits plane-polarized light of the second direction towards the liquid crystal cell 30.

Figure 13:
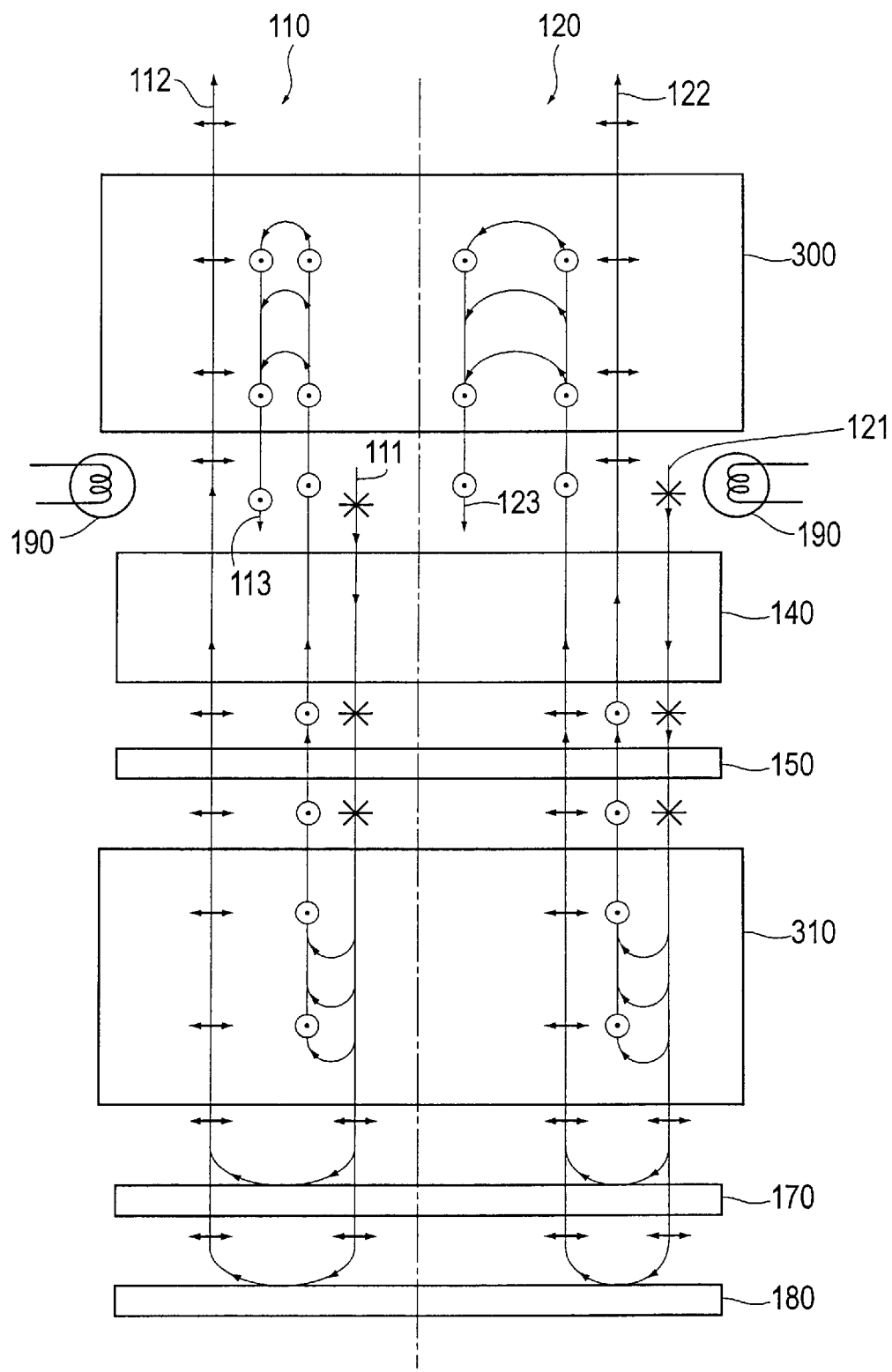
FIG. 13 is a cross-sectional view for illustrating the principle of a display device in accordance with the present invention.
Figure 14:
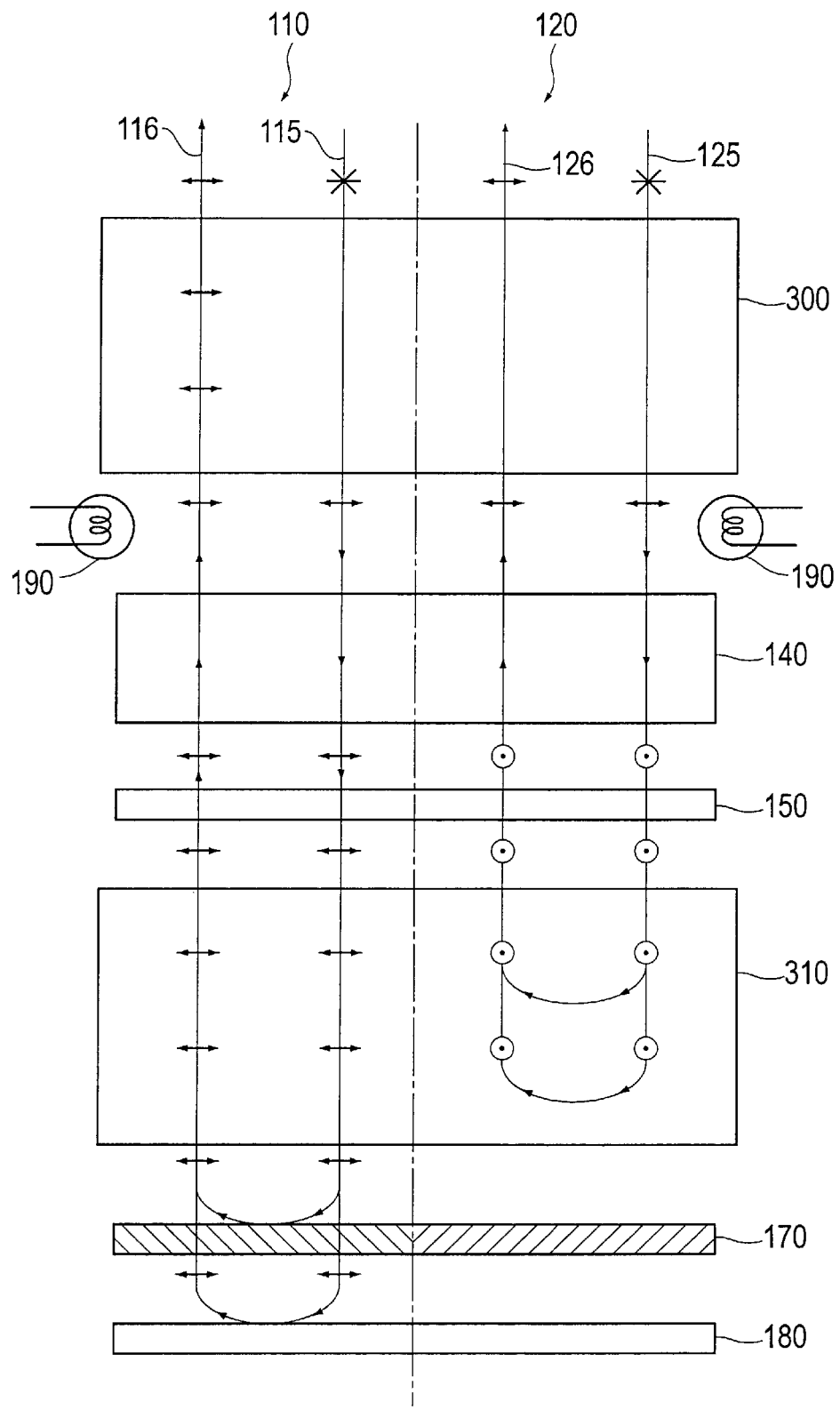
FIG. 14 is a cross-sectional view for illustrating the principle of a display device in accordance with the present invention.

Since the operation of the liquid crystal display device 1 in this embodiment is the same as that of the liquid crystal display devices shown in FIGS. 13 and 14, the detailed description will be omitted.

In the no applied-voltage section of the liquid crystal display device 1 in this embodiment, the light reflected by the lower polarized-light separator 50 is emitted as white emitting light by scattering in the diffusing plate 40, whereas in the applied-voltage section, the light passing through the lower polarized-light separator 50 is absorbed in the black absorption plate 60. Accordingly, a black display state on a white background is achieved.

The upper polarized-light separator 10 in the liquid crystal display device 1 in this embodiment transmits the plane-polarized light component of the second direction among the incident light components from the liquid crystal cell 30, and reflects the plane-polarized light component of the first direction perpendicular to the second direction without absorption. Thus, plane-polarized light of the first direction among light components from the lamp 80 is transmitted to the upper face of the upper polarized-light separator 10. Also, plane-polarized light of the second direction perpendicular to the first direction passes through the upper polarized-light separator 10 and is emitted to the upper face of the upper polarized-light separator 10 after repeated reflection in the liquid crystal display device 1. A brighter display state can therefore be achieved for the display using light from the lamp 80 compared with the case using a polarizer as the upper polarized-light separator 10.

Since the lamp 80 can emit light between the upper polarized-light separator 10 and the liquid crystal cell 30, the same display state based on the on-off state of the liquid crystal cell 30 is achieved by both the external light and the light from the lamp 80. Accordingly, no so-called negative-positive reversion will occur between the display with the external light and the display with the light from the lamp 80.

The lower polarized-light separator 50 transmits the plane-polarized light component of the second direction among the incident light components from the liquid crystal cell 30, and reflects the plane-polarized light component of the first direction perpendicular to the second direction without absorption. Thus, in the no applied-voltage section, the light from the lamp 80 is emitted from the liquid crystal display device 1 after reflection without absorption by the lower polarized-light separator 50. Also, the external light is emitted from the liquid crystal display device 1 after reflection without absorption by the lower polarized-light separator 50. A brighter display state can therefore be achieved.

Third Embodiment

Figure 17A:
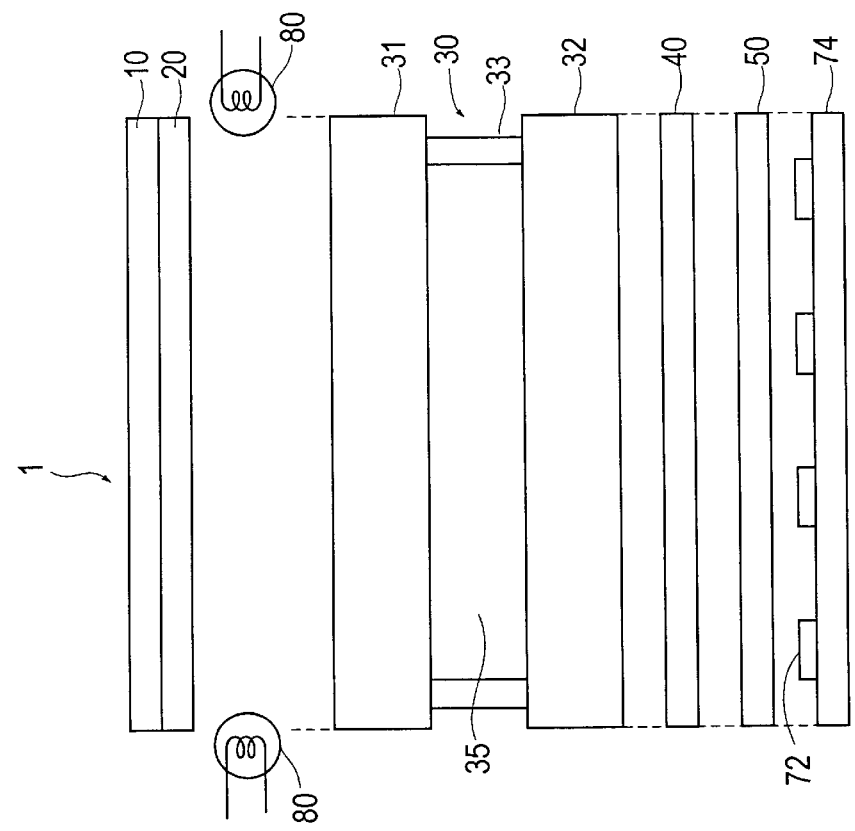
FIGS. 17A and 17B are a cross-sectional assembly views for illustrating a liquid crystal display device in accordance with a third embodiment of the present invention.

FIG. 17A is a cross-sectional assembly view for illustrating a liquid crystal display device in a third embodiment in accordance with the present invention.

In the second embodiment, the black absorption plate 60 is placed under the lower polarized-light separator 50. In the third embodiment, a color filter 72, which is formed on a polyethylene terephthalate (PET) film 74 by printing, is used instead of the black absorption plate 60. Further, a STN liquid crystal 35 is used for the liquid crystal cell 30, and a retardation film 20 is provided on a glass substrate 31. The other configuration is the same as that in the second embodiment. The retardation film 20 is used as an optically anisotropic member for color correction in order to correct the coloring which occurs in the STN liquid crystal 35.

In the no applied-voltage section of the liquid crystal display device 1 in this embodiment, the light, which is reflected by the lower polarized-light separator 50, is emitted as emitting light by scattering in the scattering plate 40, whereas in the applied-voltage section, the light passing through the lower polarized-light separator 50 is colored in the color filter 72. Accordingly, a color display state on a white background is achieved.

Modification of this Embodiment

In the liquid crystal display device shown in FIG. 17A, the retardation film 20 is provided on the glass substrate 31. In a modified embodiment shown in FIG. 17B, the retardation film 20 and the upper polarized-light separator 10 are integrated and thus the light is incident from between the retardation film 20 and the liquid crystal cell 30.

Fourth Embodiment

Figure 18:
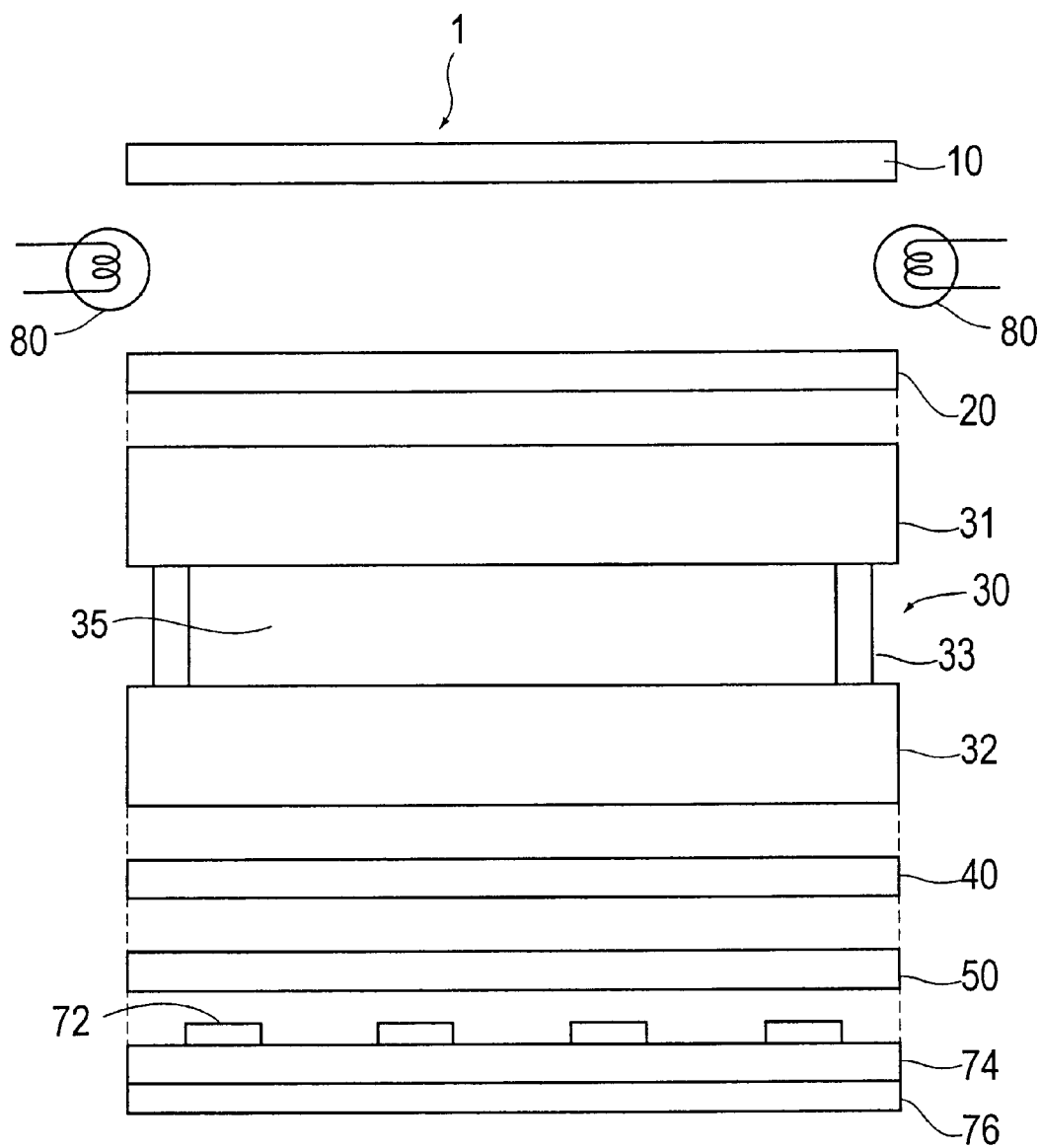
FIG. 18 is a cross-sectional assembly view for illustrating a liquid crystal display device in accordance with a fourth embodiment of the present invention.

FIG. 18 is a cross-sectional assembly view of a liquid crystal display device in a fourth embodiment in accordance with the present invention.

In this embodiment, an aluminum (Al) deposition film 76 is provided on the rear face of the PET film 74 of the third embodiment. The other configuration is the same as that of the third embodiment.

The Al deposition film 76 functions as a reflection means, which enhances brightness of the color display obtained by means of the color filter 72. The retardation film 20 and the upper polarized-light separator 10 may be integrated as in the modification of the third embodiment so that light may be incident from between the retardation film and the liquid crystal cell 30.

Fifth Embodiment

Figure 19A:
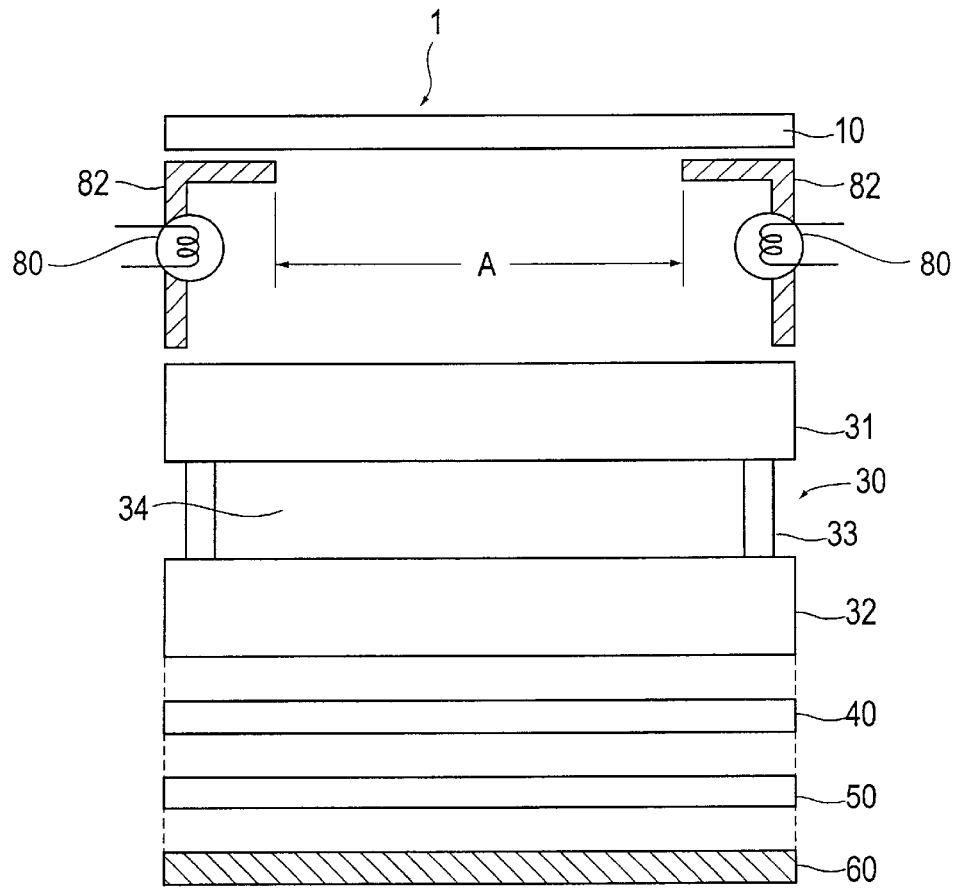
FIGS. 19A and 19B include views for illustrating a liquid crystal display device in accordance with a fifth embodiment of the present invention.
Figure 19B:
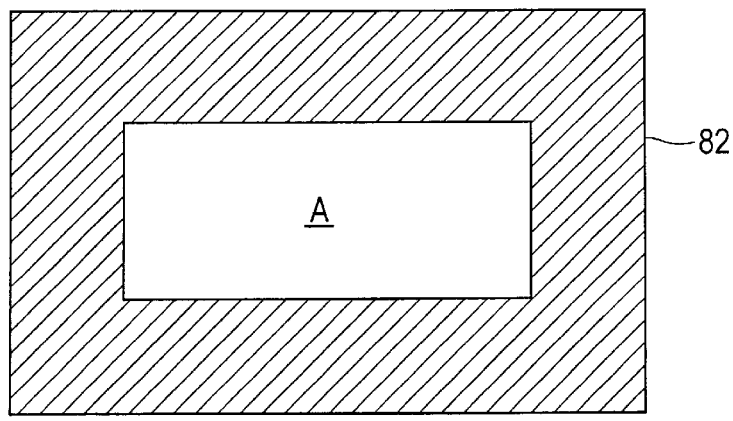

FIG. 19A is a cross-sectional assembly view of a liquid crystal display device in a fifth embodiment in accordance with the present invention.

In this embodiment, the device is provided with a reflector 82 reflecting the light from the lamp 80 towards the interior of the liquid crystal display device 1. The other configuration is the same as that of the second embodiment.

The reflector 82 enhances the brightness of the display with the light from the lamp 80.

Figure 17B:
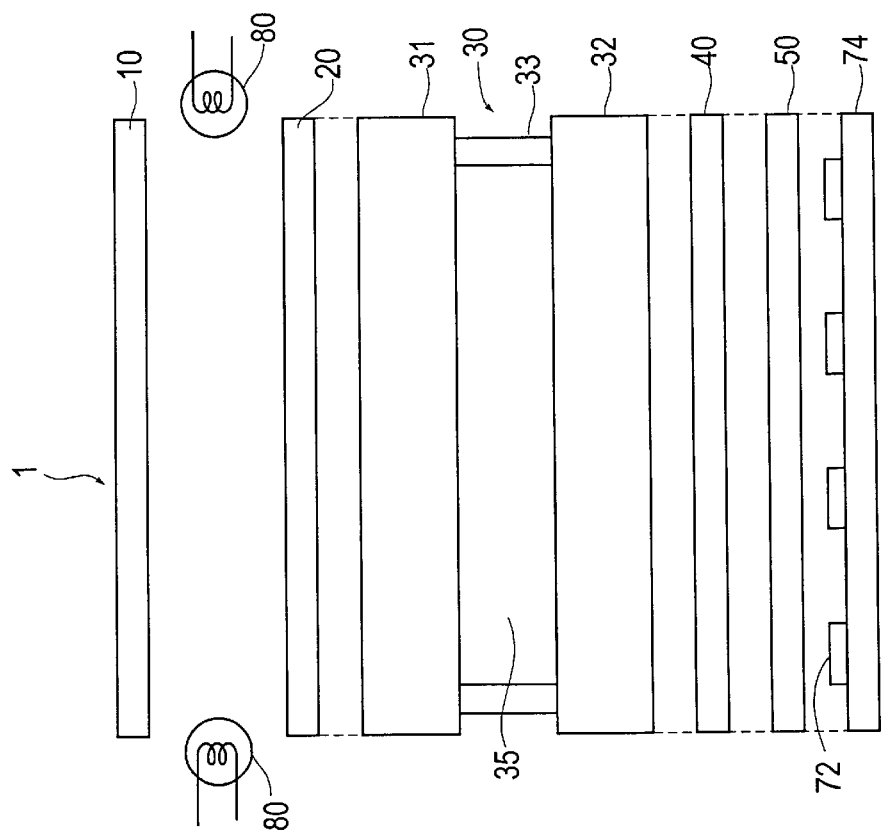

The reflector 82, as shown in FIG. 17B is provided in rectangular shape on the periphery of display section A in the liquid crystal display device 1 shown in the plane view.

Sixth Embodiment

Figure 20:
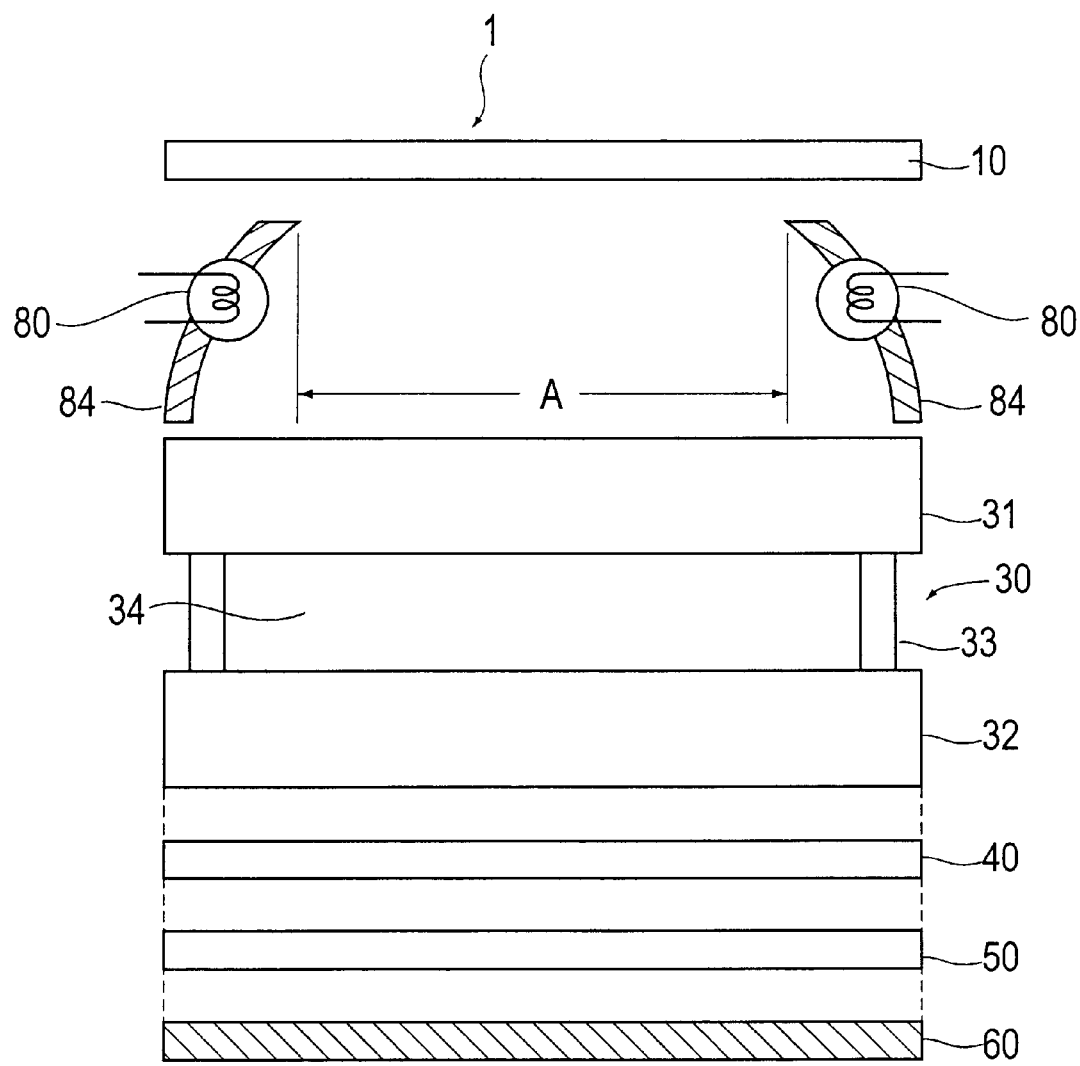
FIG. 20 is a cross-sectional assembly view for illustrating a liquid crystal display device in accordance with a sixth embodiment of the present invention.

FIG. 20 is a cross-sectional assembly view of a liquid crystal display device in a sixth embodiment in accordance with the present invention.

In this embodiment, the reflector 84 is tilted so as to reflect the light from the lamp 80 towards the interior of the liquid crystal display device 1, but the other configuration is the same as that of the fifth embodiment.

The tilted reflector 84 can reflect the light from the lamp 80 towards the central section of the display region A, resulting in improved brightness in the center of the display region A.

Preferably, the tilt angle of the reflector 84 is partially changed with consideration for illumination of the light.

Seventh Embodiment

Figure 21:
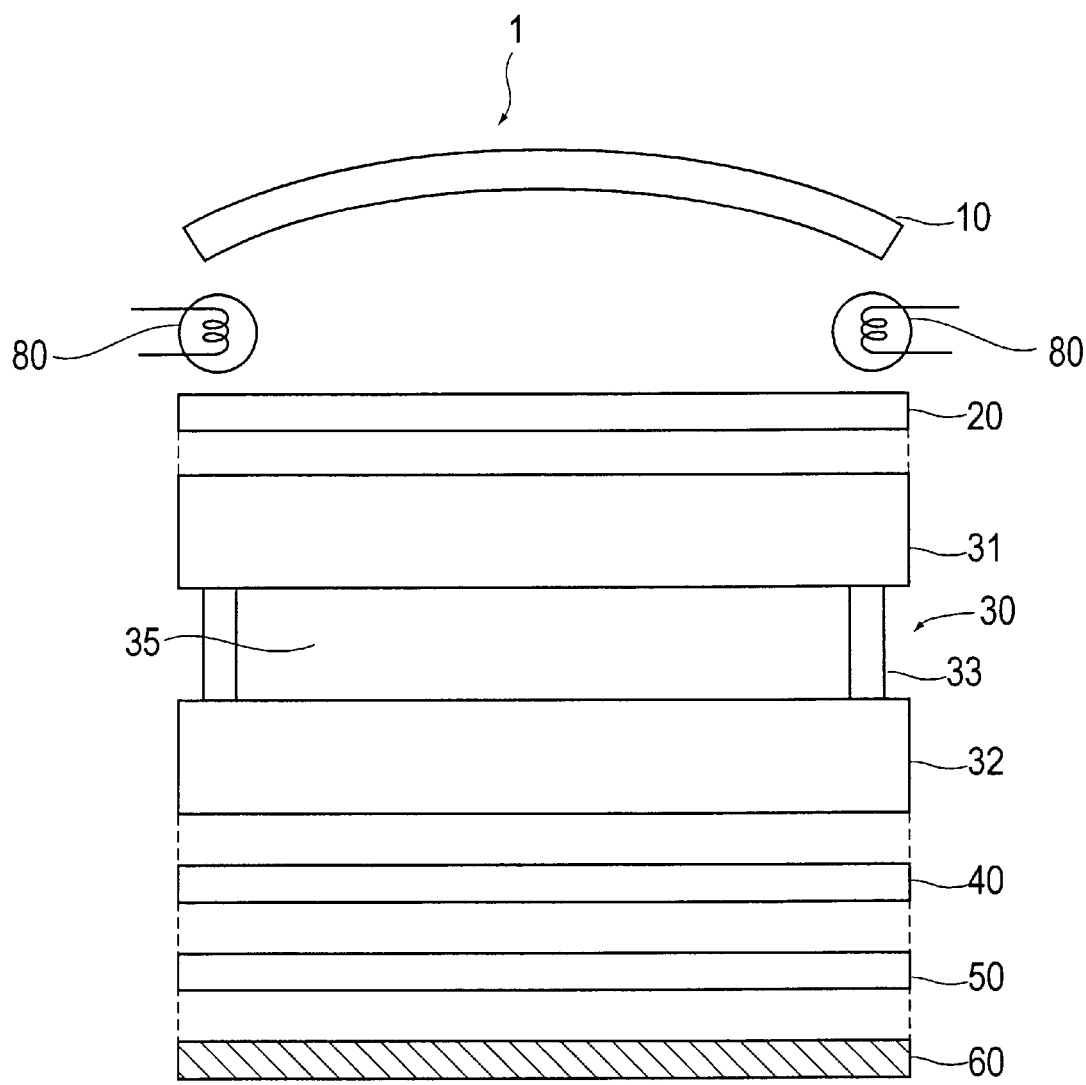
FIG. 21 is a cross-sectional assembly view for illustrating a liquid crystal display device in accordance with a seventh embodiment of the present invention.

FIG. 21 is a cross-sectional assembly view of a liquid crystal display device in a seventh embodiment in accordance with the present invention.

In this embodiment, the upper polarized-light separator 10 is curved so that its central portion is more distant from the liquid crystal cell 30 than the edge portion, and a black absorption member 60 is used instead of the color filter 72 on the PET film 74. The other configuration is the same as that of the third embodiment.

By curving the upper polarized-light separator 10, the light from the lamp 80 can be reflected towards the center of the display region, resulting in improved brightness in the center of the display region.

Eighth Embodiment

Figure 22:
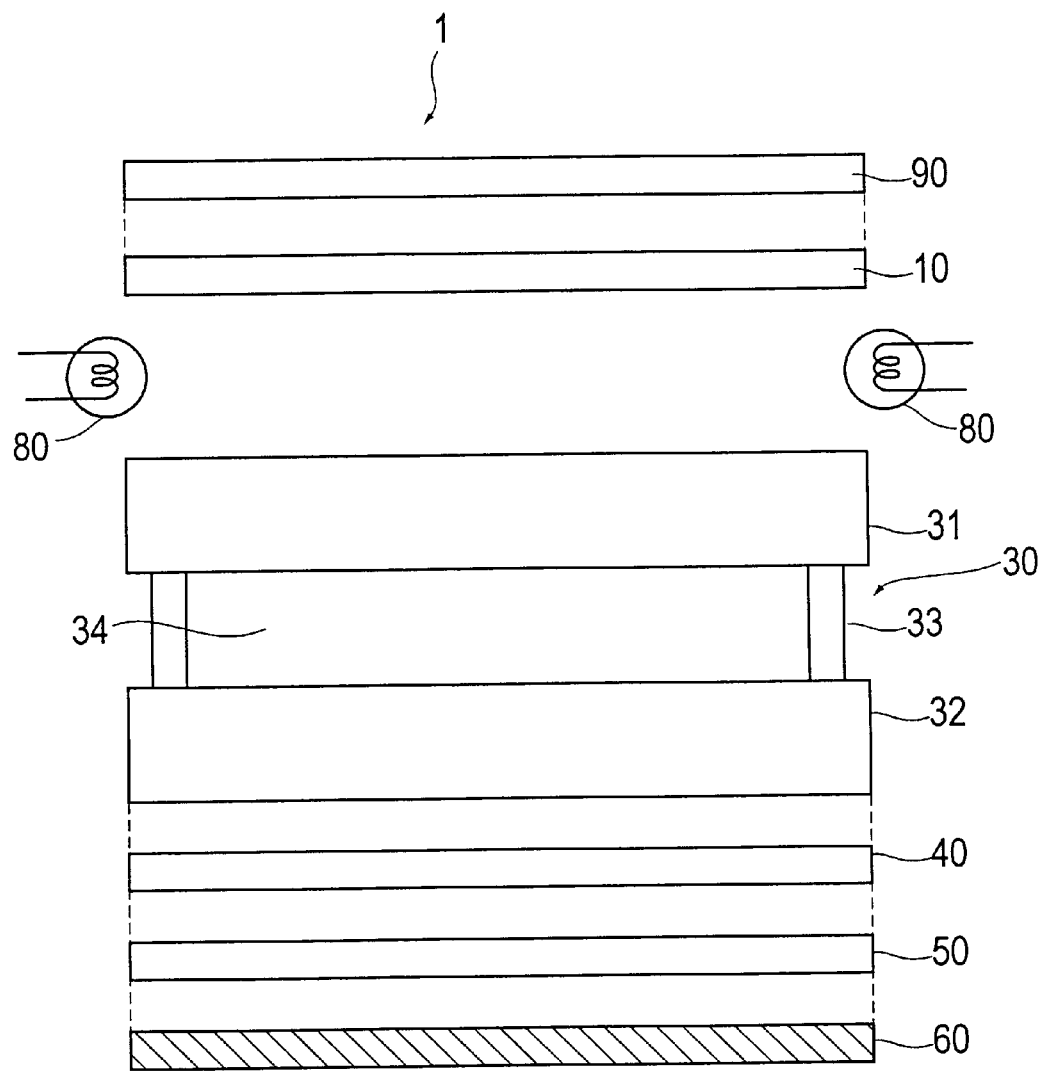
FIG. 22 is a cross-sectional assembly view for illustrating a liquid crystal display device in accordance with an eighth embodiment of the present invention.

FIG. 22 is a cross-sectional assembly view for illustrating a liquid crystal display device in an eighth embodiment in accordance with the present invention.

In this embodiment, an antiglare or antireflection film 90 is provided on the upper polarized-light separator 10, but the other configuration is the same as that of the second embodiment.

Such a configuration can suppress glaring and dazzling on the surface of the upper polarized-light separator 10, and the reflection of external light.

Ninth Embodiment

Figure 23A:
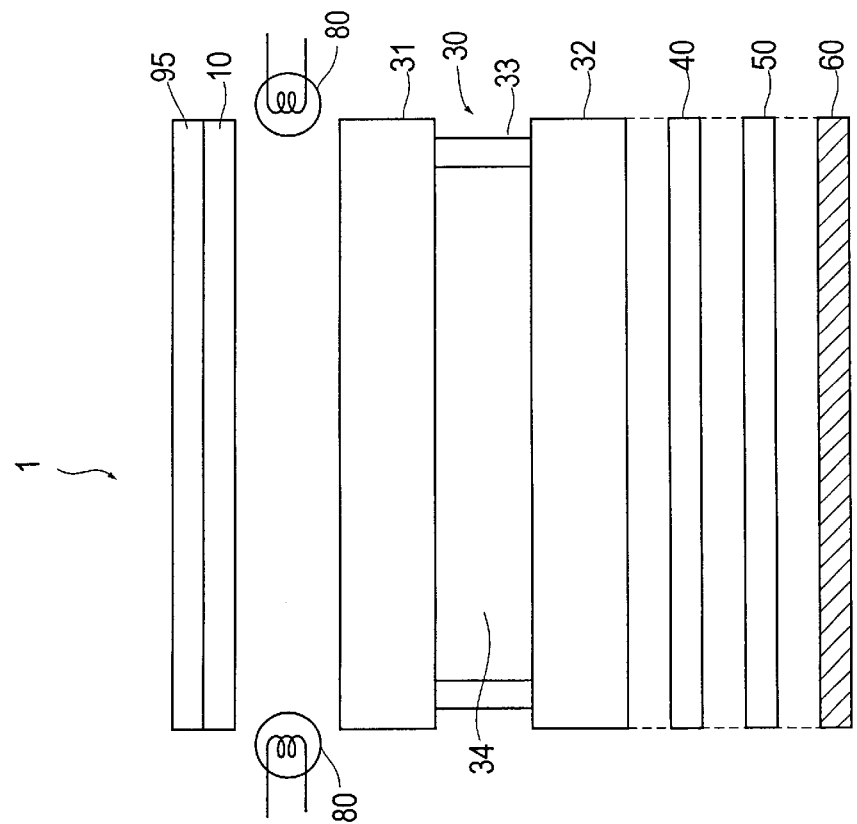
FIGS. 23A and 23B are is a cross-sectional assembly views for illustrating a liquid crystal display device in accordance with a ninth embodiment of the present invention.

FIG. 23A is a cross-sectional assembly view for illustrating a liquid crystal display device in a ninth embodiment in accordance with the present invention.

In this embodiment, a polarizer 95 is provided on the upper polarized-light separator 10 so that the polarizer 95 and the upper polarized-light separator 10 have substantially the same polarization axis. The other configuration is the same as that of the second embodiment.

Such a configuration can enhance polarization even if the upper polarized-light separator 10 does not show sufficient separation, resulting in a high contrast of the liquid crystal display device 1. Further, the polarizer 95 supports the upper polarized-light separator 10 when it does not have sufficiently high mechanical strength.

Modification of the Ninth Embodiment

Figure 23B:
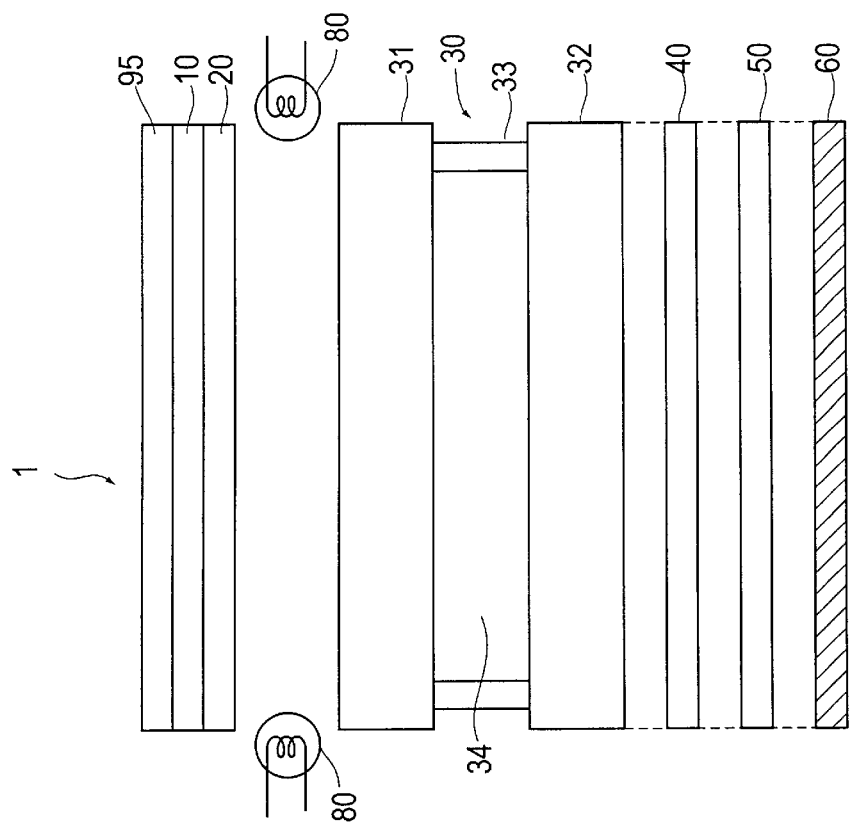

FIG. 23B shows a modification of the liquid crystal display device in the ninth embodiment. This embodiment is the same as the second embodiment except that a STN liquid crystal 35 is used for the liquid crystal cell 30, and a retardation film 20 is provided on the glass substrate 31. The retardation film 20 is used as optical anisotropy in order to correct the color generated in the STN liquid crystal 35. In FIG. 23B, the retardation film 20, the upper polarized-light separator 10, and the polarizer 95 are integrated, and the light is incident from between the retardation film 20 and the liquid crystal cell 30. The light can be incident from between the retardation film 20 and the upper polarized-light separator 10.

Tenth Embodiment

Figure 24:
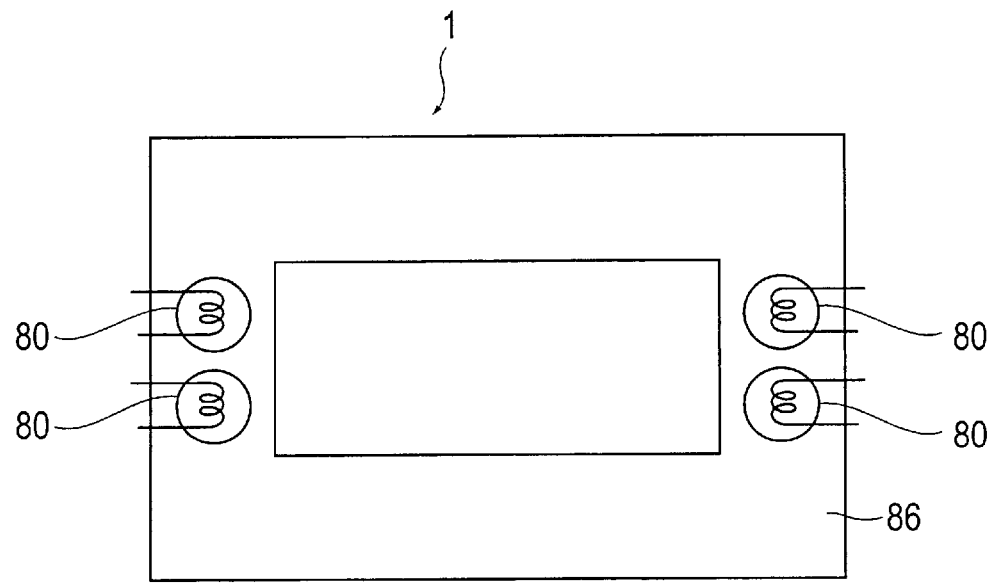
FIG. 24 is a cross-sectional assembly view for illustrating a liquid crystal display device in accordance with a tenth embodiment of the present invention.

FIG. 24 is a cross-sectional assembly view for illustrating a liquid crystal display device in a tenth embodiment in accordance with the present invention.

In this embodiment, a light guide plate 86 is provided for conducting the light from the lamp 80 to the interior of the liquid crystal display device 1.

Such a configuration can improve brightness of a display with the light from the lamp 80. In this embodiment, a rectangular opening is provided in the central portion of the light guide plate 86 so as to expose the display section of the liquid crystal display device 1. In this embodiment, a light guide plate, which is used as a backlight in a liquid crystal display device, is used after modification.

Eleventh Embodiment

Figure 25:
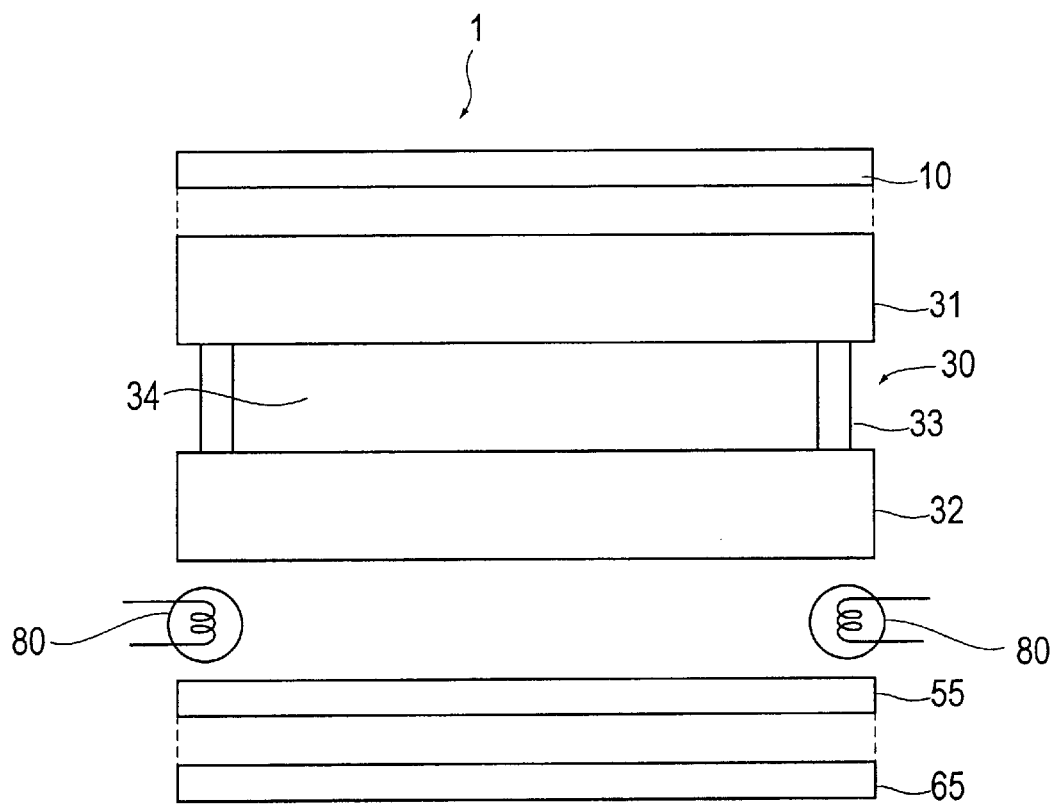
FIG. 25 is a cross-sectional assembly view for illustrating a liquid crystal display device in accordance with an eleventh embodiment of the present invention.

FIG. 25 is a cross-sectional assembly view for illustrating a liquid crystal display device in an eleventh embodiment in accordance with the present invention.

In the first embodiment, the lamps 80 are provided between the polarized-light separator 10 and the liquid crystal cell 30 at the sides of the liquid crystal display device 1. In the eleventh embodiment, the lamps 80 are provided between the liquid crystal cell 30 and the polarizer 55 at the sides of the liquid crystal display device 1. The other configuration is the same as that of the first embodiment.

The position of the lamps 80 is also applicable to the above-mentioned second to tenth embodiments and thirteenth to fourteenth embodiments described later.

Twelfth Embodiment

Figure 26:
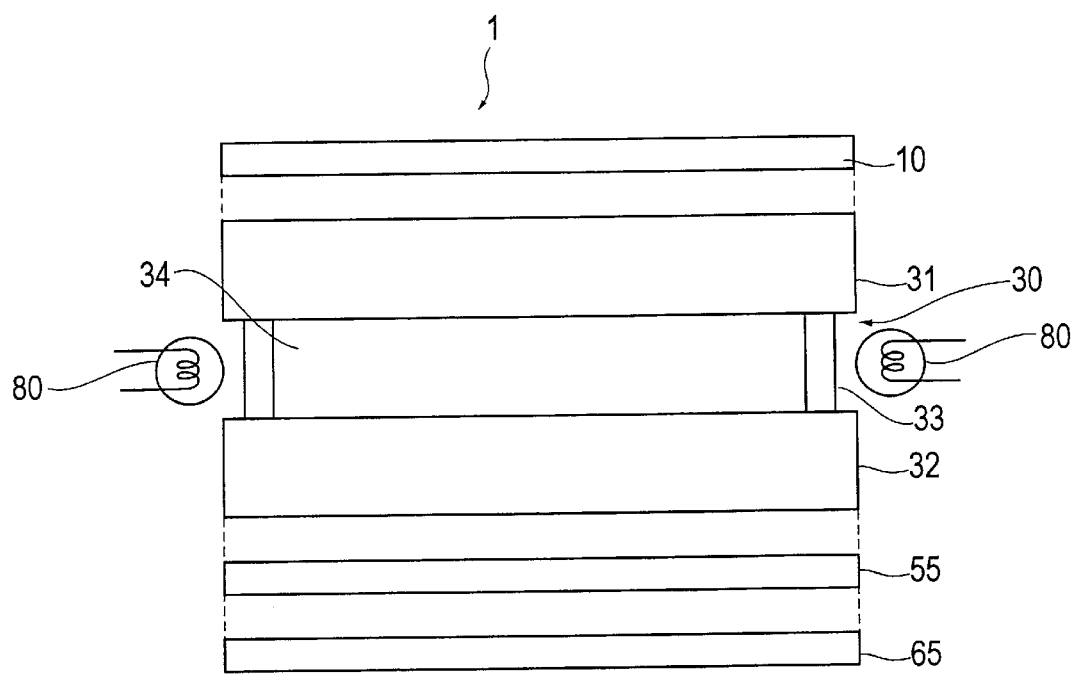
FIG. 26 is a cross-sectional assembly view for illustrating a liquid crystal display device in accordance with a twelfth embodiment of the present invention.

FIG. 26 is a cross-sectional assembly view for illustrating a liquid crystal device in the twelfth embodiment in accordance with the present invention.

In the first embodiment, the lamps 80 are provided between the polarized-light separator 10 and the liquid crystal cell 30 at the sides of the liquid crystal display device 1. In the twelfth embodiment, the lamps 80 are provided at positions, which the light can be incident inside of the liquid crystal cell, at the sides of the liquid crystal display device 1. The other configuration is the same as that of the first embodiment.

The position of the lamps 80 is also applicable to the above-mentioned second to tenth embodiments and thirteenth to fourteenth embodiments described later.

Thirteenth Embodiment

Figure 27:
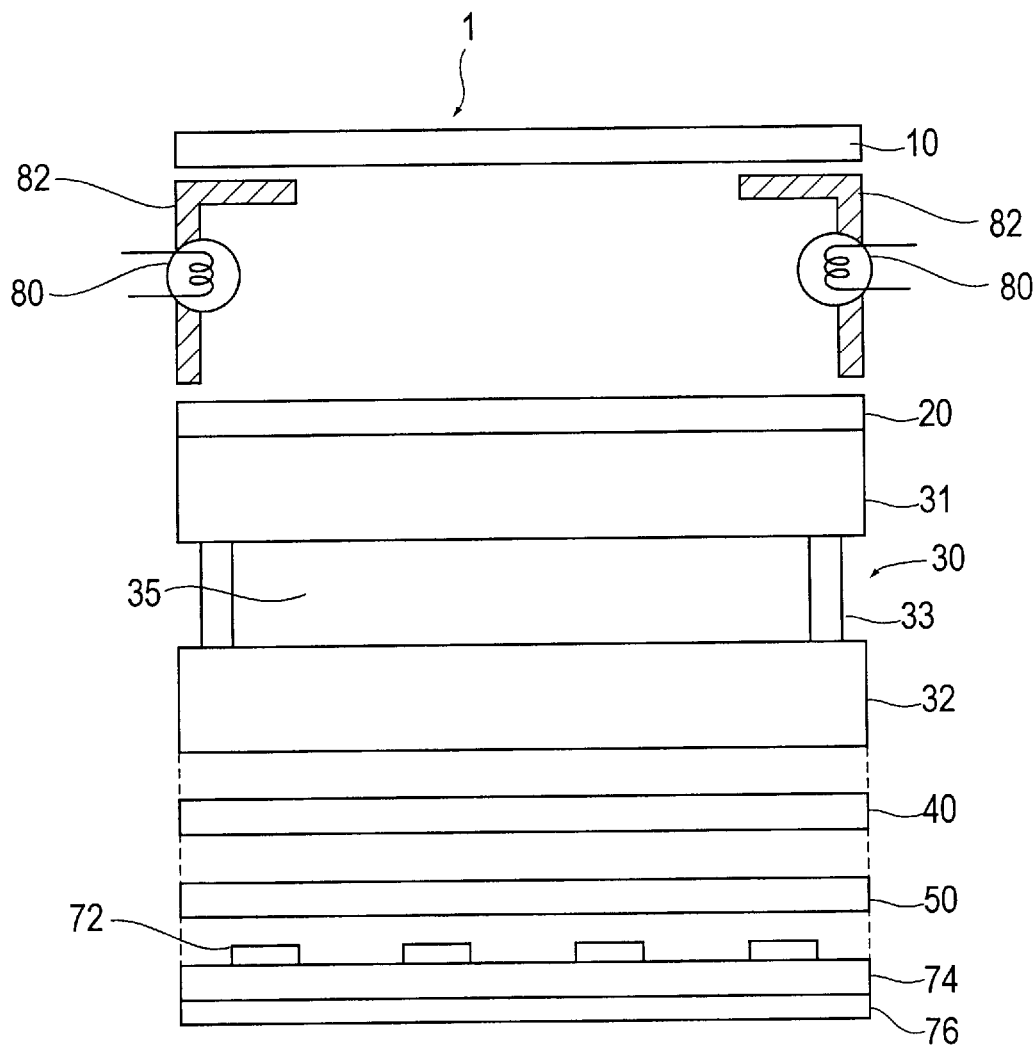
FIG. 27 is a cross-sectional assembly view for illustrating a liquid crystal display device in accordance with a thirteenth embodiment of the present invention.

FIG. 27 is a cross-sectional assembly view for illustrating a liquid crystal device in the thirteenth embodiment in accordance with the present invention.

In this embodiment, a reflector 82 reflecting the light from the lamp 80 towards the interior of the liquid crystal display device 1 is provided. The other configuration is the same as that of the fourth embodiment.

The reflector 82 can enhance the brightness of the display with the light from the lamp 80.

The reflector 82 is provided in rectangular shape on the periphery of the display section in the liquid crystal display device 1 in plane view.

Fourteenth Embodiment

Figure 28:
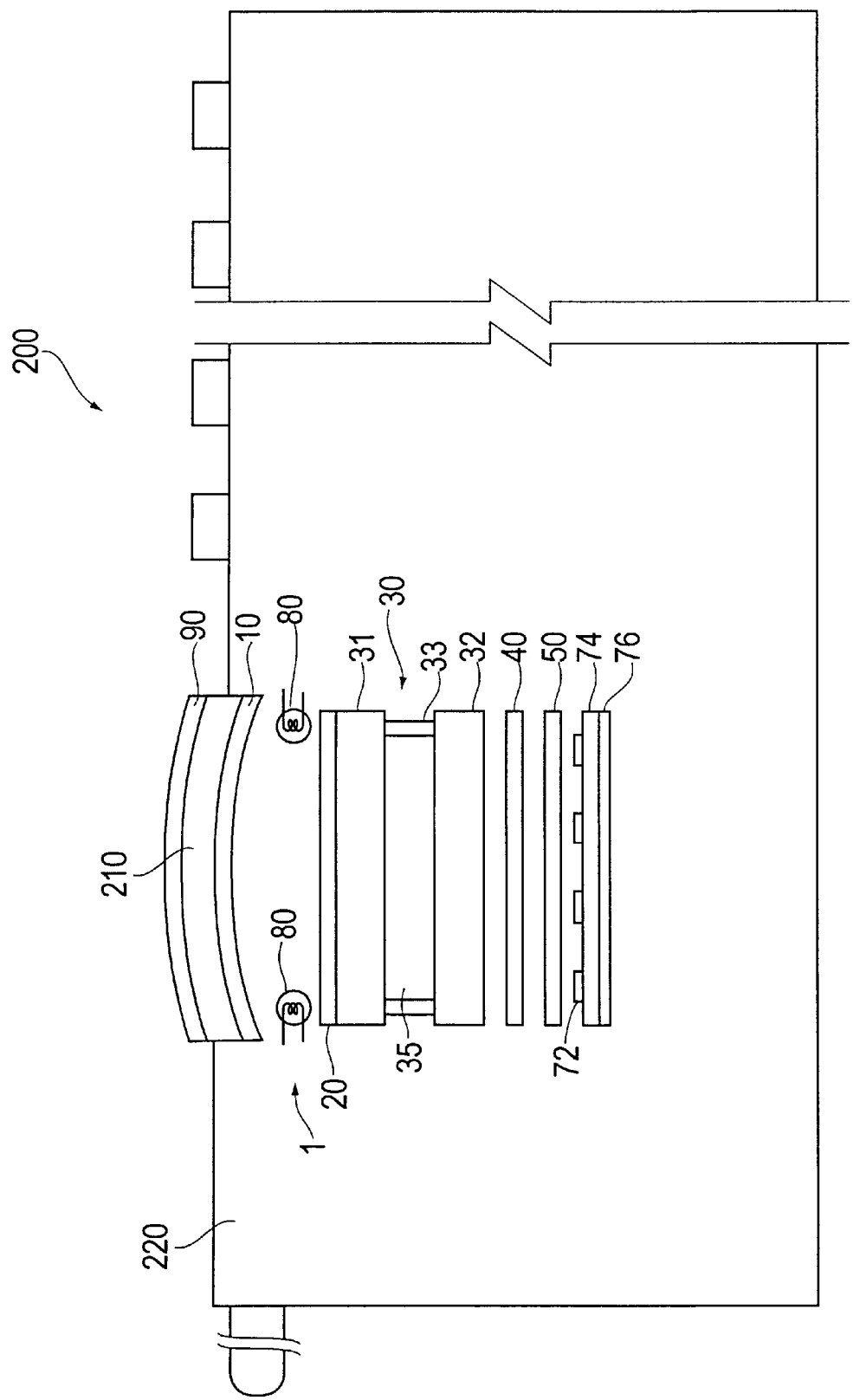
FIG. 28 is a cross-sectional view for illustrating a portable telephone using a liquid crystal display device in accordance with a fourteenth embodiment of the present invention.

FIG. 28 is a cross-sectional view for illustrating a portable telephone 200 using a liquid crystal device in the fourteenth embodiment in accordance with the present invention.

The portable telephone 200 includes the liquid crystal display device 1 of the fourth embodiment in the body 220, and the upper polarized-light separator 10 of the liquid crystal display device 1 is fixed to the inside of a transparent cover film 210 of the portable telephone 200. An antiglare or antireflection film 90 is provided on the transparent cover film 210.

Fifteenth Embodiment

Figure 29:
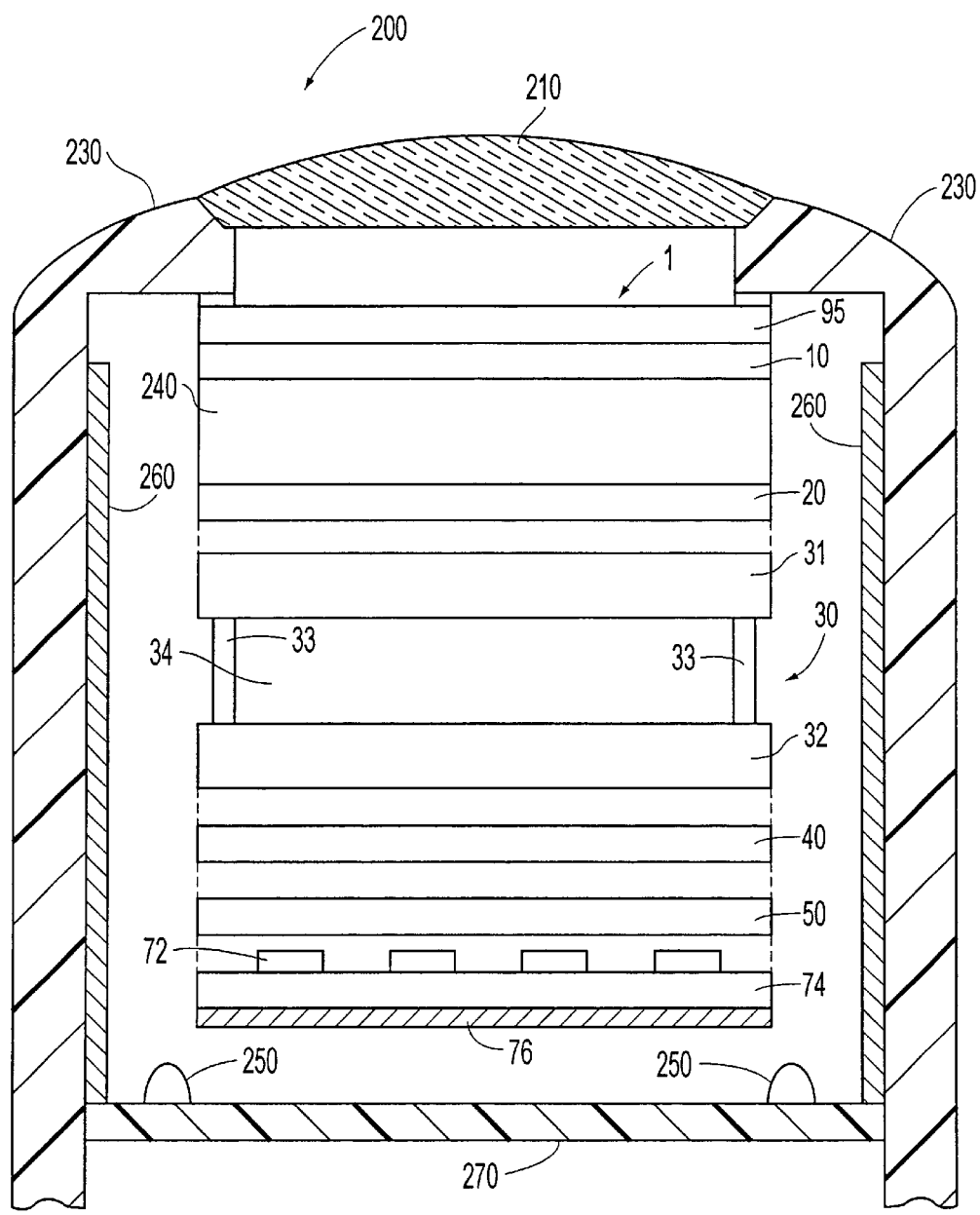
FIG. 29 is a cross-sectional view for illustrating a portable telephone using a liquid crystal display device in accordance with a fifteenth embodiment of the present invention.

FIG. 29 is a cross-sectional view for illustrating a portable telephone 200 using a liquid crystal device in the fifteenth embodiment in accordance with the present invention. The cross-sectional view corresponds to a cross-sectional view when the portable telephone 200 is perpendicularly cut along the longitudinal direction.

The portable telephone 200 includes a liquid crystal display device 1 in the body case 230 provided with a transparent cover film 210. The liquid crystal display device 1 used in this embodiment is different from the liquid crystal display device 1 in the fourth embodiment as follows. A polarizer 95 is provided on the upper polarized-light separator 10 as in the ninth embodiment. The polarizer 95 and the upper polarized-light separator 10 have substantially the same polarization axis. An optically isotropic acrylic plate 240 is provided between the upper polarized-light separator 10 and the retardation film 20 to fix the polarizer 95 and the upper polarized-light separator 10. LEDs 250 are provided on a PCB substrate 270 of the portable telephone body under the liquid crystal display device 1 instead of the lamp 80. Further, reflectors 260 are provided to conduct the light from the LEDs 250 to the sides of the liquid crystal display device 1. The other configuration is the same as that of the fourth embodiment.

The distance between the upper polarized-light separator 10 and the retardation film 20 is set to approximately 0.5 mm to 1.5 mm so that the light from the LEDs 250, which is reflected by the reflector 260, satisfactorily reaches the upper polarized-light separator 10, particularly its central portion. The reflector 260 is attached to the body case 230.

ADVANTAGES

In the present invention, the first polarized-light separating means transmits the plane-polarized light of the given first direction among light components incident on the polarization-changing means, and reflects without absorption the plane-polarized light of the given second direction perpendicular to the first direction towards the polarization-changing means. The plane-polarized light of the given first direction among the light components from the light source is transmitted towards the opposite direction from the polarization-changing means. Also, the plane-polarized light of the given second direction perpendicular to the first direction is transmitted through the first polarized-light separating means and is emitted towards the opposite side from the polarization-changing means after repeated reflection in the display device. A brighter display is achieved for the display using the light from the light source compared with the case using a polarizer as the first polarized-light separating means.

Since the light source can emit light between the first polarized-light separating means and the optical means, two display states (bright and dark) obtained in response to the first and second states of the polarization axis in the polarization-changing means are the same in the display with the external light incident on the outer face of the first polarized-light separating means and in the display with the light from the light source. No so-called negative-positive reversion will occur between the display with the light incident on the outer face of the first polarized-light separating means and the display with the light from the light source.

The optical means comprises a second polarized-light separating means arranged on the polarization-changing means, and an optical element arranged against the second polarized-light separating means on the opposite side from the polarization-changing means; wherein the light source can emit light between the first polarized-light separating means and the second polarized-light separating means, the second polarized-light separating means transmits the plane-polarized light of the given third direction among the light, which is incident on the polarization-changing means, towards the optical element, reflects the plane-polarized light of the given fourth direction perpendicular to the given third direction towards the polarization-changing means, and for the light incident on the optical element, emits the plane-polarized light of the given third direction towards the polarization-changing means, and the optical means can emit a given wavelength range of light among the light from the second polarized-light separating means towards the second polarized-light separating means.

Such a configuration produces two display states in response to the states of the polarization axis in the polarization-changing means, that is, a first display state with the light reflected by the second polarized-light separating means and a second display state with the light having a given wavelength range which passes through the second polarized-light separating means from the optical element. Since the first display state is based on the light not absorbed but reflected by the second polarized-light separating means, a brighter display is achieved. Also, a color display is achieved.

The optical means comprises a second polarized-light separating means arranged on the polarization-changing means, and an optical element arranged against the second polarized-light separating means on the opposite side from the polarization-changing means; wherein the light source can emit light between the first polarized-light separating means and the second polarized-light separating means, the second polarized-light separating means transmits the plane-polarized light of the given third direction among the light, which is incident on the polarization-changing means, towards the optical element, reflects the plane-polarized light of the given fourth direction perpendicular to the given third direction towards the polarization-changing means, and for the light incident on the optical element, emits the plane-polarized light of the given third direction towards the polarization-changing means, and the optical element absorbs light over substantially the entire visible light wavelength range from the second polarized-light separating means.

Such a configuration produces a third display state with a light refelected by the second polarized-light separating means in response to the polarization axis in the polarizing-changing means, and a black display as a fourth display state by the light absorption in the optical element over the entire visible light region. Since the third display state is based on the light not absorbed but reflected by the second polarized-light separating means, a brighter display is achieved.

What is claimed is:

1. A display device comprising:

a polarization-changing element which changes a polarization axis;

a first polarized-light separator provided on one side of said polarization-changing element and an optical device provided on another side of said polarization-changing element with said polarization-changing element between; and a light source which illuminates between said first polarized-light separator and said optical device;

said first polarized-light separator transmitting transmits plane-polarized light of a given first direction incident from said polarization-changing element, towards an opposite side of said first polarized light separator from said polarization-changing element reflecting plane-polarized light of a given second direction perpendicular to said given first direction towards said polarization-changing element, and for light incident on the opposite side of said first polarized-light separator from said polarization-changing element, emitting said plane-polarized light of said given first direction towards said polarization-changing element; and said optical device separating light, which is incident on said polarization-changing element, into plane-polarized light of a given third direction and plane-polarized light of a given fourth direction perpendicular to said given third direction, and emitting at least one of said plane-polarized light of said given third direction and said plane-polarized light of said given fourth direction towards said polarization-changing element.

2. A display device according to claim 1, said first polarized-light separator transmitting plane-polarized light of the given first direction over substantially an entire visible light wavelength range, which is incident from said polarization-changing element, towards the opposite side of said first polarized-light separator from said polarization-changing element, reflecting plane-polarized light of the given second direction towards said polarization-changing element, and for light over substantially the entire visible light wavelength range, which is incident on the opposite side of said first polarized-light separator from said polarization-changing element, emitting said plane-polarized light of said given first direction towards said polarization-changing element.

3. A display device according to claim 1, said first polarized-light separator transmitting plane-polarized light of the given first direction incident from said polarization-changing element, towards the opposite side of said first polarized-light separator from said polarization-changing element as said plane-polarized light of said given first direction.

4. A display device according to claim 1, said first polarized-light separator comprising a composite member having a plurality of layers, and refractive indices of said layers are substantially the same in said given first direction but are different from each other in said given second direction.

5. A display device according to claim 1, said optical device comprising a second polarized-light separator arranged on said polarization-changing element, and an optical element arranged on an opposite side of said second polarized light separator from said polarization-changing element;

said light source illuminating between said first polarized-light separator and said second polarized-light separator;

said second polarized-light separator transmitting said plane-polarized light of said given third direction incident on said polarization-changing element, towards said optical element, reflecting said plane-polarized light of said given fourth direction perpendicular to said given third direction towards said polarization-changing element, and for light incident on said optical element, emitting said plane-polarized light of said given third direction towards said polarization-changing element; and said optical element transmitting light of a given wavelength range from said second polarized-light separator towards said second polarized-light separator.

6. A display device according to claim 5, said second polarized-light separator comprising a composite member having a plurality of layers, and refractive indices of said layers are substantially the same in said given third direction but are different from each other in said given fourth direction.

7. A display device according to claim 5, said optical element absorbing visible light other than the light of said given wavelength range from said second polarized-light separator, reflecting the light of said given wavelength range towards said second polarized-light separator, and simultaneously transmitting the light of said given wavelength range.

8. A display device according to claim 7, wherein said optical element is a color filter.

9. A display device according to claim 5, further comprising a reflector on an opposite side of said second polarized-light separator and against said optical element;

said reflector reflecting at least the light of said given wavelength range towards said optical element.

10. A display device according to claim 1, said optical device comprising a second polarized-light separator arranged on said polarization-changing element, and an optical element arranged on an opposite side of said second polarized-light separator from said polarization-changing element;

said light source illuminating between said first polarized-light separator and said second polarized-light separator;

said second polarized-light separator transmitting said plane-polarized light of said given third direction incident on said polarization-changing element, towards said optical element, reflecting said plane-polarized light of said given fourth direction perpendicular to said third direction towards said polarization-changing element, and for light incident on said optical element, emitting said plane-polarized light of said given third direction towards said polarization-changing element; and said optical element absorbing light over substantially an entire visible light wavelength range from said second polarized-light separator.

11. A display device according to claim 10, said optical element being a black absorption member.

12. A display device according to claim 5, said second polarized-light separator transmitting said plane-polarized light of said given third direction over substantially an entire visible light wavelength range, which is incident on said polarization-changing element, towards said optical element, reflecting said plane-polarized light of said given fourth direction towards said polarization-changing element, and for the light over substantially the entire visible light wavelength range, which is incident on said optical element, emitting said plane-polarized light of said given third direction towards said polarization-changing element.

13. A display device according to claim 5, said second polarized-light separator transmitting said plane-polarized light of said given third direction incident on said polarization-changing element towards said optical element as said plane-polarized light of said given third direction.

14. A display device according to claim 1, said optical device comprising a second polarized-light separator arranged on said polarization-changing element, and an optical element arranged on an opposite side of said second polarized-light separator from said polarization-changing element;

said light source illuminating between said first polarized-light separator and said second polarized-light separator;

said second polarized-light separator transmitting said plane-polarized light of said given third direction incident on said polarization-changing element, towards said optical element, absorbing said plane-polarized light of said given fourth direction perpendicular to said third direction, and for the light incident on said optical element, emitting said plane-polarized light of said given third direction towards said polarization-changing element; and said optical element reflecting light from said second polarized-light separator towards said second polarized-light separator.

15. A display device according to claim 14, said second polarized-light separator being a polarizer.

16. A display device according to claim 1, said polarization-changing element being a liquid crystal element.

17. A display device according to claim 1, said first polarized-light separator being arranged on an observation side of said display device.

18. A display device according to claim 1, said light source being arranged so as to illuminate between said first polarized-light separator and said polarization-changing element.

19. A display device according to claim 1, said light source being arranged so as to illuminate an interior of said polarization-changing element.

20. A display device according to claim 5, said light source being arranged so as to illuminate between said polarization-changing element and said second polarized-light separator.

21. A display device according to claim 1 further comprising a reflector which reflects light from said light source towards an interior of said display device.

22. A display device according to claim 21, said light source and said reflector being arranged between said first polarized-light separator and said polarization-changing element, and said reflector having a reflecting region which reflects light from the light source towards said polarization-changing element.

23. A display device according to claim 22, said reflecting region being provided on a periphery of a displaying region of said display device in plane view.

24. A display device according to claim 21, said reflector tilting towards the interior of said display device.

25. A display device according to claim 1, said first polarized-light separator being curved so that a central portion of said first polarized-light separator is more distant from said polarization changing element than an edge thereof.

26. A display device according to claim 1 further comprising an antiglare or antireflection layer which is provided on an opposite side of said first polarized-light separator from said polarization-changing element.

27. A display device according to claim 1 further comprising a polarizer which is provided on an opposite side of said first polarized-light separator from said polarization-changing element.

28. A display device according to claim 1 further comprising a light guide plate which guides light from the light source to an interior of said display device.

29. A display device according to claim 1 further comprising a reflector which reflects light from said light source and illuminates between said first polarized-light separator and said optical device.

30. A display device according to claim 1 further comprising an optically isotropic transparent plate which is provided on said first polarized-light separator.

31. A display device according to claim 1 further comprising a light diffusing plate.

32. An electronic device comprising:
a display device according to claim 1; and
a displaying cover;
said first polarized-light separator being fixed to an inside of said displaying cover.

33. A display device, comprising:
a liquid crystal cell;
a first polarized light separator provided on one side of the liquid crystal cell;
a second polarized light separator provided on another side of the liquid crystal cell with the liquid crystal cell between, the first polarized light separator and the second polarized light separator reflecting or transmitting light, depending on a polarized direction of said light;
a color filter arranged on an opposite side of the second polarized separator from the liquid crystal cell; and
a light source which illuminates between said first polarized light separator and said second polarized light separator.

34. A display device according to claim 33, further comprising a reflector on an opposite side of the color filter with respect to the second polarized light separator.

35. A display device, comprising:
a liquid crystal cell;
a first polarized light separator provided on one side of the liquid crystal cell;
a second polarized light separator provided on another side of the liquid crystal cell with the liquid crystal cell between, the first polarized light separator and the second polarized light separator reflecting or transmitting light, depending on a polarized direction of said light;
a black absorption member arranged on an opposite side of the second polarized separator from the liquid crystal cell; and
a light source which illuminates between said first polarized light separator and said second polarized light separator.

36. A display device, comprising:
a liquid crystal cell;
a first polarized light separator provided on one side of the liquid crystal cell, the first polarized light separator reflecting or transmitting light, depending on a polarized direction of the light;
a second polarized light separator provided on another side of the liquid crystal cell with the liquid crystal cell between, the second polarized light separator reflecting or transmitting light, depending on a polarized direction of said light;
a color filter arranged on an opposite side of the second polarized separator from the liquid crystal cell; and
a light source which illuminates between said first polarized light separator and said second polarized light separator.

37. A display device according to claim 33, further comprising a reflector on an opposite side of the color filter with respect tot he second polarized light separator.

38. A display device, comprising:
a liquid crystal cell;
a first polarized light separator provided on one side of the liquid crystal cell, the first polarized light separator reflecting or transmitting light, depending on a polarized direction of the light;

a second polarized light separator provided on another side of the liquid crystal cell with the liquid crystal cell between, the second polarized light separator reflecting or transmitting light or absorbing light, depending on a polarized direction of said light;

a black absorption member arranged on an opposite side of the second polarized separator from the liquid crystal cell; and a light source which illuminates between said first polarized light separator and said second polarized light separator.

39. A display device, comprising:

a liquid crystal cell;

a first polarized light separator provided on an observation side of the liquid crystal cell, the first polarized light separator reflecting or transmitting light, depending on a polarized direction of the light; and a light source which illuminates between the first polarized light separator and the liquid crystal cell.

* * * * *